(12) United States Patent
Miyawaki et al.

(10) Patent No.: US 8,270,103 B2
(45) Date of Patent: Sep. 18, 2012

(54) IMAGING LENS UNIT

(75) Inventors: Yoshihiro Miyawaki, Suita (JP); Yuji Muraoka, Suita (JP); Nobuyuki Ando, Tenri (JP); Junichi Nakamura, Suita (JP); Yasunori Tsujino, Ibaraki (JP); Masafumi Yamashita, Takatsuki (JP); Yukihiro Kasano, Suita (JP)

(73) Assignees: Komatsulite Mfg. Co., Ltd., Osaka (JP); Nippon Shokubai Co., Ltd, Osaka (JP)

( * ) Notice: Subject to any disclaimer, the term of this patent is extended or adjusted under 35 U.S.C. 154(b) by 0 days.

(21) Appl. No.: 12/988,185

(22) PCT Filed: Apr. 16, 2009

(86) PCT No.: PCT/JP2009/057701
§ 371 (c)(1),
(2), (4) Date: Oct. 15, 2010

(87) PCT Pub. No.: WO2009/128519
PCT Pub. Date: Oct. 22, 2009

(65) Prior Publication Data
US 2011/0038065 A1    Feb. 17, 2011

(30) Foreign Application Priority Data
Apr. 16, 2008  (JP) ................................. 2008-107230

(51) Int. Cl.
*G02B 7/02* (2006.01)
(52) U.S. Cl. ........................................ 359/819; 359/820
(58) Field of Classification Search .......... 359/694–704, 359/819–830
See application file for complete search history.

(56) References Cited

U.S. PATENT DOCUMENTS

| 7,988,371 B2 * | 8/2011 | Aoki et al. ..................... 396/529 |
| 2007/0007153 A1 | 1/2007 | Watanabe et al. |
| 2007/0120050 A1 * | 5/2007 | Sawahata et al. ............. 250/239 |

(Continued)

FOREIGN PATENT DOCUMENTS
JP    61-100710 A    5/1986
(Continued)

OTHER PUBLICATIONS

Japanese Office Action issued on Jun. 5, 2012 in corresponding JP Appln. No. 2010-508254.

*Primary Examiner* — Mohammed Hasan
(74) *Attorney, Agent, or Firm* — Connolly Bove Lodge & Hutz LLP

(57) ABSTRACT

An imaging lens unit configured for processing by a solder reflow process, and includes a lens group of one or more lenses; and a lens tube supporting the lens group. The imaging lens unit comprises one or more cationically-cured epoxy resin lenses formed from an cationically-curable epoxy resin material, the lens tube is formed from a thermoplastic resin material having a deflection temperature under load of at least 200° C. The imaging lens unit has a clearance between the lens tube and at least one of the cationically-cured epoxy resin lenses and has lens supporting portions provided at least three locations inside the lens tube that support the at least one cationically-cured epoxy resin lens. The lens unit can be miniaturized. The imaging lens unit also provides excellent optical characteristics without deteriorating the optical characteristics in alignment of the centers of the lens and the diaphragm.

19 Claims, 13 Drawing Sheets

U.S. PATENT DOCUMENTS

2007/0183773 A1    8/2007    Aoki et al.

FOREIGN PATENT DOCUMENTS

| | | |
|---|---|---|
| JP | 61-121019 A | 6/1986 |
| JP | 62-11817 A | 1/1987 |
| JP | 07-156267 A | 6/1995 |
| JP | 08-73559 A | 3/1996 |
| JP | 2005-55811 A | 3/2005 |
| JP | 2005-120192 A | 5/2005 |
| JP | 2006-195139 A | 7/2006 |
| JP | 2007-17716 A1 | 1/2007 |
| JP | 2007-65644 A | 3/2007 |
| JP | 2007-163657 A | 6/2007 |
| JP | 2007-208793 A | 8/2007 |

* cited by examiner (a)

(b)

(a)

(b)

(c)

(a)

(b)

(a)

(b)

(a)

(b)

(c)

(d)

(e)

(a)

(b)

(a)

(b)

(a)

(b)

(a)

(b)

IMAGING LENS UNIT

CROSS REFERENCE TO RELATED APPLICATIONS

This application is a National Phase filing under 35 U.S.C. §371 of PCT/JP2009/057701 filed on Apr. 16, 2009; and this application claims priority to Application No. 2008-107230 filed in Japan on Apr. 16, 2008 under 35 U.S.C. §119; the entire contents of all are hereby incorporated by reference.

TECHNICAL FIELD

The present invention relates to an imaging lens unit. More specifically, the present invention relates to an imaging lens unit which is useful in optical applications and opto device applications, particularly as a component constituting a camera module of a cellular phone or a digital camera, and which can also be used as a display device component, a machine component, an electric/electronic component, or the like.

BACKGROUND ART

Optical components used, for example, for a cellular phone or a digital camera have been downsized and sophisticated in recent years. Under a circumstance where miniaturization of those products has been developed dramatically, further miniaturization of the body size and sophistication of the performance are now demanded for the optical components. As a result, further miniaturization and sophistication of an imaging lens unit constituting a camera module or the like is also demanded. In view of such a state, a plastic lens, which is advantageous for miniaturization, has been studied for practicable use for one or more lenses constituting an imaging lens unit, in place of glass lenses.

In the production of electronic components such as parts of a cellular phone, soldering is often performed. Typical conventional soldering processes include the steps of melting solder, and then applying the melted solder on a substrate surface, but now solder reflow processes are replacing such conventional processes. Usually in a solder reflow process, solder is printed in advance on a substrate surface by a technique such as printing, components are mounted on the substrate surface, and then the substrate and components are soldered in a reflow oven. The solder reflow process is advantageous in that it is suitable for soldering fine electronic components, and affords high productivity. Thus, such processes are effective in production of a camera module which is to incorporate a miniaturized imaging lens unit. In the solder reflow process, the reflow oven is heated by hot wind, far infrared rays, or the like heat sources. Thus, the components to be processed by such a process are required to have sufficient thermal resistance against the reflow temperature.

Hence, in order to miniaturize camera modules, a suitable measure must be taken to endure such a solder reflow process, in addition to using a plastic lens. At this time, it is important to miniaturize and sophisticate camera modules without deteriorating the optical characteristics.

As for the conventional technique, Patent Document 1, for example, discloses a lens body which eliminates a restraint member for a lens by providing a clearance between a lens frame and the periphery of the lens to apply an automatic alignment structure to a lens mounting portion, whereby the lens body is prevented from deformation and allows itself to facilitate centering. This technique aims to reduce deformation of the lens resulting from the thermal expansion and mechanical pressure. The structure of the lens body has clearance between the lens frame and the periphery of the lens and, at the lens mounting portion, one or both of the contact face on the annular projection provided in the outer portion of the lens effective diameter and the contact face on the annular projection of the lens frame in contact with the outer portion of the lens effective diameter have a tapered slope or a spherical shape.

In this lens body, the lens installed in the lens frame is, for example, in a state where the annular projection provided in the outer portion of the lens effective diameter is placed on the tapered-slope or spherical annular projection of the lens frame. The lens is not fixed before centering. After the centering, the lens is fixed, with an adhesive, in the lens frame at the annular projection provided in the outer portion of the lens effective diameter.

Further, Patent Document 2, for example, discloses a lens fixing structure that has a lens, and a lens barrel for housing the lens. The lens fixing structure forms a holding portion configured to hold, after housing of the lens in the lens barrel, the lens inside the lens barrel by deforming the internal wall of the barrel.

[Patent Document 1]
JP 61-121019 A (pages 1 to 3)
[Patent Document 2]
JP 2006-195139 A (pages 2 and 5)

SUMMARY OF THE INVENTION

Problems to be Solved by the Invention

Usually, when a camera module having an imaging lens unit provided with a plastic lens, which can be miniaturized, is processed by a solder reflow process (this process is also referred herein to as a reflow process or a reflow treatment), the entire outer periphery of the plastic lens is in contact with the inner periphery of the lens tube (also referred to as a barrel) as illustrated in FIG. 1. This structure fixes the lens in the lens tube and then the tube is processed by the solder reflow process.

However, in such a structure, the lens and the lens tube thermally expand in the reflow process, and the difference in the thermal expansion coefficients of those leads to misalignment of the centers of the lens and a diaphragm. Accuracy of centering of the lens and the diaphragm greatly affects on the optical performance of an imaging lens unit. For this reason, a miniaturized imaging lens unit has been demanded which can be processed by a solder reflow process while maintaining the optical characteristics.

The conventional technology disclosed by Patent Document 1, which is the above lens body, simply has an automatic alignment structure in the lens mounting portion, and does not describe anything about suitablity of the body to the solder reflow process. If this lens body is used in the solder reflow process, centering of the lens, and fixation of the lens to the lens frame with an adhesive are necessary before reflow process because handling of the lens in the reflow process is difficult in an unfixed state. However, once the lens is fixed to the lens frame with an adhesive, the centers of the lens and the diaphragm cannot be aligned any longer even if the centers become misaligned after the reflow process.

Patent Document 2 discloses the above lens fixing structure. However, from description in Patent Document 2, this lens fixing structure is only intended to reduce the burden of the lens fixing operation, to keep the lens tube size from becoming larger, and to reduce the cost. The Patent Document 2 does not describe anything about durability of the lens unit through reflow process. That is, Patent Document 2 does not disclose a lens unit which endures the solder reflow process as that of the present invention. Further, in the study for the lens unit of Patent Document 2, it is not sufficient to develop the lens unit in order to suppress the mechanical damage and a deterioration in the optical characteristics resulting from the difference in the thermal expansion coefficients of the lens and the lens tube in the reflow process under the severe solder reflow process conditions. For example, consideration is not made on the modification of the material of a lens or lens tube to a specific resin material, or optimization of the relations between the diameter of the lens and the inner diameter of the lens tube and the positional relations between the lens and the lens tube. Further, the above lens fixing structure is required to have fixing portions, for caulking a lens so as not to cause coming off of the lens. Hence, there has been room for improvement to produce the lens fixing structure in a more industrially advantageous way, particularly in the way of making the structure fit the reflow process.

The present invention has been made in view of the above state of art, and aims to provide an imaging lens unit which is to be processed by the solder reflow process, can be miniaturized, and has sufficient thermal resistance to the reflow temperatures. The imaging lens unit also provides excellent optical characteristics such as transmissivity, a refractive index, and the like with maintaining the optical characteristics in centering of the lens and the diaphragm even after the reflow process, so as to contribute to downsizing and sophistication of the performance.

Means for Solving the Problem

The present inventors have made various studies on the imaging lens unit which is to be processed by the solder reflow process and can be miniaturized. First, the inventors have focused on a certain structure of an imaging lens, which largely affects maintenance of thermal resistance and optical characteristics in the solder reflow process. The structure is an imaging lens unit, including a lens group, which is consisting of one or more lenses, and a lens tube adapted to support the lens group. When this imaging lens unit includes a lens formed from an organic material as an essential component and the lens tube formed from an organic material, such structure achieves miniaturization of the unit. As a result, the inventor has found that the thermal resistance in the solder reflow process can be improved when the imaging lens unit includes, as its essential component, a cationically-cured epoxy resin lens formed from a cationically-curable epoxy resin material and the lens tube is formed from a thermoplastic resin material having a load deflection temperature of not lower than 200° C. Further, the above problems can be solved excellently when the following specific features are defined: the length of the inner diameter of the lens tube relative to the lens diameter; the positional relation between the lens and the lens tube; and the structural characteristics of the lens and the lens tube at a portion where the lens is supported, i.e., the portion where the lens and the lens tube are in contact with each other.

In other words, the imaging lens unit aims to provide a lens unit suitable for a camera module such as a high resolution camera module, which is free from degradation of materials of the lens or the lens tube, mechanical degradation, and optical degradation in the solder reflow process in production of a camera module. This can be achieved with the following configuration. That is, in a configuration of the imaging lens unit including one or more lenses and a lens tube supporting the lens(es), the lens and the lens tube are formed from respective specific resin materials resistant to the solder reflow temperatures (having excellent thermal resistance). Also, in the configuration, the lens diameter, the inner diameter of the lens tube supporting the lens, and the positional relation between the lens and the lens tube are optimized for suppression of a mechanical damage on the lens, which results from the difference in the thermal expansion coefficients of the materials in the solder reflow process, and for suppression of a decrease in the optical characteristics of the lens which results from the mechanical damage.

This is an essential requirement for the lens unit in order for the lens not to be mechanically and optically damaged in the solder reflow process when a thermosetting resin lens, which is hard and brittle as compared to a thermoplastic resin, is used in the lens tube instead of a thermoplastic resin lens. This enables both use of a high thermal-resistant thermosetting resin lens and maintenance of the optical characteristics in centering of the lens and the diaphragm after the solder reflow process. Such an optical characteristics is one of the important performance indices of imaging lens units.

In this way, the above configuration has been found to largely contribute to miniaturization and sophistication of the imaging lens unit, which is useful for optical applications and opto device applications, particularly as a component constituting a camera module of cellular phones and digital cameras. Thereby, the present invention has been completed.

That is, the present invention relates to an imaging lens unit configured to be processed by a solder reflow process, including: a lens group consisting of one or more lenses; and a lens tube that supports the lens group. The imaging lens unit includes one or more cationically-cured epoxy resin lenses formed from a cationically-curable epoxy resin material. The lens tube is formed from a thermoplastic resin material having a deflection temperature under load of not lower than 200° C. The imaging lens unit has a clearance between the lens tube and at least one of the cationically-cured epoxy resin lenses and has lens supporting portions that are provided at at least three locations inside the lens tube and that support the at least one cationically-cured epoxy resin lens.

The present invention also relates to a method of producing an imaging lens unit, including a process of producing the imaging lens unit of the present invention.

The present invention is described in detail below.

The imaging lens unit of the present invention is provided with a lens group consisting of one or more lenses, and with a lens tube that supports the lens group. The lens tube supports the lens and therefore can accommodate lenses without misalignment of the centers of the lens and the diaphragm.

The lens tube is formed from a thermoplastic resin material which has a load deflection temperature (the temperature when the deflection is $1/100$ inches) of not lower than 200° C. Use of the thermoplastic resin material as a material of the lens tube enables cost reduction and precise machining. Also, solder reflow processes can be made without thermal deformation, melting, and the like. The load deflection temperature herein refers to the value under a load of 0.45 MPa determined according to the standard ASTMD648. That is, the load deflection temperature herein refers to the temperature where a deflection of $1/100$ inches is caused to the loaded portion of a sample, and this is determined by placing the sample having a size of 127 mm (length)×12.7 mm (width)×6.4 mm (thickness) on two supporting points of a thermal distortion tester (148-HD-PC, a product of Yasuda Seiki Seisakusho Ltd.), applying a load of 0.45 MPa to the middle point of the sample, and raising the atmosphere temperature at a constant rate. Here, the lens tube preferably has solder reflow resistance. In order to have solder reflow resistance, the lens tube preferably has a load deflection temperature of not lower than 230° C., and more preferably of not lower than 260° C. The maximum load deflection temperature is preferably not higher than 500° C., is more preferably not higher than 400° C., and is still more preferably not higher than 350° C.

Even in the case where the load exceeds 0.45 MPa in measurement of the load deflection temperature, the load deflection temperature (the temperature when the deflection is 1/100 inches) is preferably not lower than 200° C. More specifically, the load deflection temperature under a load of 0.45 MPa is preferably not lower than 200° C., the load deflection temperature under a load of 1.8 MPa is preferably not lower than 200° C., and the load deflection temperature under a load of 1.82 MPa is preferably not lower than 200° C.

Further, the preferable upper limits and lower limits of the load deflection temperatures under a load of 1.8 MPa and a load of 1.82 MPa are the same as the preferable upper limit and lower limit of the load deflection temperature under a load of 0.45 MPa.

Preferable thermoplastic resins constituting the lens tube include polyphenylene sulfide (PPS), liquid crystal polymers (LCP), polyether ether ketone (PEEK), and aromatic polyamides. Use of these thermoplastic resins gives a lens tube that has sufficient thermal resistance and does not cause thermal deformation through the solder reflow process. The thermoplastic resin material is preferably at least one compound selected from the group consisting of polyphenylene sulfide (PPS), liquid crystal polymers (LCP), polyether ether ketone (PEEK), and aromatic polyamides.

The thermoplastic resin constituting the lens tube is more preferably at least one compound selected from the group consisting of LCP, PEEK, and PPS, and is still more preferably an LCP.

The material of the lens tube is preferably harder than a cationically-cured epoxy resin which is a material of a lens supported at an ordinary temperature (25° C.).

The material of the lens tube may be a material containing only a thermoplastic resin component. Still, the material of the lens tube is preferably a thermoplastic resin which is an organic-inorganic composite (such an organic-inorganic composite is also called a thermoplastic resin herein) containing a thermoplastic resin component and an inorganic component including inorganic fibers such as glass fibers and/or inorganic particles such as metal oxide particles. In other words, a preferable embodiment includes an organic-inorganic composite as the thermoplastic resin material. A particularly preferable embodiment of an imaging lens unit of the present invention includes a thermoplastic resin which is an organic-inorganic composite containing inorganic fibers as the inorganic component. The reasons are described below.
(1) The load deflection temperature is high and the thermal expansion coefficient can be lowered.
(2) The thermal-resistant dimensional stability and the shape retention (resistance to the solder reflow process) are excellent.
(3) Materials harder than cationically-cured epoxy resins are industrially available, and a depression can be easily formed in a lens at the time of lens installation.

The amount of the inorganic component is preferably 0.1 to 80% by mass based on 100% by mass of the materials of the lens tube. A particularly preferable material is a thermoplastic resin which is an organic-inorganic composite containing an inorganic fiber as its inorganic component and has a load deflection temperature of not lower than 230° C.

The lens tube material preferably has a water absorption of not more than 3%, more preferably of not more than 1%, and particularly preferably of not more than 0.1%. A water absorption of more than 3% may fog the lenses due to the hydrothermal change. The water absorption is determined by maintaining a sample in water for 24 hours at 23° C., and measuring the weight change.

The average thermal expansion coefficient $\alpha^1$ of the lens tube material in the temperature range of from 25° C. to 260° C. is preferably lower than the average thermal expansion coefficient $\alpha^2$ of the cationically-cured epoxy resin in the temperature range of from 25° C. to 260° C. as described later. Hence, the average thermal expansion coefficient $\alpha^1$ is preferably not higher than 150 ppm/° C., is more preferably not higher than 100 ppm/° C., is still more preferably not higher than 50 ppm/° C., and is particularly preferably not higher than 30 ppm/° C. Further, the lower limit is preferably not lower than 3 ppm/° C., and is more preferably not lower than 5 ppm/° C.

Among them, preferable industrial products are listed below. Preferable examples of the LCP include Sumikasuper LCP series (E6008 (load deflection temperature: 275° C., water absorption: 0.02%), a product of Sumitomo Chemical Co., Ltd.); Zenite series (produced by DuPont); Siveras series (produced by Toray Industries, Inc.); Xydar series (produced by Nippon Oil Corporation); Vectra series (produced by Polyplastics Co., Ltd.); and Octa series (OCTALD-235 (load deflection temperature: 265° C. (1.82 MPa), 280° C. (0.45 MPa)), a product of DIC Corporation).

Preferable examples of the PEEK include Sumiploy K series (produced by Sumitomo Chemical Co., Ltd.), and Victrex series (produced by Victrex plc).

Preferable examples of the PPS include Asahi PPS series (produced by Asahi Glass Co., Ltd.); Idemitsu PPS series (produced by Idemitsu Kosan Co., Ltd.); Sumikon FM MK104 (produced by Sumitomo Bakelite Co., Ltd., (load deflection temperature: not lower than 260° C., water absorption: 0.02%)); DIC-PPS series (FZ-2140-D9 (load deflection temperature: 265° C. (1.82 MPa), not lower than 265° C. (0.45 MPa), water absorption: 0.02%), a product of DIC Corporation); Susteel series (produced by Tosoh Corporation); and Fortron series (produced by Polyplastics Co., Ltd.).

Examples of the aromatic polyamide resin include Kevlar (produced by DuPont); nylon 6T (co-condensation polymer of hexamethylenediamine and terephthalic acid); nylon 6I (co-condensation polymer of hexamethylenediamine and isophthalic acid); nylon 9T (co-condensation polymer of nonane diamine and terephthalic acid); and nylon M5T (co-condensation polymer of methylpentadiamine and terephthalic acid). Among these, nylon 6T and nylon 9T are preferable in terms of industrial availability at low cost, and excellent thermal resistance.

As the method of molding the lens tube, a common molding method such as injection molding, compression molding, cast molding, and transfer molding can be employed. A more preferable method of molding the lens tube is fusion injection molding with use of a mold. Here, it is difficult to use thermoplastic resins having a load deflection temperature of not lower than 200° C. as an optical component such as a lens, in terms of precise processability, transparency, and the like.

The imaging lens unit of the present invention is configured to be processed by a solder reflow process. Formation of an imaging lens unit through the solder reflow process enables automatic implementation of e.g. an implementation substrate for electronic components, which requires soldering, and markedly increases the productivity as compared to production of the lens unit produced without any solder reflow process. Further, the automated process leads to low cost. In the solder reflow process, the lens unit is to be exposed to temperatures of about from 250° C. to 270° C. Hence, one or more lenses constituting the lens unit preferably have sufficient thermal resistance for the solder reflow process (hereinafter also referred to as "solder reflow resistance"). That is, the one or more lenses preferably have solder reflow resistance.

In the present description, "having solder reflow resistance" means maintenance of the shape before and after three-minute heating at 250° C., more preferably at 260° C., and still more preferably at 270° C. When the lens does not have solder reflow resistance and is maintained under the above condition, the shape of the lens will change and thus the optical characteristics will deteriorate.

Further, "maintenance of the shape" means that the change in the shape and the size after application of heat is not more than 20% of the original shape and size (the shape and the size before the solder reflow process). The change in the shape and the size is preferably not more than 5% and is more preferably not more than 1%.

The imaging lens unit of the present invention has, as its essential component, a cationically-cured epoxy resin lens formed from a cationically-curable epoxy resin material. Here, optimization of the physical relation and the positional relation between the lens and the lens supporting portions which are configured to be processed by a solder reflow process is one of the reasons that a lens, which is to be supported by later-described lens supporting portions in a manner that the lens supporting portions bite into the lens, is specified to a cationically-cured epoxy resin. According to the above reasons, the following features (1) to (5) can be provided.

(1) A cationically-cured epoxy resin lens is not likely to be thermally decomposed or melted at temperatures in a solder reflow process. The cationically-cured epoxy resin lens thus has solder reflow resistance. The cationically-cured epoxy resin also has a small thermal expansion coefficient at temperatures from an ordinary temperature to the temperatures in the solder reflow process, and has a small difference in the thermal expansion coefficient from the thermoplastic resin as a material of the lens tube. For example, when a lens is produced from a thermoplastic resin, the lens cannot resist the solder reflow process, and thus causes thermal deformation, melting, and the like. Accordingly, in the case that a thermoplastic resin lens is used for an imaging lens unit, the lens needs to be implemented manually.

(2) A cationically-cured epoxy resin preferably constitutes a lens also in that the thermal expansion coefficient is usually larger than that of the resin as a material of the lens tube (thermoplastic resin having a load deflection temperature of not lower than 200° C.). The reason is that the supporting portions may be in a state where the portions do not come into contact with the lens at the reflow temperatures in heating through the solder reflow process if the thermal expansion coefficient of the resin constituting the lens is smaller than the thermal expansion coefficient of the resin as the lens tube material. As a result, the position of the lens may be misaligned or the lens may fall. That is, a slight size change may lead to a gap between the supporting portions and the lens, thereby deteriorating the characteristics of the imaging lens unit.

In an imaging lens unit, a slight size misalignment results in a large deterioration of the optical characteristics. It is therefore technically significant that displacement of the lens, even if the displacement amount is small, can be prevented. In this way, since a cationically-cured epoxy resin usually has a larger thermal expansion coefficient than the resin as the lens tube material, effects can be achieved that displacement or coming off of the lens hardly occurs even through the solder reflow process.

In the present invention, a later-described embodiment is preferable in which the relation between the average thermal expansion coefficient ($\alpha^1$) of the lens tube in the temperature range of from 25° C. to 260° C. and the average thermal expansion coefficient ($\alpha^2$) of the cationically-cured epoxy resin lens in the temperature range of from 25° C. to 260° C. satisfies $\alpha^2 \geq \alpha^1$. An embodiment with the relation being $\alpha^2 > \alpha^1$ is more preferable.

(3) The cationically-curable epoxy resin preferably contains, as its essential component, a polyfunctional epoxy compound having two or more epoxy groups. Such a polyfunctional epoxy compound causes three-dimensional crosslinking in the curing reaction. The cationically-cured epoxy resin therefore shows restoring performance that the original shape is restored even after expansion and contraction that are caused by heating and cooling in a solder reflow process.

(4) When being disposed in the lens tube having the supporting portions, a cationically-cured epoxy resin can be slightly deformed with the aid of the supporting portions even at an ordinary temperature. For this reason, the cationically-cured epoxy resin can have a structure in which the supporting portions bite into the resin. Here, the deformation occurs locally, and this leads to the characteristic that optical distortion does not occur easily in the substantial lens portion.

(5) A cationically-cured epoxy resin does not chemically adhere much to a thermoplastic resin as the lens tube material, even when forming the supporting structure together with the lens tube material or when the assembly is further processed by the solder reflow process. That is, those resins hardly chemically interact with each other. This means that the resins substantially only expand and contract according to their own expansion coefficients in the solder reflow process. That is, the shape before the solder reflow process is substantially restored.

In contrast, in the case of a combination of a lens material and a lens tube material that adhere to each other, for example, adhesion at the time of heating (expansion) in the solder reflow process can cause problems such as mechanical internal distortion in both resins and displacement of the lens because, when contraction occurs, the resins having different expansion coefficients contract in a state being adhered to each other. Accordingly, when the lens to be supported is a cationically-cured epoxy resin, the positional relations are substantially maintained before and after the solder reflow process.

Further, when a cationically-cured epoxy resin lens is an essential component, the lens can have high transmissivity (being colorless and highly transmissive) of each wavelength in visible light and have transparency. Further, when the lens is disposed in the lens tube having the supporting portions, the lens can be deformed slightly in the aid of the supporting portions. However, deformation occurs locally and does not cause substantial effects on the lens shape or cause a functional deterioration.

Also, merits in production of the lens itself are described below. The cure shrinkage in production of a cationically-cured epoxy resin lens from a cationically-curable epoxy resin material is small, and a cured lens can be produced in a short time. This allows production of a precise lens at low cost.

A cationically-cured epoxy resin lens can have high strength compared to inorganic lenses formed from inorganic materials such as glass. Further, since the cationically-curable epoxy resin material is in a liquid state, it is possible to produce a cationically-cured epoxy resin lens controlled to have a complex, precise shape, which an inorganic lens formed from inorganic materials such as glass cannot easily have, at a high reproducibility and low processing cost in a short time. For example, the processing temperature for an inorganic lens formed from inorganic materials such as glass is not lower than 450° C. at the lowest. Since such a lens needs to be cooled slowly due to the high mold-processing temperature, the productivity is low. Also, the high mold-processing temperature easily fatigues the mold and thus shortens useful life of the mold, whereby the production cost of the lens becomes increased because the mold is expensive. The physical properties, the constituent materials, or other characteristics of cationically-cured epoxy resin lenses will be described in detail later.

In the following, the problems arising in the case of using other materials as the lens material are listed. The imaging lens unit of the present invention can solve those problems, as described above.

(1) The Case that the Lens to be Supported is a Glass Lens

Since glass is hard, it is difficult for supporting portions, formed on the inner wall of the lens tube, to support and fix the lens in a manner that the supporting portions bite into the lens. Further, the thermal expansion coefficient of glass is smaller than that of the lens tube material, and the thus resulting different expansion rates of the glass and the lens tube material in the solder reflow process lead to the state where the supporting portions do not come into contact with the glass at the reflow temperatures. As a result, the glass may be misaligned. That is, a slight size change may result in a gap between the supporting portions and the lens.

(2) The Case that the Lens to be Supported is a Thermoplastic Resin Lens

When formed from a thermoplastic resin having a glass transition temperature (Tg) similar to that of the lens tube material, the lens cannot easily restore the original shape and size in thermal deformation. Thermoplastic resin materials currently proposed as lens resins melt and deform at the solder reflow temperatures, and are therefore not suitable as the lens materials for solder reflow.

The imaging lens unit is provided with a lens group consisting of one or more lenses, and at least one of the one or more lenses may be a cationically-cured epoxy resin lens. For example, in the case that the lens unit has two lenses, structures may be adopted such as that one of the lenses is an inorganic glass mainly containing silicon oxides and the other of the lenses is a cationically-cured epoxy resin lens.

As above, the lenses constituting the lens group should include at least one cationically-cured epoxy resin lens. Here, all the lenses constituting the lens group are preferably cationically-cured epoxy resin lenses. When all the lenses are cationically-cured epoxy resin lenses, it is possible to lower the cost and produce a lens unit having excellent thermal resistance and excellent strength, compared to the case that the lenses are formed from other materials. Further, when the lens materials are different from each other or a crystalline material and an amorphous material are intermingled in the solder reflow process, force arises between the lenses due to the large differences in the thermal expansion and contraction behaviors and the elastic actions in heating and cooling processes. Thus, problems tend to arise in which the optical characteristics slightly change or the lens is misaligned. Using cationically-cured epoxy resin lenses for all the lenses is preferable also in that problems described above can be prevented.

The imaging lens unit has a lens tube formed from a thermoplastic resin material and has a clearance between the lens tube and the cationically-cured epoxy resin lens supported by the lens supporting portions. The lens constituting the imaging lens unit thermally expands in the solder reflow process. Usually, the thermoplastic resin material constituting the lens tube has a thermal expansion coefficient smaller than that of a cured product produced from a curable resin material. For this reason, a cationically-cured epoxy resin lens will thermally expand and press the lens tube when there is no clearance (for example, when a lens is installed by a common press-fitting method). At this time, the pressure generated between the lens tube and the lens distorts the lens. This distortion of the lens due to the thermal expansion can be prevented by providing a clearance between the lens tube and the lens. The term "clearance" herein refers to the clearance between the end of the lens and the inner wall of the lens tube when the lens is disposed in the lens tube. The size of the clearance is the length in the perpendicular direction to the direction in which the light enters (optical axis direction), i.e., in which lenses are arranged. When the lens group consists of cationically-cured epoxy resin lenses, a clearance is preferably provided for all the cationically-cured epoxy resin lenses.

In the imaging lens unit of the present invention, the size of the clearance between the lens tube and the cationically-cured epoxy resin lens supported by the lens supporting portions preferably satisfies the following formula (1). In other words, a clearance is preferably provided between the lens tube and the cationically-cured epoxy resin lens supported by the lens supporting portions so that the following formula (1) is satisfied.

When the lens group consists of multiple epoxy cationic cured lenses, a clearance is preferably provided between the lens tube and all the cationically-cured epoxy resin lenses constituting the imaging lens unit in a manner that the following formula (1) is satisfied. When the lens group includes a lens other than the cationically-cured epoxy resin lens, a clearance is preferably provided between all the lenses and the lens tube in a manner that the following formula (1) is satisfied.

In setting a clearance between the lens tube and a lens other than the cationically-cured epoxy resin lens, the diameter and the average thermal expansion coefficient of the lens concerned may be used instead of L and $\alpha^2$ in the following formula (1).

$$\{L \times (T-25) \times \alpha^2 - B \times (T-25) \times \alpha^1\} \times (1/2) \leq X \tag{1}$$

In the formula,

B represents an inner diameter of the lens tube at an installation place of the cationically-cured epoxy resin lens at 25° C.;

L represents a diameter of the cationically-cured epoxy resin lens at 25° C.;

$\alpha^1$ represents an average thermal expansion coefficient of the lens tube in a temperature range of from 25° C. to 260° C.;

$\alpha^2$ represents an average thermal expansion coefficient of the cationically-cured epoxy resin lens in the temperature range of from 25° C. to 260° C.;

T represents the highest temperature (° C.) in the solder reflow process for the imaging lens unit; and X represents the clearance.

Here, since the solder reflow process is usually performed at the temperatures not lower than the melting point of the solder material, the solder reflow process is usually performed at temperatures not lower than 250° C., and preferably at temperatures around 260° C. Therefore, in setting the clearance X, the T (highest temperature) in the formula (1) is usually preferably 260 (° C.). This allows the imaging lens unit of the present invention to be particularly suitable for the solder reflow process and to be industrially advantageous.

The diameter and the later-described radius of a lens mean the actual diameter and the radius of the lens at a part not in contact with the supporting portions or the like. In the case that the lens has a shape similar to a circle, such as an ellipse, the radius of the lens is the distance from a point on the outer circumference of the lens to the center of the lens. The point on the outer circumference of the lens is one at the shortest distance from the lens tube.

The inner diameter of the lens tube (barrel) is a diameter of the region excluding the height of a projection such as the supporting portions. In the case that the lens has a shape similar to a circle, such as an ellipse, the inner diameter of a portion corresponding to the radius of the lens is adopted as the inner diameter of the lens tube; i.e., the inner diameter of the lens tube is along the straight line passing the center and the point on the outer circumference of the lens.

In the actual imaging lens unit, the diameter of the lens does not mean the diameter of the effective area of the lens, which shows optical effects as a lens (the area for forming an image), but means the diameter of a cured article including the above area in a state where the lens is deposited inside the lens tube.

In the case where the cured product is formed from a material having different multiple linear expansion coefficients (thermal expansion coefficients) owing to the specific shape of the cured product, a linear expansion coefficient near the clearance is used in the formula (1). However, in the case where the thermal expansion coefficient to be used is indefinite and the material has different multiple linear expansion coefficients in each direction (namely, when the material has anisotropy), the maximum value is to be used for the lens and the minimum value is to be used for the lens tube in calculation.

Providing a structure satisfying the formula (1) for the imaging lens unit makes it possible to prevent application of pressure between the lens tube and the cationically-cured epoxy resin lens, whereby deformation of the lens is prevented even when the cationically-cured epoxy resin lens expands in the solder reflow process.

The formula (1) is derived from the following formulas that show the presence of a clearance between the lens tube (barrel) and the lens in the solder reflow process (at the time of thermal expansion) (FIG. 2(a) and FIG. 2(b)):

$$B + B \times \alpha^1 \times (T-25) - \{L + L \times \alpha^2 \times (T-25)\} \geq 0 \ \ X = 1/2(B-L).$$

FIG. 2(a) shows the barrel and the lens at 25° C. In FIG. 2(b), $B \times \alpha^1 \times (T-25)$ represents the thermal expansion of the diameter of the lens tube in the solder reflow process from the diameter at 25° C., and $L \times \alpha^2 \times (T-25)$ represents thermal expansion of the diameter of the lens in the solder reflow process from the diameter at 25° C. Two circles are drawn as dashed-line circles in the figure. The outer circle shows the barrel which has thermally expanded in the solder reflow process and the inner circle shows the lens which has thermally expanded in the solder reflow process. The above formula shows that a clearance is established between those thermally expanded barrel and thermally expanded lens. After the solder reflow process, the original structure before the solder reflow process (the original positional relation between the barrel and the lens) is usually substantially restored. The range of the above clearance X is preferably not more than 1 mm, is more preferably not more than 0.5 mm, is still more preferably not more than 0.2 mm, and is particularly preferably not more than 0.1 mm from the viewpoint of miniaturization of the imaging lens unit.

Now, the preferable range of the clearance X is described. When $X_0$ is defined according to the following equation holds:

$$\{L \times (T-25) \times \alpha^2 - B \times (T-25) \times \alpha^1\} \times (1/2) = X_0,$$

the minimum value of X satisfying the above formula (1) is $X_0$. The minimum value of X is preferably not less than 1.01 times $X_0$, is more preferably not less than 1.1 times $X_0$, and is still more preferably not less than 1.5 times $X_0$. The above minimum value is for the size of the clearance between the lens tube and the cationically-cured epoxy resin lens supported by the lens supporting portions. If the lens group consists of multiple lenses, a clearance is preferably provided for all the lenses in a manner that the above minimum value is satisfied. If $X/X_0$ is less than 1.01, the lens and the lens tube may come into contact with each other in the reflow process to spoil the positional relation of the lens, whereby the resolution may decrease. That is, one reason that $X/X_0$ is set to be not less than 1.01 is that the lens and the lens tube may come into contact with each other in the reflow process depending on the degree of expansion that changes according to the change in the reflow temperature. Another reason is that a highly precise technology for forming or processing the lens and the lens tube is required in production of the imaging lens unit of the present invention; here, if $X/X_0$ is less than 1.01, the production yield of the lens unit may decrease due to even slight ununiformity of the lens units.

The maximum value of X is preferably not more than 100 times $X_0$, is more preferably not more than 10 times $X_0$, and is still more preferably not more than 5 times $X_0$. The reason for setting the maximum value of $X/X_0$ to the values described above is explained in the following. Even if $X/X_0$ exceeds the above maximum value, the performance of the imaging lens unit of the present invention is not adversely affected. Still in view of miniaturization of the lens unit along with demands for miniaturization of the camera modules, $X/X_0$ is desired to be less than the above maximum value. In order to miniaturize the lens unit, it is advantageous to make the clearance as small as possible to thin the lens tube. When the thickness (a) of the lens tube is decreased in this way, the width (b) of each projection as a lens supporting portion needs to be decreased (see FIG. 3(a), FIG. 3(b), and FIG. 3(c)). This is because the lens tube may possibly have sink marks 6 when the width (b) is too large with respect to the thickness (a) as illustrated in FIG. 3(b). As the width of each projection as a lens supporting portion is decreased, it becomes difficult to increase the height (c) of the projection. FIG. 3(c) illustrates an example of the height (c) of each projection as a lens supporting portion. The height of each projection as a lens supporting portion herein is also referred to as the height of the lens supporting portion from the lens tube (barrel).

A ratio of (b)/(a) is preferably 0.7 to 0.8, and is more preferably substantially 0.8.

Also, with respect to the angle of a projection, the projection preferably has a narrow angle to some degree in view of decreasing the area biting into the lens in the reflow process and easing the burden, as illustrated in FIGS. 4(a) and 4(b).

For the above reasons, the size of the clearance between the lens tube and the cationically-cured epoxy resin lens supported by the lens supporting portions (supported lens) is preferably set such that $X/X_0$ becomes the maximum value.

Meanwhile, a lens other than the cationically-cured epoxy resin lens supported by the lens supporting portions (unsupported lens) does not need to have a size satisfying the above maximum value. Still, the diameter of the unsupported lens is preferably slightly smaller than the diameter of the supported lens and the maximum value of the diameter of the unsupported lens is preferably the above maximum value in that, as described below, a constant inner diameter of the lens tube leads lower-cost to production, easy arrangement of the lens in the lens tube, and easy positional adjustment of the lens.

Further, when the imaging lens unit of the present invention has multiple lenses, it is more advantageous, in terms of producing the lens tube (barrel) at low cost, to make the inner diameters of the lens tube constant than to differentiate the inner diameters at the positions where the lenses are to be arranged. Accordingly, it is usually preferable that the inner diameters of the lens tube are constant and the diameter of each lens is determined according to the corresponding average thermal expansion coefficient in a manner that the clearance between each lens and the inner periphery of the lens tube satisfies the formula (1) and is within the above preferable range.

The clearance is provided in order to suppress occurrence of distortion due to the pressure generated between thermally expanded lens and lens tube. The distortion usually occurs when the average thermal expansion coefficient of the lens tube formed from the above thermoplastic resin material is smaller than the average thermal expansion coefficient of the cationically-cured epoxy resin lens. That is, the imaging lens unit of the present invention provides the effect of the present invention more suitably when the average thermal expansion coefficient of the lens tube formed from a thermoplastic resin is smaller than the average thermal expansion coefficient of the cationically-cured epoxy resin lens.

The relation between the average thermal expansion coefficients of the lens tube formed from a thermoplastic resin material and the cationically-cured epoxy resin lens, $\alpha^1/\alpha^2$, preferably results in a value from 0.01 to 1. When the value is less than 0.01, the pressure, generated between the lens tube and the lens at the portion where the lens and the lens supporting portions are in contact with each other, may affect the inner portion of the lens. When the value is more than 1, no pressure may be generated between the lens tube and the cationically-cured epoxy resin lens, and therefore the effect of the present invention may not be sufficiently provided. The maximum value of $\alpha^1/\alpha^2$ is still more preferably not more than 0.5. The minimum value is preferably not less than 0.05. When multiple cationically-cured epoxy resin lenses are included in the lens group, it is preferable that the average thermal expansion coefficient of a cationically-cured epoxy resin lens, which is most largely different from the average thermal expansion coefficient of the lens tube, is taken as $\alpha^2$ and the above formula is satisfied with this value.

It is also preferable that the imaging lens unit has a lens group consisting of multiple cationically-cured epoxy resin lenses, and the difference in the average thermal expansion coefficients of those lenses is not higher than 50 ppm/° C. When the difference in the average thermal expansion coefficients of the cationically-cured epoxy resin lenses constituting the lens group is higher than 50 ppm/° C. and the lenses not supported by the lens supporting portions are fixed by being fitted with each other as described below, the pressure generated between the lenses in the solder reflow process may be large, to cause problems such as a decrease in the lens resolution.

The difference in the thermal expansion coefficients of the lenses constituting the lens unit is more preferably not higher than 30 ppm/° C., is still more preferably not higher than 20 ppm/° C., and is particularly preferably not higher than 10 ppm/° C.

The average thermal expansion coefficient of the cationically-cured epoxy resin lens at temperatures within the range of a room temperature (25° C.) to 260° C. is preferably not higher than 200 ppm/° C. A lens having an average thermal expansion coefficient of higher than 200 ppm/° C. may decrease the resolution in the solder reflow process. The average thermal expansion coefficient of a cationically-cured epoxy resin lens is more preferably not higher than 170 ppm/° C., is still more preferably not higher than 100 ppm/° C., and is particularly preferably not higher than 95 ppm/° C. The average thermal expansion coefficient at temperatures from a room temperature to the highest temperature in the solder reflow process is preferably within the above range.

In the case that the lens unit has two lenses, the average thermal expansion coefficient of each cationically-cured epoxy resin lens is particularly preferably not higher than 100 ppm/° C. In the case that the lens unit has three lenses, high resolution is required and thus the average thermal expansion coefficient of each cationically-cured epoxy resin lens is preferably even smaller. Specifically, the average thermal expansion coefficient is preferably not higher than 95 ppm/° C. Since the average thermal expansion coefficient of a cationically-cured epoxy resin lens is preferably not lower than the average thermal expansion coefficient of a lens tube material, the average thermal expansion coefficient of the cationically-cured epoxy resin lens is preferably not lower than 10 ppm/° C., is more preferably not lower than 30 ppm/° C., and is still more preferably not lower than 50 ppm/° C. The preferable range for $\alpha^2$ in the above formula (1) (average thermal expansion coefficient of the cationically-cured epoxy resin lens in the temperature range of from 25° C. to 260° C.) is the same as that described above.

Here, the average thermal expansion coefficient can be measured by a thermal expansion coefficient measuring device, at an atmospheric pressure (1 atm). Specifically, it is preferable to measure the thermal expansion coefficients of a sample with a size of 10 mm (length)×10 mm (width)×3 mm (thickness) with use of a thermal expansion coefficient measuring device (TMA4000SA, a product of Bruker AXS) at a temperature increase rate of 5° C./min. with a load of 1.0 g, in the measuring temperature range of from 25° C. to 300° C. The average thermal expansion coefficient is the thermal expansion coefficient in average at temperatures within the range of 25° C. to 260° C., and is calculated based on the thickness of a 10 mm×10 mm×3 mm (thickness) molded product at 25° C. The average thermal expansion coefficient of the thermoplastic resin used as the lens tube material can also be measured in the same manner.

The glass transition temperature of the cationically-cured epoxy resin lens is preferably not lower than 80° C. This enables production of a lens having excellent thermal resistance, and suppression of thermal deformation and melting. The glass transition temperature of a cationically-cured epoxy resin lens is more preferably not lower than 150° C., and is still more preferably not lower than 180° C. The maximum value of the glass transition temperature of the cationically-cured epoxy resin lens is preferably lower than 300° C., is more preferably lower than 250° C., and is still more preferably lower than 220° C. This is for increasing the production speed in molding of lenses because a resin with a very high Tg may decrease the productivity.

The above imaging lens unit has a structure in which the lens is supported by supporting portions provided at three or more locations inside the lens tube. With the above clearance, the lens may be displaced because of the gap between the lens and the lens tube, which may affect the characteristics as the lens unit. Supporting the lens at three or more locations inside the lens tube enables fixation of the lens positions and easy production of the lenses. Supporting the lens at only two locations does not enable secure fixation of the lens.

The above lens supporting portions may have any shape as long as they are provided so as to be able to fix the cationically-cured epoxy resin lens. For example, FIG. 5(a) and FIG. 5(b) are plan views of the lens unit seen from the optical axis direction. In FIG. 5(a), a lens tube 1a has, at four locations inside thereof, lens supporting portions 5a each having a triangular shape in a plan view. These lens supporting portions 5a support a lens 4a. Further, in FIG. 5(b), a lens tube 1b has, at four locations inside thereof, lens supporting portions 5b each having a quadrangular shape in a plan view. These lens supporting portions 5b support a lens 4b. In this way, the lens supporting portions are provided in a manner of projecting from the inner wall of the lens tube. Examples of the shape of the lens supporting portions include triangular shapes in a plan view and quadrangular shapes in a plan view. In terms of sufficient suppression of deformation of the cationically-cured epoxy resin lens due to thermal expansion, the shape of the lens supporting portions is preferably triangular. When having a triangular shape, each lens supporting portion will support the lens at one point. This decreases the area in contact with the lens, and thereby decreases the pressure generated between the lens and the lens supporting portions. For example, when the lens supporting portions have a quadrangular shape as illustrated in FIG. 5(b), the lens supporting portions exist in a large proportion in the thermal expansion direction of the lens, and thus the pressure generated between the lens and the lens supporting portions may be large compared to the case of a triangular shape or the like. The above triangular shape and quadrangular shape do not necessarily have completely pointed corners and may have round corners, that is, those shapes also include shapes that can be substantially considered as triangular shapes or quadrangular shapes. The lens supporting portions may be continuous or non-continuous in the optical axis direction along the inner wall of the lens tube when seen from the direction perpendicular to the optical axis. The lens supporting portions may have any structure as long as being able to support at least one lens among one or more lenses, but may preferably be continuous in the optical axis direction along the inner wall of the lens tube corresponding to the position of the lens constituting the lens unit, in terms of sufficient supporting strength as the lens supporting portions.

The imaging lens unit of the present invention more preferably has a structure in which the lens supporting portions support the lens in a manner of biting into the lens. That is, in order to prevent displacement of the lens, such as coming off of the lens from the position where the lens is disposed in the lens tube, during and after the reflow process, the distance from the center of the lens to the vertex of the lens supporting portions (distance from the center of the lens to the supporting portions) is preferably slightly shorter than the distance from the center of the lens to the outermost portion of the lens (lens radius).

This leads to a state where the portions of the lens supporting portions in contact with the lens come inwardly from the outer portion of the lens, and thereby enables remarkable achievement of the effect of the present invention.

The distance from the center of the lens to the peak of the lens supporting portions (distance from the center of the lens to the supporting portions) is preferably shorter than the distance from the center of the lens to the outermost portion of the lens (lens radius). The difference between these distances is preferably less than 0.05 mm and is more preferably less than 0.02 mm. Further, the difference is preferably not less than 0.001 mm and is more preferably not less than 0.01 mm. The minimum value for the above height (c) of each projection as a lens supporting portion is preferably not less than 1.001 times the clearance (X), and is more preferably not less than 1.01 times the clearance (X). The maximum value is preferably less than 3 times the clearance (X), is more preferably less than twice the clearance (X), and is still more preferably less than 1.5 times the clearance (X).

FIGS. 6(a) to 6(e) and FIG. 7 show one embodiment (optical microscope images) of the imaging lens unit of the present invention which has a structure in which the lens supporting portions support the supported lens in a manner of biting into the lens. FIG. 6(a) is a view showing the entire picture of the imaging lens unit. FIG. 6(b) and FIG. 6(c) are enlarged partial sectional views of the respective portions A and B in FIG. 6(a). FIG. 6(d) and FIG. 6(e) are views showing respective contact portions (contact site of the portion A and the contact site of the portion B) of the lens and the lens supporting portions in FIG. 6(a). FIG. 7 is an enlarged view of a contact portion (the contact site of the portion B) of the lens and the lens supporting portion in FIG. 6(a).

FIGS. 6(d) and 6(e) and FIG. 7 show bite marks, i.e., depressions at the contact portions of the lens supporting portions and the lens supported by the lens supporting portions. If the lens tube is formed from a liquid crystal polymer (LCP) and the lens material is a cationically-curable epoxy resin, any imaging lens unit usually has such marks after the reflow process.

Although the bite marks after the reflow process are shown by FIGS. 6(d) and 6(e) and FIG. 7, bite marks can be seen even before the reflow process by adjusting the way of applying light and the viewing angle. That is, bites can be calculated from the diameter of the lens, the inner diameter of the barrel, and the height of a projection as the supporting portion, and the calculated bites are usually from about several micrometers to about ten micrometers, and are not more than 20 micrometers at the largest.

The imaging lens unit of the present invention preferably has depressions at the contact portion on the lens where the lens supported by the lens supporting portions is in contact with the lens supporting portions.

When the lens supporting portions support the lens in the manner of biting into the lens or the lens has depressions at the contact portions with the lens supporting portions, the lens can be supported by stronger fixing force, the positional relation between the supporting portions and the lens hardly changes before and after the heating reflow process, and the imaging lens unit of the present invention can have better optical characteristics. The lens material and the lens tube material for the imaging lens unit of the present invention are preferably selected and the positions and the sizes are preferably adjusted such that the above structure can be provided.

The presence of the above biting structure and depressions can be checked in the following way.

When the lens is removed from the lens tube, the portions at which the lens has been supported, i.e., the portions at which the lens supporting portions provided inside the lens tube have been in contact with the lens, are checked by visual observation or a microscope (optical microscopes or electron microscopes such as FE-SEM) for bite portions and depressions that are different from the original shape of the lens. FIGS. 6(d) and 6(e) and FIG. 7 illustrate one example of the bite portions (depressions).

Here, six supporting portions are provided in the imaging lens unit shown in FIG. 6 in order to adjust fixation of components other than the lens to the barrel, and this is almost irrelevant to improvement of the supporting function. The best number of supporting portions is four from the viewpoint of e.g. productivity, as described later.

In order for the above lens (resin lens) to be supported and fixed in a manner that the supporting portions bite into the lens, the lens tube preferably has supporting portions formed therein beforehand. In other words, the structure of supporting the lens in the imaging lens unit of the present invention is preferably formed by arranging the lens in the lens tube having the lens supporting portions formed therein.

The size of the supporting portions can be suitably set such that the supporting portions bite into the lens.

The structure of having the supporting portions biting into the lens (resin lens) cannot be seen in the case where the supporting portions are formed after the lens has been arranged in the lens tube. In this case of forming the supporting portions after arrangement of the lens, it may be difficult to fix the lens while maintaining the center position of the lens with high accuracy. At this time, the supporting portions do not bite into the lens, and therefore the fixation may be insufficient. Particularly after the solder reflow process, the sizes of the lens tube and the lens slightly change; at this time, the different thermal expansion coefficients of the lens tube and the lens may generate a gap between the supporting portions and the lens. This may displace the lens and deteriorate the characteristics of the lens unit.

The number of locations of the lens supporting portions is not particularly limited as long as it is not less than three, and the number of locations of the lens supporting portions is preferably three to eight. This can surely fix the lens and lead to sufficient proportion of the clearance, thereby suppressing the lens from being distorted. When the lens supporting portions are provided at more than eight locations, the proportion of the clearance may not be sufficient, whereby the pressure generated between the lens and the lens supporting portions may not be sufficiently suppressed. Further, when the number of locations of the lens supporting portions is large, the accuracy required for processing of the lens supporting portions is higher. Accordingly, also from the viewpoint of the productivity, the number of locations of the supporting portions is preferably three to eight. The number of supporting locations for the lens is more preferably three to six, is still more preferably three to four, and is most preferably four. "The proportion of the clearance" herein refers to the proportion of the length for which the lens supporting portions are not provided to the inner circumference of the lens tube.

The proportion of the clearance is preferably not less than 70%. According to this, distortion resulting from the thermal expansion of the lens can be fully suppressed. The proportion is more preferably not less than 80%, is still more preferably not less than 90%, is particularly preferably not less than 95%, and is most preferably not less than 98%.

When the imaging lens unit of the present invention consists of multiple lenses, the structure is not particularly limited and both structures are suitable in which all the lenses are supported by the lens supporting portions and in which a part of the lenses are supported by the lens supporting portions. The above imaging lens unit preferably has a lens group consisting of multiple cationically-cured epoxy resin lenses. Here, at least one of the multiple cationically-cured epoxy resin lenses is preferably supported by the lens supporting portions, and the rest of the cationically-cured epoxy resin lenses are preferably supported by being fitted with the lens supported by the lens supporting portions and/or with the lens tube. When the lenses not supported by the lens supporting portions are fitted with the lens supported by the lens supporting portions and/or with the lens tube, the lenses not fixed by the lens supporting portions as well as the lens fixed by the lens supporting portions are not displaced in formation of the lens unit. Therefore, such a configuration is preferable in that the centers of the lenses and the centers of a light-shielding plate and the diaphragm, for example, are not misaligned.

Further, each lens is preferably provided with a tapered portion in fitting of the lenses, or of the lens and the lens tube. That is, one preferable embodiment of the imaging lens unit of the present invention is that a cationically-cured epoxy resin lens other than one or more cationically-cured epoxy resin lenses supported by the lens supporting portions is provided with a tapered portion, and this tapered portion is fitted with a tapered portion provided to the lens supported by the lens supporting portions and/or to the lens tube. Here, it is particularly preferable to fix a lens not supported by the lens supporting portions by fitting the lenses with one another. When the lens is supported by being fitted with the lens tube, the difference in the thermal expansion coefficients may result in distortion of the lens when the lens thermally expands or the like. Further, in this case, a more preferable embodiment is use of lenses having similar thermal expansion coefficients, which can suppress generation of pressure between the two lenses coming into contact with each other. This structure is preferable for the lens unit. Specifically, the difference in the average thermal expansion coefficients of each lens is preferably not higher than 50 ppm/° C. More preferable range is the same as that for the above difference in the average thermal expansion coefficients. The tapered portion preferably has a slope angle from the optical axis of 5° to 80°, and more preferably of 10° to 50°. In addition, the tapered portion preferably has a slope angle from the optical axis of 5° to 85°, and more preferably of 10° to 50° in both cases of the combination of the lens tube and the lens and the combination of lenses.

One preferable structure of a lens unit having the tapered portion is that when, for example, the lenses to be arranged are referred to, from the light-entering side, as P1, P2, and so forth up to Pn (Pn is on the light-emitting side), the lens P1 preferably has a tapered portion with which a tapered portion provided for the lens tube is fitted such that P1 is fixed. Further, a structure is preferable in which at least one of the lenses P2 to Pn is supported by the lens supporting portions of the lens tube. A particularly preferable structure is that Pn is supported by the lens supporting portions of the lens tube.

In the above case, a structure is also preferable in which a part or all of the lenses are fitted with each other at the tapered portions each formed at a part of each lens. In the following, a preferable structure for supporting a lens is listed.

A preferable structure in the case of two lenses: a structure in which P2 is supported by the lens supporting portions.

A preferable structure in the case of three lenses: a structure in which either P2 or P3 is supported by the lens supporting portions.

A preferable structure in the case of four lenses: a structure in which any one of P2 to P4 is supported by the lens supporting portions.

The relative length (diameter) of each lens in the direction perpendicular to the optical axis is not particularly limited, and it is usually preferable that the relative length of P1 is the smallest. The relative lengths of P2 to Pn are not particularly limited, and are preferably the same as each other or the length of the lens on the light-emitting side has a longer length. This is because such a design can prevent the lens, the lens supporting portions provided in the lens tube, and the like from being mechanically damaged in arrangement of the lens in the lens tube.

The imaging lens unit may or may not include other components as long as it can provide the effect of the present invention. For example, the imaging lens unit may have light selective transmission filters such as a light-shielding plate and an infrared cut filter. The imaging lens unit serves as a camera module when having electronic components such as a CCD (Charge Coupled Device) sensor and a CMOS (Complementary Metal Oxide Semiconductor) sensor.

The above light-shielding plate is not particularly limited and may be a commonly used light-shielding plate. Still, a circular hollow light-shielding plate is preferable. With regard to arrangement of a light-shielding plate, a circular hollow light-shielding plate is preferably arranged between two lenses.

A circular hollow light-shielding plate is a light-shielding plate having a hole at the center thereof, and can be described as, for example, a doughnut-shaped light-shielding plate. This shape is preferable because deformation can be suppressed when the cationically-cured epoxy resin lens and the like thermally expand. Further, a circular hollow light-shielding plate preferably has a thickness of not more than 0.5 mm. If the thickness is more than 0.5 mm, the lens and the light-shielding plate may come into contact with each other when the lens and the like thermally expand, and this may cause distortion. The circular hollow light-shielding plate more preferably has a thickness of not more than 0.4 mm, still more preferably of not more than 0.3 mm, and particularly preferably of not more than 0.2 mm. For those reasons, the imaging lens unit preferably has a structure in which a circular hollow light-shielding plate having a thickness of not more than 0.5 mm is arranged between at least two lenses of the multiple lenses constituting the lens group. The circular hollow light-shielding plate is preferably formed from a metal, and is more preferably formed from SUS such as SUS304. The average thermal expansion coefficient of a circular hollow light-shielding plate at temperatures within the range of 25° C. to 260° C. is preferably 1 to 100 ppm/° C., and is more preferably 10 to 80 ppm/° C. This can suppress deformation of the lens when the lens thermally expands.

The imaging lens unit preferably has a light selective transmission filter (for example, an infrared cut filter, an ultraviolet cut filter, an infrared/ultraviolet cut filter, or the like).

Since a light selective transmission filter allows transmission of light having a certain wavelength, such an embodiment is particularly preferable when the imaging lens unit is used as a camera module or the like. When the imaging lens unit is to have a light selective transmission filter, the light selective transmission filter is preferably solder reflow resistant. In this case, the characteristics of the light selective transmission filter do not deteriorate due to thermal deformation, melting, and the like even when the imaging lens unit having the light selective transmission filter is processed by the solder reflow process. In this way, in one of the preferable embodiments of the present invention, the imaging lens unit has a light selective transmission filter that has solder reflow resistance. When both the lens and the light selective transmission filter have sufficient thermal resistance, automatic implementation is enabled. This leads to a sufficient decrease in the implementation cost, and therefore the imaging lens unit can be suitably used in optical applications such as a camera module.

The lens unit preferably has a thickness of not more than 50 mm. Such a thickness enables the lens unit to be suitably used as various optical components such as a camera module. The lens unit more preferably has a thickness of not more than 30 mm, and still more preferably not more than 10 mm.

In a camera module, a structure is preferable in which the light selective transmission filter is arranged on the CMOS sensor side in the camera module. That is, a structure is preferable in which one or more lenses, a light selective transmission filter, and a CMOS sensor are arranged in the stated order in the light traveling direction.

The lens unit is not particularly limited as long as being able to provide the effects of the present invention, and may have a configuration other than the above configurations.

In the following, preferable characteristics and the like of the lens to be provided in the lens unit are described. The following preferable optical characteristics as the imaging lens unit can be applied for all of the multiple lenses constituting the lens group. Accordingly, when, for example, one of the multiple lenses is inorganic glass, not a cationically-cured epoxy resin lens, the characteristics can be also applied for the inorganic glass.

The lens group consisting of the one or more lenses preferably has, as its essential component, an Abbe's number vd that satisfies the following formula (2).

$$31 \leq vd \leq 62 \qquad (2)$$

That is, at least one of the multiple lenses constituting the lens group preferably satisfies the Abbe's number in the formula (2). If the Abbe's number is less than 31, chromatic aberration may be large and the color of the light transmitted through the lens may be blurred. If the Abbe's number is more than 62, chromatic aberration may be small; however, a large amount of an additive (such as silica) needs to be blended with the cationic curable resin in order to increase the Abbe's number, and this may inhibit curing. The Abbe's number is more preferably in the range of 33 to 60. The lens group preferably has as an essential component a lens having an Abbe's number vd that satisfies the above formula (2) also in terms of the chemical structure of epoxy resins which provides high rate of curing.

The lens group preferably consists of lens materials having an Abbe's number that satisfies the above formula (2). Here, the lens material means a material that constitutes a lens. When the lens material includes multiple kinds of materials, at least one of the multiple kinds of materials preferably satisfies the above formula (2), the lens materials as a whole more preferably satisfy the above formula (2), and all of the multiple kinds of materials constituting the lens material still more preferably satisfy the above formula (2).

The lens group preferably consists of two lenses, and each of the lenses preferably has an Abbe's number vd that satisfies the following formula (3).

$$50 \leq vd \leq 62 \qquad (3)$$

When the above formula (3) is satisfied, each lens has a large Abbe's number, whereby the lens unit has a small chromatic aberration and the color blurring can be further suppressed.

Further, the lens group preferably consists of two lenses and the lens material constituting each lens preferably satisfies the above formula (3). This leads to large Abbe's numbers of the two lenses constituting the lens group, and thus to a lens unit that can suppress color blurring.

When the lens material includes multiple kinds of materials, at least one of the multiple kinds of materials preferably satisfies the above formula (3), the lens materials as a whole more preferably satisfy the above formula (3), and all of the multiple kinds of materials constituting the lens material still more preferably satisfy the above formula (3).

The lens group consists of multiple lenses as described above. In another preferable embodiment, at least one of the multiple lenses is a positive lens and at least one of the multiple lenses is a negative lens. Combining a positive lens and a negative lens enables production of a lens unit having small chromatic aberration, and therefore color blurring and the like can be suppressed.

It is also preferable that the lens group consist of at least one positive lens and at least one negative lens that respectively satisfy the following formulas (3)' and (4) when the Abbe's number of the lens material for the positive lens is referred to as vd+ and the Abbe's number of the lens material for the negative lens is referred to as vd−.

$$50 \leq vd+ \leq 62 \quad (3)'$$

$$31 \leq vd- \leq 40 \quad (4)$$

Use of a positive lens and a negative lens satisfying the above respective formulas also decreases the chromatic aberration, and thus leads to production of a lens unit having a small amount of color blurring.

A positive lens is a lens with positive refractive power, and a negative lens is a lens with negative refractive power. A biconvex lens, having convexes on both faces in the region producing an image, is preferable as a positive lens. A biconcave lens having concaves on both faces in the region producing an image, and a lens having a concave on one face and a convex on the other face are preferable as a negative lens.

When the lens has a large Abbe's number, the refractive index of the lens is preferably not less than 1.48, is more preferably 1.48 to 1.60, and is still more preferably 1.50 to 1.55. When the lens has a small Abbe's number, the refractive index of the lens is preferably 1.55 to 1.65, and is more preferably 1.56 to 1.62.

The value of the refractive index is measured with the d line (589 nm) measured according to the D542 method.

The light transmissivity of the lens in the wavelength range of from 450 to 750 nm is preferably not less than 80%, is more preferably not less than 85%, is still more preferably not less than 90%, and is particularly preferably not less than 95%.

The above lens preferably has a thickness of not more than 1 mm. When the thickness (the maximum thickness of the region which produces images) of the lens is not more than 1 mm, the light path length can be shortened and the lens unit can be made smaller. The thickness of the lens is more preferably not more than 800 μm, and is still more preferably not more than 500 μm.

In the following, detailed description is given for cationically-curable epoxy resin materials constituting the cationically-cured epoxy resin lenses, and the like.

The above cationically-cured epoxy resin lens is formed by cationic-curing a cationic curable resin composition that contains, as its essential components, a cationic curing catalyst and a cationically-curable epoxy resin component serving as the cationically-curable epoxy resin material. The amount of the cationically-curable epoxy resin component for forming a lens is preferably 60 to 100% by mass, is more preferably 80 to 99.9% by mass, and is still more preferably 90 to 99% by mass.

The cationically-curable epoxy resin component is not particularly limited as long as it has at least one epoxy group, and preferably contains, as its essential component, a polyfunctional epoxy compound that has not less than two epoxy groups. The cationically-curable epoxy resin component constituting the resin composition is required to be cationic curable, and is suitably a thermosetting resin or a photocurable resin. The resin composition for forming the cationically-cured epoxy resin lens is preferably a polyfunctional epoxy compound that is cationic-cured with use of a curing catalyst (catalysts such as photolatent curing catalyst and a thermal-latent curing catalyst), in terms of improvement in the curing rate. The cationic curing catalysts are described later.

Preferable examples of the resin composition include (1) a composition which contains a liquid or solid curable resin component; (2) a composition which contains a liquid or solid curable resin component, a curable compound or a solvent (non-curable) that has a lower molecular weight than that of the resin component, and the like; and (3) a composition which contains a liquid or solid non-curable resin component and a curable compound having a lower molecular weight than that of the resin component. Examples of the above composition (3), a composition which contains a liquid or solid non-curable resin component and a curable compound having a lower molecular weight than that of the resin component, include a composition which contains an oligomer component of an acrylic resin such as PMMA and a (meth) acrylate monomer. The "epoxy group" herein means a group having an oxirane ring which constitutes an ether of three-membered ring. Specifically, an epoxy group and a glycidyl group having the structure of an epoxy group are preferable. Epoxy groups such as an epoxycyclohexyl group, and glycidyl groups such as a glycidyl ether group and a glycidyl ester group can be suitably used as the epoxy group.

The cationically-curable epoxy resin component preferably contains at least one compound selected from the group consisting of hydrogenated epoxy compounds, alicyclic epoxy compounds, aliphatic epoxy compounds, and aromatic epoxy compounds. That is, it is preferable to use those compounds singly or in combination as a mixture.

Among those epoxy compounds, hydrogenated epoxy compounds and/or alicyclic epoxy compounds are preferable as essential components of the resin composition in terms of excellent thermosetting properties and easy control of the crosslinking density. Further, use of alicyclic epoxy compounds and/or hydrogenated epoxy compounds makes it possible to increase the Abbe's number, provide excellent optical characteristics, and thus make the lens unit suitable for various applications. Such a resin composition preferably has a total mass of the hydrogenated epoxy compound and the alicyclic epoxy compound (in the case that only one of the compounds is used, the mass of the one compound) of not less than 30% by mass, and more preferably of not less than 50% by mass.

Examples of the alicyclic epoxy compound include alicyclic epoxides such as epoxy resins having an epoxy cyclohexane framework, including 3,4-epoxycyclohexylmethyl-3,4-epoxycyclohexane carboxylate and bis-(3,4-epoxycyclohexyl)adipate; epoxy resins having an alicyclic hydrocarbon ring structure to which an epoxy group is added directly or via a hydrocarbon chain; and epoxy resins containing a heterocyclic ring structure, including triglycidyl isocyanurate. Preferable among these are an epoxy resin having an epoxy cyclohexane framework and an epoxy resin having an alicyclic hydrocarbon ring structure to which an epoxy group is added directly or via a hydrocarbon chain.

As the hydrogenated epoxy compound, compounds such as a completely or partially hydrogenated aromatic epoxy compound are more preferable. Here, the hydrogenated epoxy compound refers to a hydrogenated compound of an epoxy compound, and preferable examples of the hydrogenated epoxy compound include hydrogenated compounds of aromatic polyfunctional glycidyl ether compounds such as bisphenol epoxy resins, including bisphenol A epoxy resins, bisphenol S epoxy resins, and bisphenol F epoxy resins (these hydrogenated compounds are respectively referred to as hydrogenated bisphenol A epoxy compounds, hydrogenated bisphenol S epoxy compounds, and hydrogenated bisphenol F epoxy compounds).

As described above, the resin composition for forming the cationically-cured epoxy resin lens of the present invention is preferably a resin composition that contains an alicyclic epoxy compound, which has an epoxy group and/or a hydrogenated epoxy compound, which has an epoxy group. That is, the cationically-cured epoxy resin lens is preferably a cured product of a resin composition that contains, as its essential component(s), an alicyclic epoxy compound and/or a hydrogenated epoxy compound.

The cationically-cured epoxy resin lens is preferably a cured product of a resin composition that has an average epoxy equivalent within the range of 100 to 3000. The average epoxy equivalent is more preferably 110 to 1400 and is still more preferably 150 to 1000. The average epoxy equivalent shows the mass of the resin composition equivalent to 1 mole of the epoxy group. If the average epoxy equivalent is more than 3000, the thermal expansion coefficient of the lens, which is a cured product, increases. If the average epoxy equivalent is less than 100, the lens, which is a cured product, may be mechanically fragile. That is, controlling the epoxy equivalent brings an average thermal expansion coefficient preferable for the above cationically-cured epoxy resin lens. The epoxy equivalent of the total amount of the resin composition may be calculated by dividing the total mass of a resin composition by the number of moles of the epoxy group contained in the resin composition. That is, the epoxy equivalent of the total amount of the resin composition represents a mass of the resin composition which contains 1 mole of epoxy groups.

When the lens group has multiple cationically-cured epoxy resin lens, the difference in the average epoxy equivalents of the resin composition for forming the respective cationically-cured epoxy resin lenses constituting the imaging lens unit is not more than 200. If the difference in the average epoxy equivalents is more than 200, the thermal expansion coefficients of the lenses may differ from each other. For this reason, when the lenses are fitted with each other at their tapered portions, the difference in the thermal expansion coefficients may generate pressure on the lenses, whereby distortion may occur. The difference in the average epoxy equivalents is more preferably not more than 100, and is particularly preferably not more than 50.

The multiple lenses in the imaging lens unit are formed from a respective epoxy component. Here, the respective lenses are preferably cured products of resin compositions that contain, as their essential components, respective epoxy compounds which contain epoxy compounds each belonging to the same family. Further, the resin composition for producing a lens preferably contains a single epoxy compound in an amount of not less than 50% by mass of the resin component. This decreases the difference in the thermal expansion coefficients of the respective lenses, and therefore damage on the lenses can be prevented.

The resin composition preferably contains, in the resin component, a low molecular weight epoxy resin component and a high molecular weight epoxy resin component in terms of high processability (processability with high accuracy) and excellent processing characteristics such that the cured product does not crack when removed from the mold. Specifically, the resin component preferably has as the essential components an epoxy compound (low molecular weight component) having a molecular weight of less than 700 and an epoxy compound (high molecular weight component) having a molecular weight of not less than 700. This produces a lens unit that satisfies both characteristics of excellent processing characteristics (viscosity, flowability) of the resin composition, and excellent mechanical strength of the lens produced by curing the resin composition.

<Method of Measuring Molecular Weight>

The molecular weight of the compound contained in the resin composition can be measured by gel permeation chromatography (with "HLC-8220GPC", a product of Tosoh Corporation) under the following conditions, for example.

(Measuring Conditions of Molecular Weight)

Column: "TSK-GEL SUPER HZM-N 6.0*150" (produced by Tosoh Corporation)×4

Eluant: Tetrahydrofuran

Flow rate: 0.6 mL/min.

Temperature: 40° C.

Calibration curve: made using a polystyrene standard sample (produced by Tosoh Corporation).

When the lens has a high Abbe's number of not less than 50 (a low-refractive-index lens having a refractive index of less than 1.55), a resin composition mainly containing a hydrogenated epoxy compound and/or an alicyclic epoxy compound is preferably used as the resin component. The total amount of the hydrogenated epoxy compound and/or the alicyclic epoxy compound is preferably not less than 90% by mass of the total resin component. In the lens with a high Abbe's number, the proportion of hydrocarbons having double bonds is preferably less than 20% by mass, and is more preferably less than 10% by mass.

When the lens has a low Abbe's number of not more than 40 (a high-refractive-index lens having a refractive index of not less than 1.55), a resin composition containing, as its essential component, an aromatic epoxy compound is preferably used as the resin component. The amount of the resin composition having an aromatic epoxy compound is preferably not less than 30% by mass, and more preferably not less than 40% by mass of the total resin component. The maximum amount is not more than 100% by mass, and is preferably not more than 80% by mass. In order to increase cationic curability, the resin component preferably further includes an alicyclic epoxy compound and/or a hydrogenated epoxy compound.

In the lens having a low Abbe's number, the amount of hydrocarbons having a double bond is preferably not less than 20% by mass, more preferably not less than 25% by mass, and particularly preferably not less than 40% by mass of the mass of the lens. The maximum amount of hydrocarbons having a double bond is preferably not more than 90%, and is more preferably not more than 70% of the mass of the lens.

The resin composition and the lens to be produced from the resin composition preferably contain a releasing agent. The releasing agent can suitably be a common releasing agent, and is preferably at least one compound selected from the group consisting of $C_8$-$C_{36}$ alcohols, carboxylic acids, carboxylic acid esters, and carboxylates. Containing such a releasing agent, the resin composition cured in a mold can be easily released from the mold, which maintains good appearance of the cationically-cured epoxy resin lens without any scratch on the surface and shows good transparency. For this reason, the resin composition is especially useful as a material of an electric/electronic component or in optical applications.

The amount of the releasing agent is preferably not more than 10% by mass based on 100% by mass of the resin composition. If the amount is more than 10% by mass, problems may arise such that the resin is not easily cured. The amount is more preferably 0.01 to 10% by mass, still more preferably 0.01 to 5% by mass, and particularly preferably 0.1 to 2% by mass based on 100% by mass of the resin composition. This range is preferably applied also to the amount of the releasing agent in the lens.

It is also preferable that the resin composition for forming the cationically-cured epoxy resin lens contains an inorganic component. When containing an inorganic component, the resin composition has high strength and excellent molding processability, and a lens to be produced by curing the composition has a controlled Abbe's number and refractive index (especially a silicon compound has a high Abbe's number). The amount of the inorganic component is preferably 0.01 to 40% by mass, is more preferably 0.1 to 20% by mass, and is still more preferably 0.2 to 15% by mass. As the inorganic component, inorganic fine particles such as metal oxide particles, and inorganic components such as organopolysiloxane are preferable.

When containing inorganic fine particles or polyorganosiloxane, the resin composition preferably contains, as the resin component, an epoxy compound having an Abbe's number of not less than 45, or a composition containing, as its essential component, a hydrogenated epoxy compound and/or an alicyclic epoxy compound. This leads to a cationically-cured epoxy resin having a high Abbe's number.

The resin composition can decrease the thermal expansion coefficient when containing an inorganic component. Further, when the refractive indices of an inorganic component and the resin are made the same, the appearances of the resin composition and the lens to be produced from the resin composition are controlled, transparency can be expressed, and the resin composition can be especially useful as a material of an electric/electronic component or for optical applications. Further, the resin composition can achieve a releasing effect when containing inorganic fine particles. Specifically, when the resin composition contains for example a thermosetting resin (especially an epoxy compound) as the resin component, the resin component shows adhesiveness, and therefore such a resin composition may adhere to the mold when cured. When an appropriate amount of inorganic fine particles is added, the resin composition provides a releasing effect and can be easily released from the mold. The inorganic fine particles are not particularly limited as long as they are of inorganic compounds such as metal and metal compounds. The inorganic fine particles are preferably of metal oxides, and are more preferably of silica.

In the following, description is given for inorganic fine particles which are an inorganic component suitably used for the resin composition for forming the cationically-cured epoxy resin lens.

The inorganic fine particles are not particularly limited as long as they are fine particles of inorganic compounds such as metal and metal compounds. Examples of the inorganic component of the inorganic fine particles include oxides, hydroxides, (oxy)nitrides, (oxy)sulfides, carbides, halides, sulfates, nitrates, (basic) carbonates, and (basic) acetates of metals. Among these, oxides of metals (metal oxides) are preferable.

The above inorganic fine particles include particles the surfaces of which have been processed in order to improve compatibility of the particles with the resin, dispersibility, and the like. The surface treating agents are not particularly limited, and may be any of various organic compounds, inorganic compounds, organic metal compounds, and the like so that an organic chain or a polymer chain is introduced to the fine particle surface or the charge of the surface is controlled. For example, preferable compounds are listed below:

(1) Coupling agents such as silane coupling agents, titanate coupling agents, aluminate coupling agents, and zirconium coupling agents; and organic metal compounds such as metal alkoxides, (partial) hydrolysis condensates of these, and metal soaps;

(2) Organic compounds such as organic amines, β-diketone compounds, and carboxylic acids;

(3) In addition to conventionally known polymer dispersing agents, (co)polymers of vinyl monomers such as (meth) acrylic resin monomers, polystyrene resin monomers, polyolefin monomers, polyvinyl acetate resin monomers, and acrylic silicone monomers; alkyd resin polymers; amino resin polymers; epoxy resin polymers; polyamide resin polymers; polyimide resin polymers; polyurethane resin polymers; polyester resin polymers; phenol resin polymers; organopolysiloxane polymers; polyalkylene glycol polymers; polymer compounds such fluororesin polymers; and modified products thereof;

(4) Various surfactants (such as cationic, anionic, amphoteric, or nonionic); and (5) Alkali metal ion, halogen ion.

The metal element (M) in the metal oxides is not particularly limited, and examples thereof include alkaline earth metal elements such as Be, Mg, Ca, Sr, Ba, and Ra; lanthanide metal elements such as La and Ce; actinide metal elements such as Ac; IIIa group metal elements such as Sc and Y; IVa group metal elements such as Ti, Zr, and Hf; Va group metal elements such as V, Nb, and Ta; VIa group metal elements such as Cr, Mo, and W; VIIa group metal elements such as Mn, Tc, and Re; VIII group metal elements such as Fe, Co, Ni, Ru, Rh, Pd, Os, Ir, and Pt; Ib group metal elements such as Cu, Ag, and Au; IIb group metal elements such as Zn, Cd, and Hg; IIIb group metal elements such as Al, Ga, In, and Tl; IVb group metal elements such as Si, Ge, Sn, and Pb; Vb group metal elements such as Sb and Bi; and VIb group metal elements such as Se and Te. Each of these may be used alone or two or more of these may be used in combination. For example, Ti, Zr, In, Zn, La, Al, and the like are preferable in the case that a cationically-cured epoxy resin lens having an optical characteristic of a high refractive index is required, and Si is preferable in the case that a cationically-cured epoxy resin lens having a low refractive index is required.

The shape of the inorganic fine particles is not particularly limited. Specific examples of the shape include spherical shapes, elliptic spherical shapes, cubic shapes, rectangular shapes, pyramidal shapes, acicular shapes, columnar shapes, rod shapes, tubular shapes, scaly shapes, and sheet shapes including (hexagonal) plate shapes.

As the inorganic fine particles, inorganic fine particles produced by liquid phase synthesis, particularly the later-described metal oxide fine particles produced by liquid phase synthesis, are preferable. For example, the later-described inorganic fine particles of hydrolysis condensates of an alkoxide compound and/or a carboxylate compound are preferable in terms of better dispersibility in a resin composition and a cationically-cured epoxy resin lens producible by curing the resin composition, than that of inorganic fine particles produced by vapor phase synthetic.

Suitable methods of blending the inorganic fine particles into the resin component are an external addition method and an internal deposition method. Now, the external addition method of the inorganic fine particles, specifically the way of addition of the inorganic fine particles to the resin composition, and dispersion produced thereby are described.

The inorganic fine particles (for example, metal oxide particles or the like) are preferably in the state where the particles are dispersed in an organic solvent (dispersion in solvent), and the inorganic fine particles are preferably mixed with the resin component. The amount of the inorganic fine particles in a dispersion solvent is not particularly limited. The amount is preferably 10 to 70% by weight, and more preferably 20 to 50% by weight of the total amount of the dispersion solvent. The dispersion solvent can be easily handled if the amount of the inorganic fine particles is in such a range. The amount of the solvent in the dispersion solvent is not particularly limited. The amount is preferably 90 to 30% by weight, and more preferably 80 to 50% by weight of the total amount of the dispersion solvent. As the inorganic fine particles in the dispersion solvent, inorganic fine particles having the surfaces thereof processed with any of the above surface treating agents are preferable in terms of excellent dispersibility in the lens.

Examples of the organic solvent include alcohols, ketones, aliphatic and aromatic carboxylic esters, ethers, ether esters, aliphatic and aromatic hydrocarbons, halogenated hydrocarbons, mineral oils, vegetable oils, wax oils, and silicone oils.

The particle size of the fine particles in the above inorganic fine particles and the particle dispersion for preparing the resin composition is preferably small in that a transparent resin composition can be produced, and that the resin composition can produce larger effects of blending fine particles (for example, reduction of the thermal expansion coefficients, improvement of the Abbe's number, controllability of the refractive index, and the like). Specifically, the primary particle size of fine particles is 1 nm to 400 nm, is more preferably not more than 100 nm, is still more preferably not more than 50 nm, and is particularly preferably not more than 20 nm. The primary particle size of the fine particles can be measured for example by a method of measuring the inertia radius according to the small angle X ray scattering; a method of measuring the particle size of one or some particles with use of an electron microscope; or a method of measuring the specific surface diameter Ds (nm)=6000/($\rho \times$S) (where $\rho$: the true specific gravity of metal oxide particles, and S: the specific surface area (m$^2$/g) of the metal oxide particles measured by the B.E.T. method) by the specific surface measuring method, or measuring, in the case of a crystalline material, the crystallite diameter by X diffraction measurement.

The dispersed particle size of the fine particles in the above dispersion solvent is preferably the same as or close to the primary particle size; specifically, the average particle size is not more than 400 nm, is more preferably not more than 70 nm, and is particularly preferably not more than 30 nm. Further, the dispersed particle size can be evaluated by dynamic light scattering, centrifugation, or the like. The primary particle size and the dispersed particle size in the resin composition are preferably in a similar range to that in the case of the dispersion solvent, and can be evaluated by the above small angle X ray scattering or the like.

The inorganic fine particles for the above external addition method can be inorganic fine particles produced by a known method such as liquid phase synthesis, vapor phase synthesis, and solid phase synthesis. Among these, wet particles (wet inorganic fine particles) produced by the liquid phase synthesis are preferable in that they contribute to production of a lens having excellent transparency. The resin composition for forming a cationically-cured epoxy resin lens preferably has wet inorganic fine particles as its essential ingredient.

As the liquid phase synthesis, sedimentation methods are preferably used such as decomposition sedimentation with an acid and an alkali, hydrolysis condensation of an organic metal compound, hydrolysis condensation of a metal halide, and hydrothermal reaction. Preferable among these are decomposition sedimentation with an acid and an alkali, such as a production method of silica particles by neutralization of a water glass solution with alkali; and hydrolysis condensation of an organic metal compound, particularly an alkoxide compound (preferably metal alkoxide) and/or a carboxylate compound (preferably carboxylic acid metal salt).

As the method of adjusting the resin composition containing the above inorganic fine particles, a method of producing inorganic fine particles by hydrolyzing and condensing an alkoxide compound and/or a carboxylate compound in a liquid medium containing the above resin component (internal deposition method) is also suitable as well as the external addition method of adding the inorganic fine particles to the resin component. When a hydrolysis condensate is produced in a liquid medium containing a resin component, a resin composition can be produced which has inorganic fine particles finely dispersed in the matrix of the resin. Therefore, a lens produced from a resin composition prepared by the internal deposition method has excellent transparency.

As the above inorganic component in the lens, polyorganosiloxane is also suitable. As the polyorganosiloxane, conventional polyorganosiloxane can be employed, and examples thereof include linear polysiloxanes having the basic repeating unit such as phenyl siloxane units, dialkyl siloxane units, and alkylphenyl siloxane units, including polydimethylsiloxane, poly methylphenyl siloxane, and polydiphenyl siloxane; polysilsesquioxane compounds such as polymethylsilsesquioxane or polyphenyl silsesquioxane having a structure of a cage or rudders, or in a particulate state; and modified silicone compounds such as carboxyl-group modified silicone compounds, alcohol-modified silicone compounds, amine-modified silicone compounds, polyether-modified silicone compounds, and epoxy-modified silicone compounds. When a polyorganosiloxane is to be contained in a resin composition, the amount is preferably in the range of 0.01 to 10% by mass, and more preferably in the range of 0.1 to 2% by mass based on the total amount of the resin composition. Polyorganosiloxane is applicable to both a lens with a high Abbe's number and a lens with a low Abbe's number.

The resin composition preferably contains a cationic curing catalyst as its essential component. This improves the curing rate, and thus improves the productivity.

A resin composition containing a cationic curing catalyst leads to storage stability better than that of a resin composition containing a curing agent. Further, the cationic curing catalyst makes it possible to increase the curing rate of the resin composition and to contribute to high productivity in production of a cationically-cured epoxy resin lens. Furthermore, the cationically-cured epoxy resin lens to be produced will have excellent thermal resistance, transparency, and mechanical characteristics.

As the above cationic curing catalyst, a thermallatent curing catalyst (thermal acid generator) or an photolatent curing catalyst (photoacid generator) are preferable. The cationic curing catalyst is not particularly limited as long as it can, upon application of heat or light, produce cationic species that start polymerization. A thermallatent curing catalyst excites a compound containing cationic species when heat is applied, and this initiates a thermal decomposition reaction. Thereby, thermal curing proceeds. An photolatent curing catalyst excites a compound containing cationic species when light is applied, to cause photolytic reaction. Thereby, photocuring proceeds. As the cationic curing catalyst, a thermallatent curing catalyst is preferable. As above, the resin composition preferably contains a thermallatent curing catalyst.

Thermallatent curing catalysts are also called thermallatent curing agents or thermallatent cation generators, and provide the substantial function as curing agents when the temperature of the resin composition reaches the curing temperature.

Even when contained in the resin composition, a thermallatent curing catalyst, unlike a later-described curing agent, does not cause an increase in the viscosity or gelation with time. Further, a thermallatent curing catalyst provides a one-part resin composition (one-part optical material) that sufficiently promotes a curing reaction, provides excellent effects, and has excellent handling properties. The organic resin component of the resin composition containing a cationic curing catalyst preferably contains an alicyclic epoxy compound or a hydrogenated epoxy compound in terms of improvement in the curing rate, and preferably contains an alicyclic epoxy compound in terms of reduction of the catalyst amount. The catalyst amount (usage) of the above thermallatent curing catalyst is preferably 0.01 to 10% by mass in the solid content equivalent (the amount of active ingredients excluding the solvent and the like), more preferably 0.05 to 2.0% by mass, and still more preferably 0.2 to 1.0% by mass, based on 100% by mass of the resin composition. When the amount of the catalyst is reduced too much to less than 0.01% by mass, curing proceeds slowly. In contrast, when the amount of the catalyst is increased to more than 10% by mass, coloring may occur in the resin composition in curing or in heating the cationically-cured epoxy resin lens, which is a cured product of the composition. For example, in the case that a cationically-cured epoxy resin lens is produced and then the lens is implemented through the solder reflow process, the lens is required to have thermal resistance for temperatures not lower than 200° C. Also in this case, in terms of transparency, the amount of the catalyst is preferably not more than 1% by mass and more preferably not more than 0.6% by mass, based on 100% by mass of the resin composition containing an organic resin component and other components according to need.

Also, in the case that the resin composition contains the above thermallatent curing catalyst, the moisture resistance of the cationically-cured epoxy resin lens, which is a cured product of the resin composition, is dramatically improved. The lens thus maintains the excellent optical characteristics of the resin composition even under severe use environments, and therefore can be suitably used for various applications. Usually, when contained in a resin composition or a lens produced from the resin composition, the moisture, having a low refractive index, causes turbidity in the lens. The turbidity, however, can be suppressed by a thermallatent curing catalyst because the catalyst provides excellent moisture resistance. Hence, the resin composition can be suitably used for optical applications such as a lens.

As the above thermallatent curing catalyst, a thermallatent curing catalyst is preferable which can be represented by the following general formula (5):

(wherein Z represents at least one element selected from the group consisting of S, Se, Te, P, As, Sb, Bi, O, N, and halogen elements; $R^1$, $R^2$, $R^3$, and $R^4$ are the same as or different from each other, and represent an organic group; d, e, f, and g are 0 or a positive number, and the sum of d, e, f, and g is equal to the valence of Z; the cation $(R^1_d R^2_e R^3_f R^4_g Z)^{+s}$ represents an onium salt; "A" represents a metal element or a metalloid element serving as the central atom of a halide complex, and is at least one element selected from the group consisting of B, P, As, Al, Ca, In, Ti, Zn, Sc, V, Cr, Mn, and Co; X represents a halogen element; s represents the net electric charge of the halide complex ion; and n represents the number of the halogen elements in the halide complex ion).

Specific examples of the anion $(AXn)^{-s}$ in the above general formula (5) include tetrafluoroborate ($BF_4^-$), hexafluorophosphate ($PF_6^-$), hexafluoroantimonate ($SbF_6^-$), hexafluoroarsenate ($AsF_6^-$), and hexachloroantimonate ($SbCl_6^-$).

Further, anions represented by the general formula AXn (OH)⁻ can also be used. Examples of other anions include perchlorate ions ($ClO_4^-$), trifluoromethylsulfiteions ($CF_3SO_3^-$), fluorosulfonic acid ions ($FSO_3^-$), toluenesulfonic acid ions, and trinitrobenzenesulfonic acid ions.

Examples of the specific products of the heat latency curing catalyst include the following products.

Diazonium salt type: AMERICURE series (produced by American Can Company), ULTRASET series (produced by Adeka Corporation), and WPAG series (produced by Wako Pure Chemical Industries).

Iodonium-salt type: UVE series (produced by General Electric Company), FC series (produced by Sumitomo 3M Limited), UV9310C (produced by GE Toshiba Silicones Co., Ltd.), Photoinitiator 2074 (produced by Rhone Poulenc S.A.), and WPI series (produced by Wako Pure Chemical Industries).

Sulfonium salt type: CYRACURE series (produced by in Union Carbide Corporation), UVI series (produced by General Electric Company), FC series (produced by Sumitomo 3M Limited), CD series (produced by Satomer Corporation), Optomer SP series and Optomer CP series (produced by Adeka Corporation), San-Aid SI series (produced by Sanshin Chemical Industry Co., Ltd.), CI series (produced by Nippon Soda Co., Ltd.), WPAG series (produced by Wako Pure Chemical Industries), and CPI series (produced by San-Apro Ltd.).

In addition to the above resin, releasing agent, inorganic particles, and the like, the resin composition for forming the cationically-cured epoxy resin lens according to the present invention may contain, a reactive diluent, a saturated compound without an unsaturated bonding, a pigment, a dye, an antioxidant, an ultraviolet ray absorbent, a photostabilizer, a plasticizer, a non-reactive compound, a chain transfer agent, a thermal polymerization initiator, an anaerobic polymerization initiator, a polymerization inhibitor, an inorganic or organic filler, an adhesion improver such as a coupling agent, a thermostabilizer, an antimicrobial and antifungal agent, a fire retardant, a matting agent, an antifoaming agent, a leveling agent, a wetting and dispersing agent, an anti-settling agent, a thickening and anti-dripping agent, a color-separation inhibitor, an emulsifier, an anti-slip and anti-scratch agent, an anti-skinning agent, a drying agent, an anti-staining agent, an antistatic agent, a conductive agent (electrostatic aid), and the like.

As a curing method of the above resin composition, various methods such as heat curing and photo curing can be suitably employed. Here, a method is suitably used in which the resin composition is applied to a mold having a shape corresponding to the cationically-cured epoxy resin lens, the composition is cured, and then a cationically-cured epoxy resin lens is removed from the mold. In such a method, the resin composition preferably has a viscosity that does not remarkably increase, in terms of easy handling. That is, the viscosity of the resin composition after three days of storage at 25° C. is preferably not greater than 200% of the viscosity of the composition right after mixing. If the viscosity exceeds 200%, application of the composition to the mold may be difficult, and the fluidity of the composition within the mold may be adversely affected. The viscosity is more preferably not greater than 180%, and is still more preferably not greater than 150%. As above, a resin composition is also suitable which shows, in a one-part mixture after three days of storage at 25° C., a viscosity of not more than 200% of the viscosity of the mixture right after mixing.

As the method of curing the above resin composition to produce a cationically-cured epoxy resin lens, a common method can be suitably used. Here, a method of curing the resin composition within five minutes to produce the lens is preferable. Specifically, it is preferable to apply the resin composition to a mold having a shape corresponding to the cationically-cured epoxy resin lens and cure the composition within five minutes. Curing with use of a mold in a short time leads to a highly economical method. As above, a production method is also preferable in which the resin composition is cured to produce a cationically-cured epoxy resin lens, and in curing, the resin composition is cured within five minutes.

If the above curing time (curing time with use of a mold) is more than five minutes, the productivity decreases. The curing time is more preferably within three minutes, is still more preferably within two minutes, and is most preferably within one minute. The above curing time can be appropriately set according to the resin composition to be cured and the like, and is preferably 80° C. to 200° C., is more preferably 100° C. to 180° C., and is still more preferably 110° C. to 150° C. Specifically, the composition is preferably cured within three minutes at 110° C.

In the above curing method, the cured product is required to have a hardness that is enough to be removed from the mold and maintain its shape. That is, the cured product preferably has a curing strength (hardness), which suppresses the rate of change in the shape of the cured product after pressing with a force of not less than 1 kgf/cm$^2$, of not more than 10%. The rate of change is preferably not more than 1%, is more preferably not more than 0.1%, and is still more preferably not more than 0.01%.

After the above resin composition is cured within five minutes in a mold, the cationically-cured epoxy resin lens is removed from the mold and is preferably postcured (baked). Postcuring provides a sufficient hardness to the cationically-cured epoxy resin lens, and thus makes the lens suitable for various applications. In postcuring, a mold is not necessary because a cationically-cured epoxy resin lens already having a certain degree of hardness is further cured. Therefore, a large amount of products can be postcured in a small area.

In the above postcuring, the curing temperature and the curing time can be appropriately set according to the resin composition to be cured and the like. For example, the curing temperature is preferably 80° C. to 260° C., and is more preferably 100° C. to 220° C. The curing time of postcuring, although depending on the curing temperature, is preferably 1 to 48 hours, is more preferably 1 to 10 hours, and is still more preferably 2 to 5 hours.

The imaging lens unit of the present invention may be a lens unit being set (designed) to be processed by the solder reflow process, i.e., a lens unit before being processed by the solder reflow process, or may be a lens unit having a configuration that satisfies the configuration of the present invention after the reflow process.

One preferable embodiment of the imaging lens unit of the present invention is a lens unit produced through the solder reflow process, i.e., a lens unit that substantially has the configuration of the present invention after having been processed by the solder reflow process.

The present invention is also a method of producing an imaging lens unit, the method including a process of producing the imaging lens unit of the present invention. The method of producing the imaging lens unit of the present invention may be a method of producing an imaging lens unit before the solder reflow process, or may be a method of producing an imaging lens unit after the solder reflow process. The method includes production of an imaging lens unit both before and after the solder reflow process.

A preferable embodiment of the production method according to the present invention is a method of producing an imaging lens unit to be processed by the solder reflow process. This method is a method of producing an imaging lens unit including a lens group consisting of one or more lenses; and a lens tube that supports the lens group, wherein the imaging lens unit has, as its essential component, one or more cationically-cured epoxy resin lenses formed from a cationically-curable epoxy resin material, the lens tube is formed from a thermoplastic resin material having a deflection temperature under load of not lower than 200° C., and the imaging lens unit has a clearance between the lens tube and at least one of the cationically-cured epoxy resin lenses and has lens supporting portions that are provided at at least three locations inside the lens tube and that support the at least one cationically-cured epoxy resin lens.

Further, the above production method is particularly preferably a method of producing an imaging lens unit for a camera module, the method including a process of sending the imaging lens unit of the present invention mounted on a camera module to the solder reflow process.

Another preferable embodiment of the present invention is a method of using an imaging lens unit, including processing the imaging lens unit of the present invention by the solder reflow process.

Use of the imaging lens unit of the present invention in such a way enables production of an imaging lens unit with reduced size and weight, and high capabilities, without deteriorating the optical characteristics.

In the case that the solder reflow process is employed, components to be processed by the process are required to have sufficient thermal resistance for the reflow temperatures because the reflow oven is heated by heated air, infrared rays, and the like. In the method of using the imaging lens unit of the present invention, the imaging lens unit has the above configuration, and thus can sufficiently provide the effects resulting from the solder reflow process.

Another preferable embodiment of the present invention is a camera module that has the imaging lens unit of the present invention mounted thereon and is produced through the reflow process.

Further, a method of producing a camera module by sending the camera module having the imaging lens unit of the present invention mounted thereon to the reflow process is also a preferable embodiment of the present invention.

That is, a preferable embodiment of the imaging lens unit of the present invention is that the imaging lens unit mounted on a camera module is processed by the solder reflow process and is used for the camera module application.

Here, examples of the preferable embodiment of the present invention include cellular phones having the camera module of the present invention, and digital cameras having the camera module of the present invention.

The imaging lens unit of the present invention is suitably applied to camera modules or products with optical components having the camera modules. Such applications make it possible to realize miniaturization of the body and sophistication of the performance, which are required for some products such as camera modules. Also, benefits from production through the solder reflow process can be provided while the camera modules can be produced at high productivity without the optical characteristics being deteriorated. Accordingly, it is possible to provide inexpensive optical products that have excellent optical characteristics and can be produced at excellent productivity.

Effects of the Invention

The imaging lens unit of the present invention has the above configuration and has sufficient thermal resistance for the temperatures of the solder reflow process. Even when the imaging lens unit is subject to the solder reflow process, the optical characteristics are not deteriorated in alignment of the centers of the lens and the diaphragm. The imaging lens unit also provides excellent optical characteristics such as excellent transmissivity, and refractive index, and therefore can contribute to miniaturization of the body size and sophistication of the performance. The imaging lens unit can be suitably used for various applications such as opto device applications, display device applications, machine components, and electric/electronic components.

BEST MODE FOR CARRYING OUT THE INVENTION

The present invention is described in more detail based on the following Examples. The present invention is not limited to these Examples. Here, "part(s)" means "part(s) by weight" and "%" means "% by mass" unless otherwise stated.

In each of Embodiments 1 to 9, Comparative Examples 1 to 3 and 5 to 7, ten samples were produced for evaluation. In Comparative Example 4, the lens was melted and deformed as described later, and the resolution after the reflow could not be measured.

Embodiment 1

Figure 8:
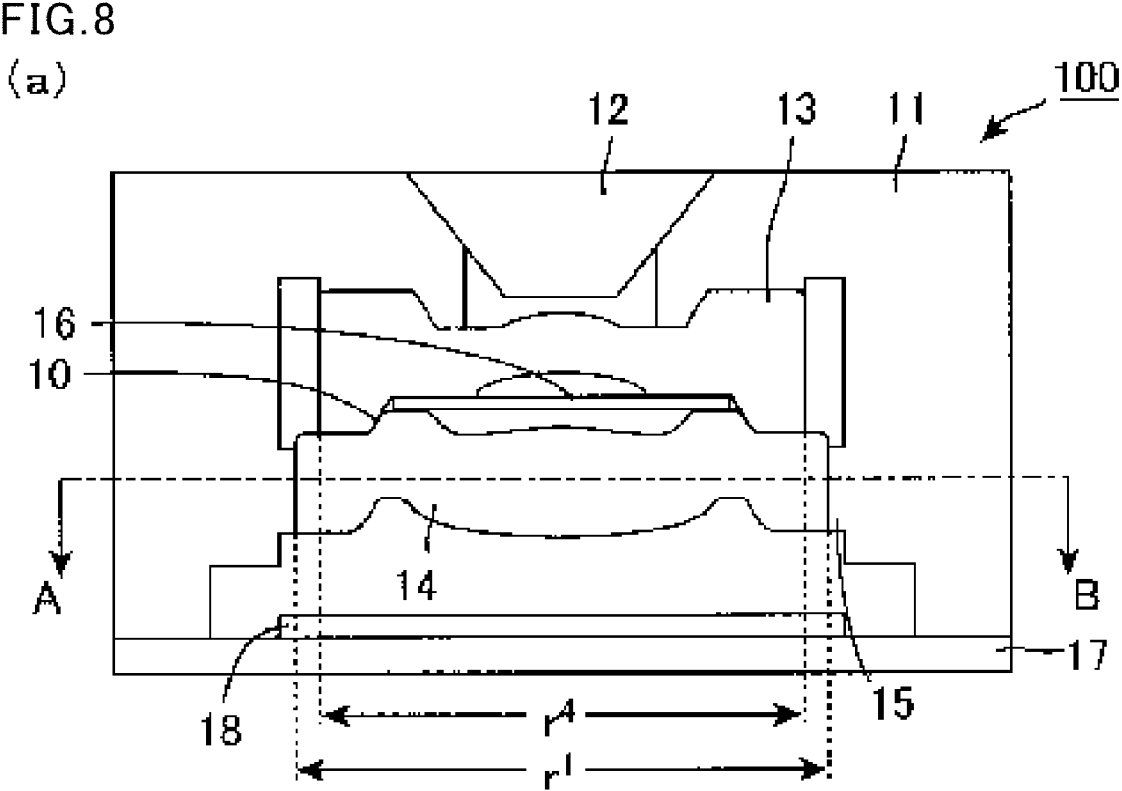
FIGS. 8(a) and 8(b) are cross-sectional schematic views illustrating the structure of an imaging lens unit according to Embodiment 1.
Figure 8:
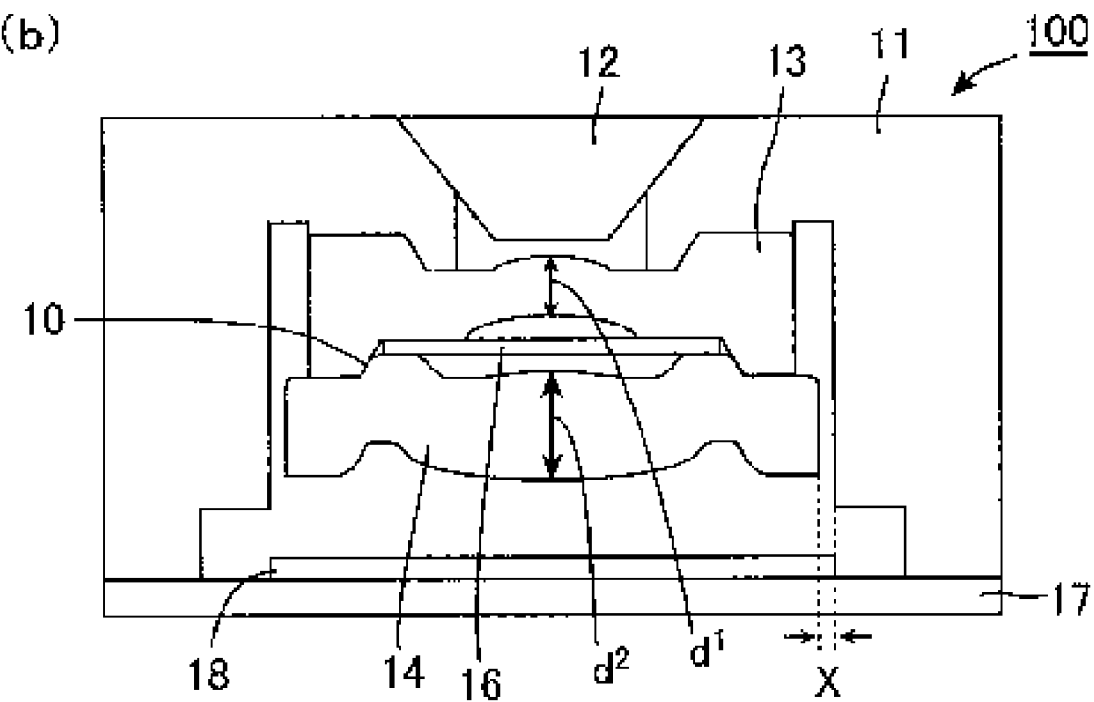
Figure 9:
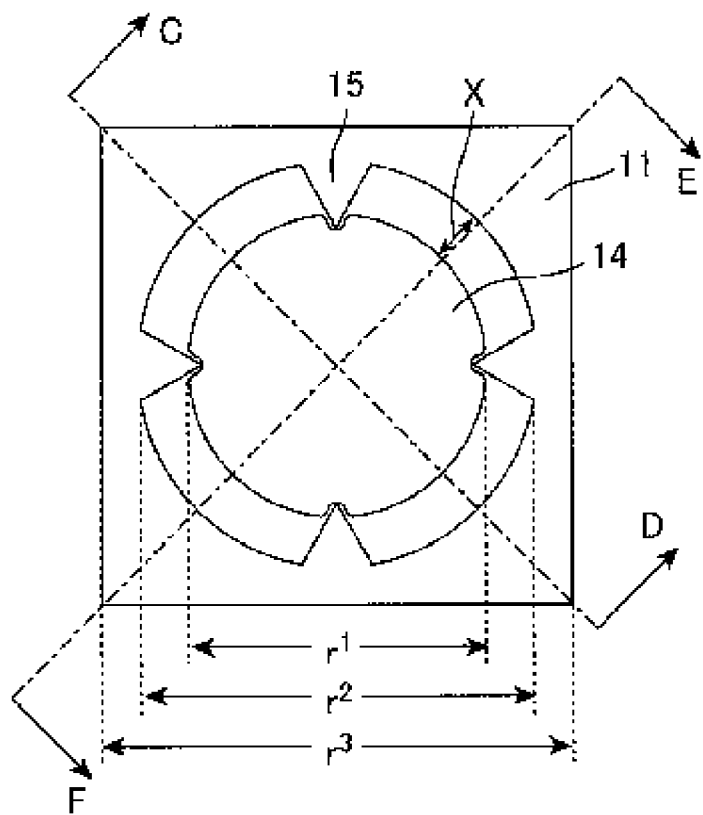
FIG. 9 is a schematic plan view of the imaging lens unit along the line A-B in FIG. 8(a).

FIGS. 8(a) and 8(b) are cross-sectional schematic views of an imaging lens unit according to Embodiment 1: FIG. 8(a) is a cross-sectional view at the position of supporting portions; and FIG. 8(b) is a cross-sectional view at an angle 45° off the above position. FIG. 9 is a schematic plan view of the lens unit of FIG. 8 along the line A-B in FIG. 8(a). As illustrated in FIG. 9, the imaging lens unit according to Embodiment 1 has lens supporting portions 15 that are in contact with a second lens 14 in a manner to support the lens.

An imaging lens unit 100 according to Embodiment 1 has a first lens 13 and the second lens 14 stacked inside a barrel (lens tube) 11, as illustrated in the cross-sectional schematic views of FIGS. 8(a) and 8(b). The barrel 11 is a square pillar that has openings at the top and the bottom (here, the upper side in FIG. 8 is referred to as the top, and the lower side in FIG. 8 is referred to as the bottom), and has a cylindrical hollow inside thereof. As illustrated in FIG. 9, the length of one side $r^3$ of the barrel 11, which is a square pillar, in a plan view is 4.5 mm, and the inner diameter $r^2$ of the barrel 11 is 2.3 mm.

The barrel 11 has a diaphragm 12 in the opening at the top, and the following lenses are provided under the diaphragm 12 in the order of: the first lens 13 that is circular and has a diameter $r^4$ of 2.1 mm and a thickness $d^1$ at the center of the optical axis of 0.3 mm; and the second lens 14 that is circular and has a diameter $r^1$ of 2.2 mm and a thickness $d^2$ at the center of the optical axis of 0.5 mm. Between the first lens 13 and the second lens 14, a circular hollow light-shielding plate 16 is arranged which has an inner diameter (diameter of the circular hollow) of 1.3 mm, an outer diameter (diameter of the light-shielding plate) of 1.8 mm, and a thickness of 0.05 mm. The barrel 11 has the lens supporting portions 15 formed on the inner wall thereof, and the lens supporting portions 15 support the second lens 14. The height of the lens supporting portions 15 from the inner wall of the barrel 11 is 0.06 mm (0.05+0.01) mm. The first lens 13 and the second lens 14 are fitted with each other at a tapered portion 10, and the first lens 13 is fixed without being supported by the lens supporting portions. Here, the angle of the tapered portion 10 to the horizontal plane is 45°.

The barrel 11 is produced from a thermoplastic resin that has reflow resistance and contains an LCP of OCTALD-235

(a product of DIC Corporation; thermal deflection temperatures (testing method: ASTM D648): the load deflection temperature is 265° C. under a load of 1.82 MPa; and the load deflection temperature is 280° C. under a load of 0.45 MPa). The average thermal expansion coefficient of the barrel 11 at temperatures within the range of 25° C. to 260° C. is 10 ppm/° C. in the flowing direction (MD direction) and is 33 ppm/° C. in the direction perpendicular to the flowing direction (TD direction). The opening formed on the upper side of the barrel 11 is designed to have a size that can accommodate the diaphragm 12, and the opening on the lower side is designed to be able to receive the components such as the first lens 13, the second lens 14, and the circular hollow light-shielding plate 16. On the lower side (the opposite side of the diaphragm 12 across the positions of the second lens 14 and the first lens 13), a sealing plate 17 is provided which has an infrared cut filter 18.

The first lens 13 is a cationically-cured epoxy resin lens formed by a later-described method, and has an average thermal expansion coefficient of 115 ppm/° C. at temperatures within the range of 25° C. to 260° C.

The materials constituting the second lens 14 and the amounts of those materials are the same as those of the first lens 13. The same can be said for the linear expansion coefficient and the like.

The circular hollow light-shielding plate 16 is formed from SUS304, and has an average thermal expansion coefficient of 17 ppm/° C. at temperatures within the range of 25° C. to 260° C.

At this time, if the barrel inner diameter (B) is 2.3 mm in the formula (1) and the lens diameter (L) is a variable, the lens diameter should be 2.245 mm to provide the minimum clearance $X_0$ to the first lens and the second lens (both having an average thermal expansion coefficient of 115 ppm/° C.), and $X_0$ here is 0.0275 mm.

Meanwhile, the clearance X for a gap between the inner wall of the barrel 11 and the peripheral portion of the second lens 14 supported by the lens supporting portions is 0.05 mm; hence, $X=1.82*X_0$.

Further, the clearance X for a gap between the inner wall of the barrel 11 and the peripheral portion of the first lens 13 is 0.1 mm; hence, $X=3.64*X_0$.

In the calculation of $X_0$ and the like, the average thermal expansion coefficient of the barrel 11 was set to 10 ppm which was the value in the flowing direction (MD direction).

In the following, methods of producing the barrel 11, the first lens 13, and the second lens 14, and a method of assembling the imaging lens unit according to Embodiment 1 are described.

First, the method of producing the barrel 11 is described.

OCTA LD-235 (a product of DIC Corporation), which is an LCP, is used as the thermoplastic resin and is heated at 350° C. to be liquefied. The liquefied thermoplastic resin is poured into a mold heated to 140° C., and then the cured product is taken out from the mold to be cooled to a room temperature (injection molding).

Next, the method of producing the first lens 13 and the second lens 14 is explained.

In a 3-L four-necked flask having a gas inlet, a cooling tube, and a stirring rod, 168 g of a liquefied hydrogenated bisphenol A epoxy resin ("EPIKOTE YX8000", a product of Japan Epoxy Resin Inc.), and 240 g of an organosilica sol ("MEK-ST", a product of Nissan Chemical Industries, Ltd., particle size: 10 to 15 nm, solid content: 30%) were uniformly mixed. Then, the solvent of the mixture was removed in an evaporator in vacuo at 80° C., and the resulting yield was 249.7 g and the viscosity of the product was 40 Pa·s. Then, 34.7 g of the resin composition, 25 g of a solid hydrogenated bisphenol A epoxy resin ("EPIKOTE YL7170 (YX8040)", a product of Japan Epoxy Resin Inc.), and 41.6 g of YX8000 were uniformly mixed at 80° C. The yield was 101.3 g, and the viscosity of the product was 130 Pa·s.

Thereafter, stearic acid serving as a releasing agent in an amount of 0.5% by weight, based on the total weight, was added to the resin composition and they were then uniformly mixed at 80° C. The resin composition was cooled to 50° C., and then a cationic curing catalyst (San-Aid SI-80L, a product of Sanshin Chemical Industry Co., Ltd.) in an amount of 1% by weight based on the total weight was added to the composition. Then, they were uniformly mixed and a cationically-curable epoxy resin composition was prepared. The epoxy equivalent of the cationically-curable epoxy resin composition was 480 (g/eq).

According to need, the cationically-curable epoxy resin composition was deaerated by decompression, and the cationically-curable epoxy resin composition was applied to a mold having a shape corresponding to the lens so as to be heated for three minutes at 130° C. and cured. Then, the lens was taken out from the mold and the lens was finished by one hour of postcuring (baking) at 180° C. under a nitrogen atmosphere.

The same cationically-curable epoxy resins as that for the above lens were cured under the same conditions except that the molds were different, so that test molded products for various evaluations were produced. In a 250-μm film-state molded product, the refractive index in the wavelength of 486 nm was 1.5164, the refractive index in the wavelength of 589 nm was 1.5101, and the refractive index in the wavelength of 656 nm was 1.5077. The Abbe's number was 58.6, and the transmissivity in the wavelength of 500 nm was 90.2%. The average thermal expansion coefficient of a 10 mm×10 mm×3 mm (in thickness) molded product measured at temperatures from 25° C. to 260° C. was 115 ppm.

In the following, description is given for methods of evaluating the viscosity and the epoxy equivalent of the cationically-curable epoxy resin composition or the resin composition in the preparation process, and the refractive index, the Abbe's number, and the transmissivity of the molded products.

<Viscosity>

The viscosity of the resin composition was evaluated by R/S Rheometer (produced by Brookfield Engineering Laboratories, Inc. (USA)) at 40° C. at a rotational speed D=1/s. A measuring jig of RC25-1 was used for a composition with a viscosity of not less than 20 Pa·s, and a jig of RC50-1 was used for a composition with a viscosity of less than 20 Pa·s. If the viscosity of a resin composition cannot be measured at the rotational speed D=1/s, the viscosity of the resin composition was evaluated by extrapolating values in the range of D=from 5 to 100/s.

<Epoxy Equivalent>

The epoxy equivalent of a resin composition was measured after addition of a cationic curing catalyst to the resin composition (resin composition just before curing) by the method in accordance with JIS K 7236.

<Transmissivity>

The transmissivity of a molded product produced by the above method was evaluated with use of the spectrophotometer UV-3100 (produced by Shimadzu Corporation) at the wavelength of 500 nm at 20° C.

<Refractive Index and Abbe's Number>

The refractive index and Abbe's number were evaluated with use of a refractometer (DR-M2, a product of Atago Co., Ltd.) at 20° C. The molded product used here was the same as that used for evaluation of the transmissivity.

<Average Thermal Expansion Coefficient>

Test Sample: A 10 mm×10 mm×3 mm (In Thickness) Molded Product

The thermal expansion coefficients of the molded product were measured with use of a thermal expansion coefficient measuring device (TMA4000SA, a product of Bruker Axs) under the conditions of: a rate of temperature increase of 5° C./min; a measurement temperature range of from 25° C. to 300° C.; and a load of 1.0 g. From the measured coefficients, the average thermal expansion coefficients at 260° C. in the thickness direction to that measured at 25° C. was calculated.

Next, the method of assembling an imaging lens unit is described.

The diaphragm 12 is mounted in the upper side opening of the barrel 11, and then the first lens 13, the circular hollow light-shielding plate, and the second lens 14 are inserted in the stated order from the lower side opening of the barrel 11. After that, the sealing plate (glass) 17 provided with the infrared cut filter 18 is arranged. In insertion of the second lens, the second lens was pushed onto the lens supporting portions provided on the inner wall of the lens tube so as to be fixed. The imaging lens unit according to Embodiment 1 was produced as described above.

<Thermal Resistance Test (Also Referred to as a Reflow Process)>

Figure 10:
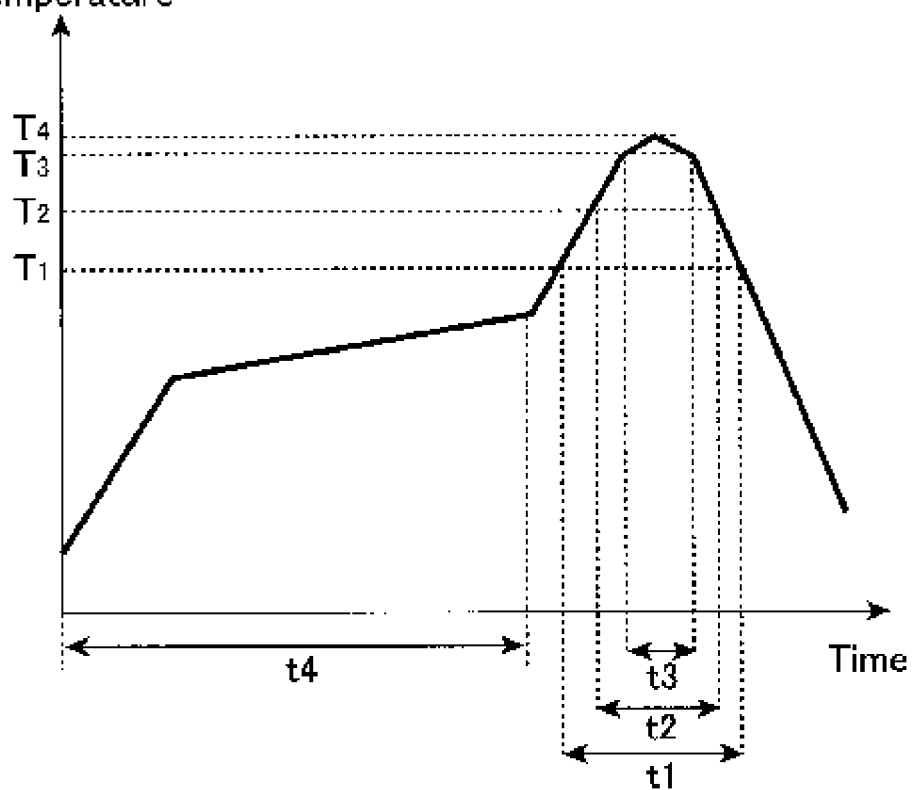
FIG. 10 is a graph illustrating a temperature sequence of the solder reflow process according to Embodiment 1.

The thermal resistance test for the imaging lens unit according to Embodiment 1, produced as described above, was performed. That is, the lens unit according to Embodiment 1 was tested on the thermal resistance in a solder reflow oven (RDT-250C, a table top module reflow oven produced by Malcom Co., Ltd.) through the temperature sequence of the solder reflow process illustrated in FIG. 10. In FIG. 10, the vertical axis shows the temperature and the horizontal axis shows time. $T_1$ is 217° C., $T_2$ is 230° C., $T_3$ is 250° C., and $T_4$ is 260° C. which is the highest temperature in the solder reflow process. The time represented by "t1" is the time when the temperature reaches $T_1$, which is 60 seconds. The time represented by "t2" is the time when the temperature reaches $T_2$, which is 50 seconds. The time represented by "t3" is the time when the temperature reaches $T_3$, which is 10 seconds.

Figure 11:
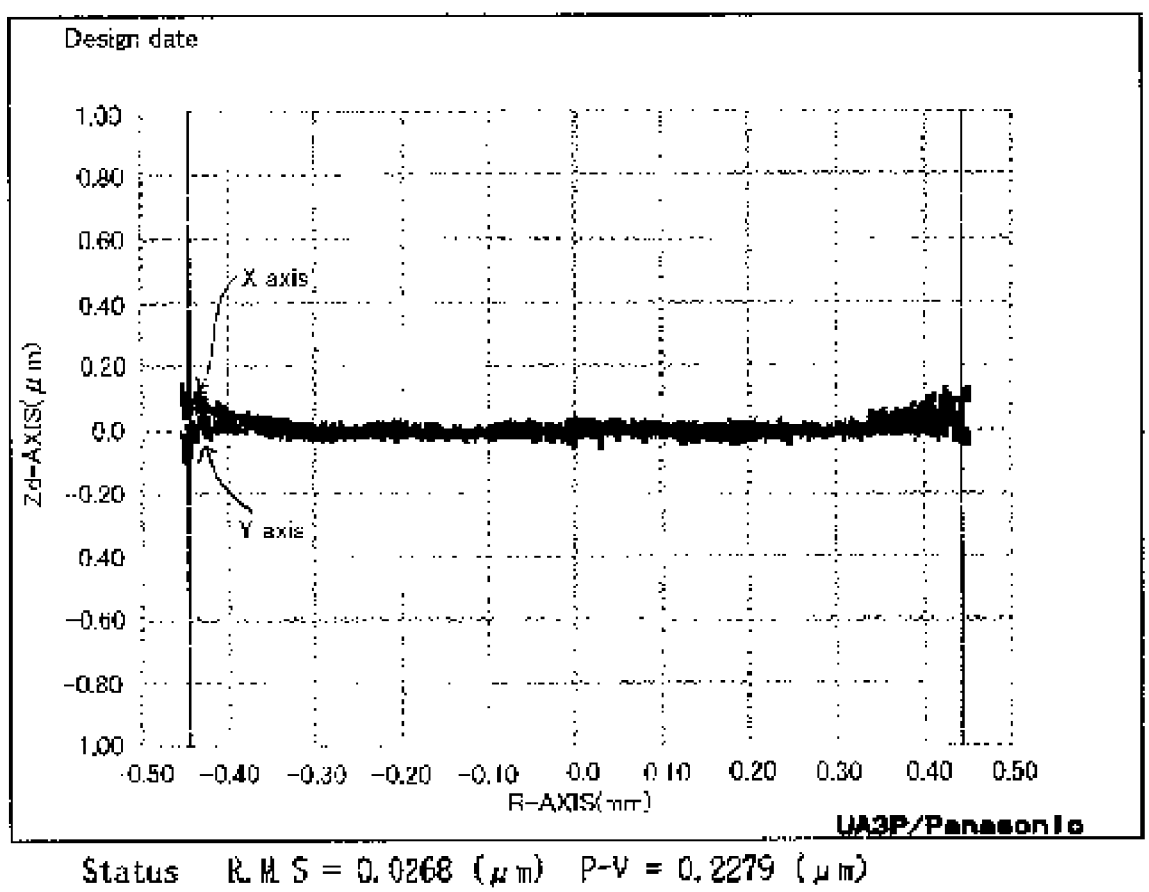
FIG. 11 is a graph illustrating results of lens distortion measurement after the solder reflow process in Embodiment 1.

The result of change in the shape of the second lens 14 after the solder reflow process is shown in FIG. 11. FIG. 11 illustrates the state after the solder reflow process. The horizontal axis in FIG. 11 represents the aspheric diameter (mm) of the lens, and the vertical axis represents difference (PEEK to Valey (PV) value, measured in μm) from the optical design value, which was measured with UA3P produced by Panasonic Corporation. A lens showing a change of not more than 2 μm between before and after the reflow process was evaluated as good (+), and a lens showing a change of not less than 2 μm was evaluated as defective (−). Here, the change was measured at the points along the straight lines, extending between four lens supporting portions, along the line C-D (X axis in FIG. 11) or the line E-F (Y axis in FIG. 11) in FIG. 9. The results of measurement along the X axis and the Y axis overlap, and they are hardly different from the optical design value. This shows that, when having a clearance, a lens unit does not cause distortion, damage, and the like on the lens in the solder reflow process.

Further, although the lens unit had a clearance, the lens was not displaced because the lens was supported by the lens supporting portions. This means that the imaging lens unit had solder reflow resistance. The PV value before the solder reflow process was 0.2 μm, and the PV value after the solder reflow process was 0.23 μm. These values show that the solder reflow process did not cause damage on the lens unit.

Figure 12:
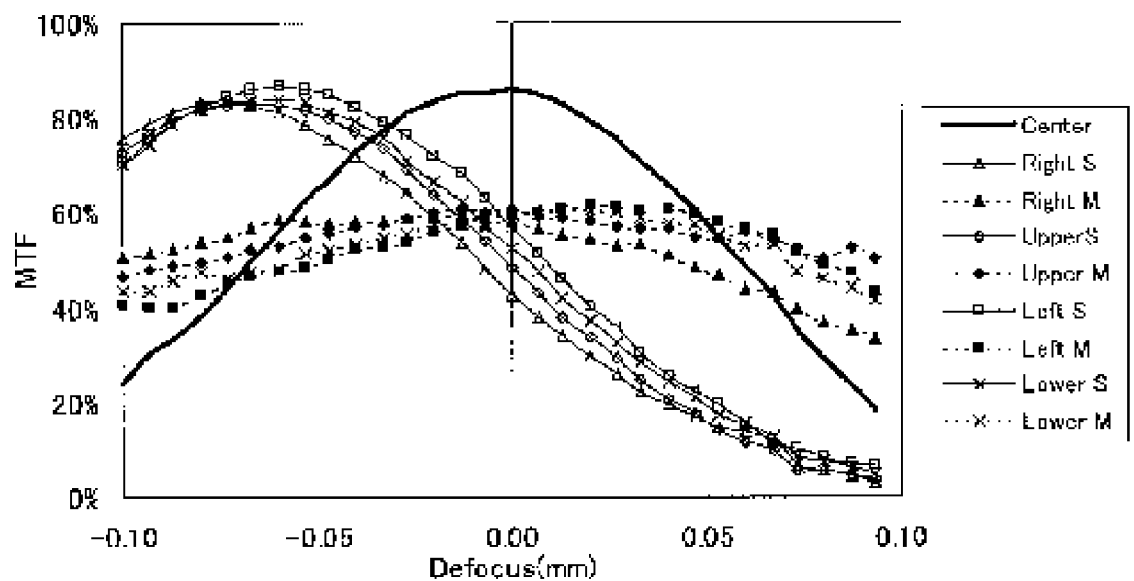
FIGS. 12(a) and 12(b) are graphs each illustrating results of resolution measurement of the lens unit according to Embodiment 1 before and after the solder reflow process.
Figure 12:
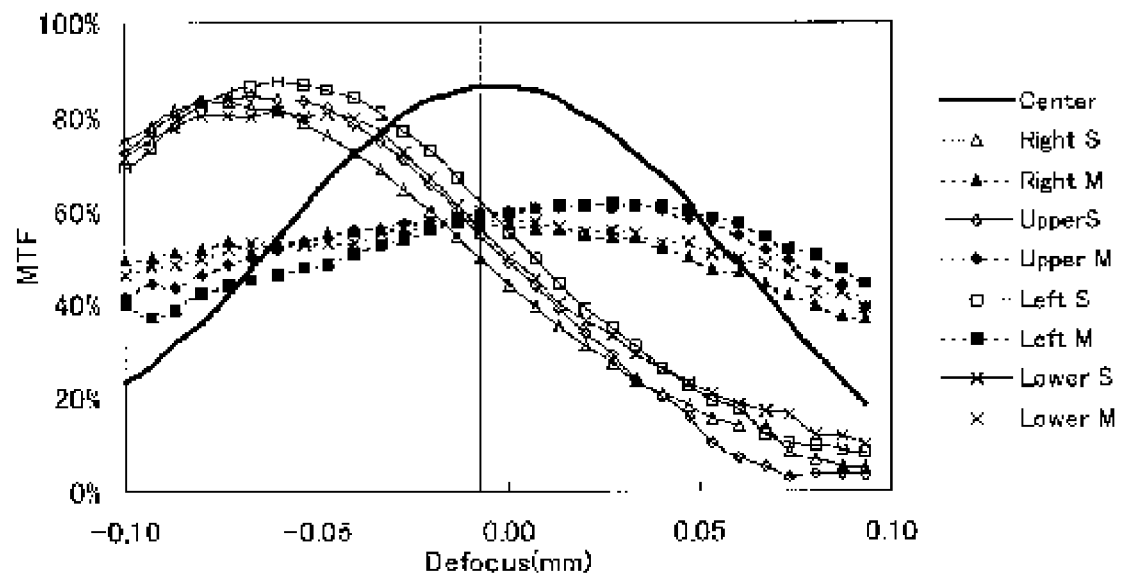

The resolution was evaluated with use of an MTF measuring device (FOA201, a product of Opto Device Corporation). An imaging lens unit was evaluated as good (+) if the imaging lens unit showed a change in the cut resolution of not more than 10% between before and after the reflow process, at any portions between the image heights of from 0% to 100%. An imaging lens unit showing a change of more than 10% was evaluated as defective (−). In the measurement, the frequency was set to ¼ of the Nyquist frequency. FIGS. 12(a) and 12(b) show an example in Embodiment 1 in which the position resolutions were measured at the center and the image heights of 80% of the lens before and after the solder reflow process. The position of the image height of 0% is at the center of the diagonals of the sensor of the MTF measuring device, and the position of the image height of 100% is at the ends of the diagonals of the sensor of the MTF measuring device. In FIGS. 12(a) and 12(b), the vertical axis shows values of MTF (Modulation Transfer Function), and the horizontal axis shows the focal distances in the vertical direction when the focal distance at the center point of the lens was set to 0 mm. In FIG. 12, "Right", "Upper", "Left", and "Lower" mean that the change was measured at positions at the image heights of 80% in the respective four directions which are 90° different from the adjacent directions, with the center point of the lens in the plan view taken as the center. Further, "S" means measurement with light traveled in the sagittal direction, and "M" means measurement with light traveled in the meridional direction. In comparison of FIGS. 12(a) and 12(b), the MTF values in the meridional direction were about 50% before the solder reflow process, and no big change was seen in those MTF values after the solder reflow process. That is, the results showed that the solder reflow process did not cause degradation in the optical characteristics of the lens unit.

Ten samples are produced for evaluation, and all the ten samples showed good (+) evaluation results on the change in the resolution, deformation of the lens, and deformation of the barrel (lens tube) after the reflow process. That is, a change in the resolution, deformation of the lens, and deformation of the barrel were not seen after the reflow process, and all the evaluation results were good (+).

Comparative Example 1

The lens unit according to Comparative Example 1 had the same configuration as that of the lens unit of Embodiment 1, except that the barrel was produced from a polycarbonate (PC) Lupilon S3000R (produced by Mitsubishi Engineering-Plastics Corporation; thermal deflection temperatures (testing method: ASTM D648): the load deflection temperature was 139° C. under a load of 0.45 MPa; and the load deflection temperature was 124° C. under a load of 1.8 MPa), which is a thermoplastic resin having no solder reflow resistance. The conditions and the like for the solder reflow process were the same as those for Embodiment 1. In this case, the barrel had melted and the resolution after the solder reflow deteriorated.

Comparative Example 2

Figure 13:
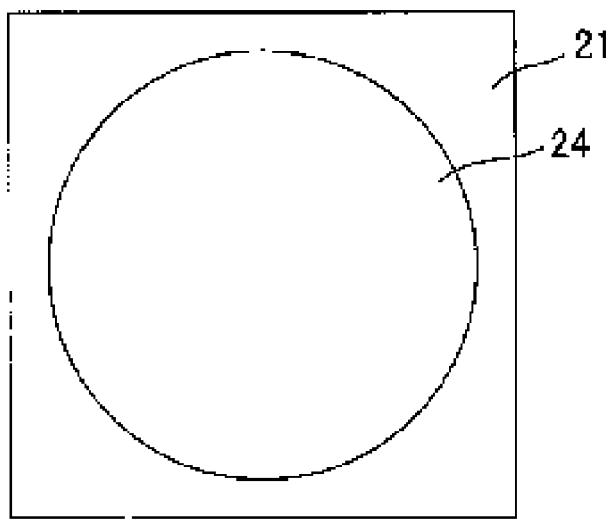
FIG. 13 is a schematic plan view of the structure of an imaging lens unit according to Comparative Example 2.
Figure 14:
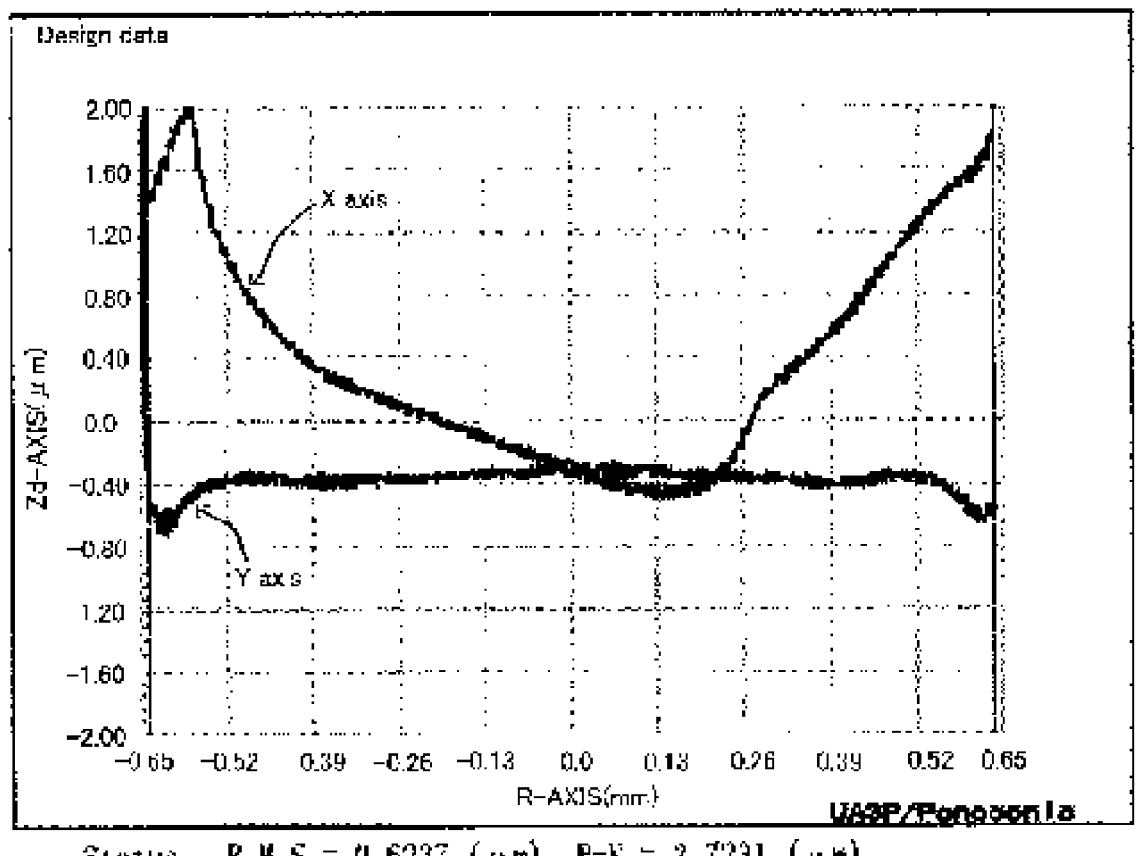
FIG. 14 is a graph illustrating results of lens distortion measurement before the solder reflow process in Comparative Example 2.
Figure 15:
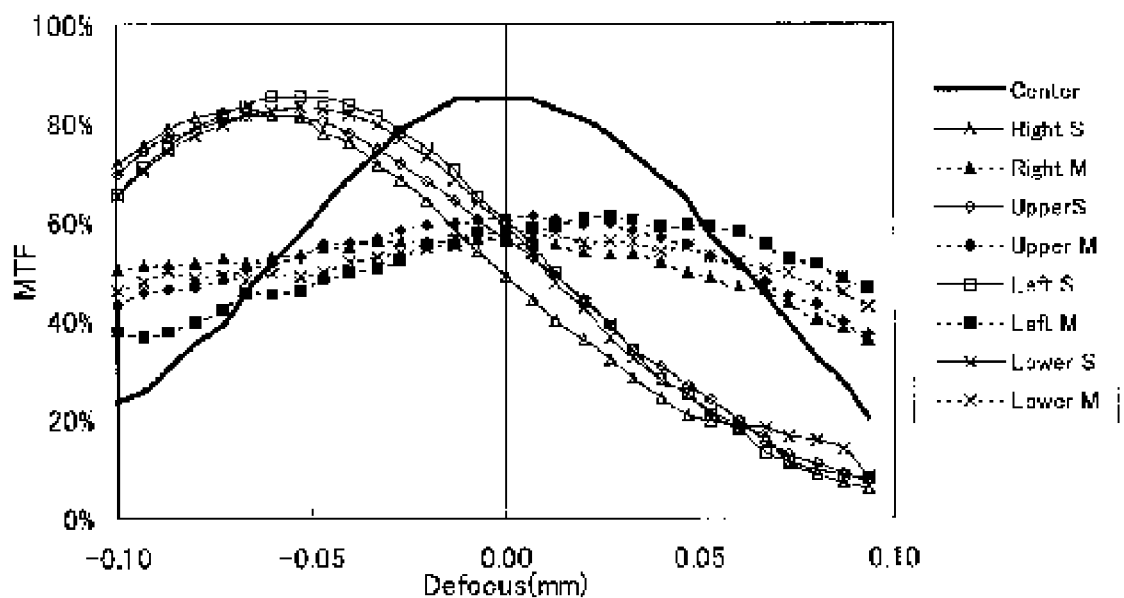
FIG. 15 are graphs each illustrating results of resolution measurement of the lens unit according to Comparative Example 2 before and after the solder reflow process.
Figure 15:
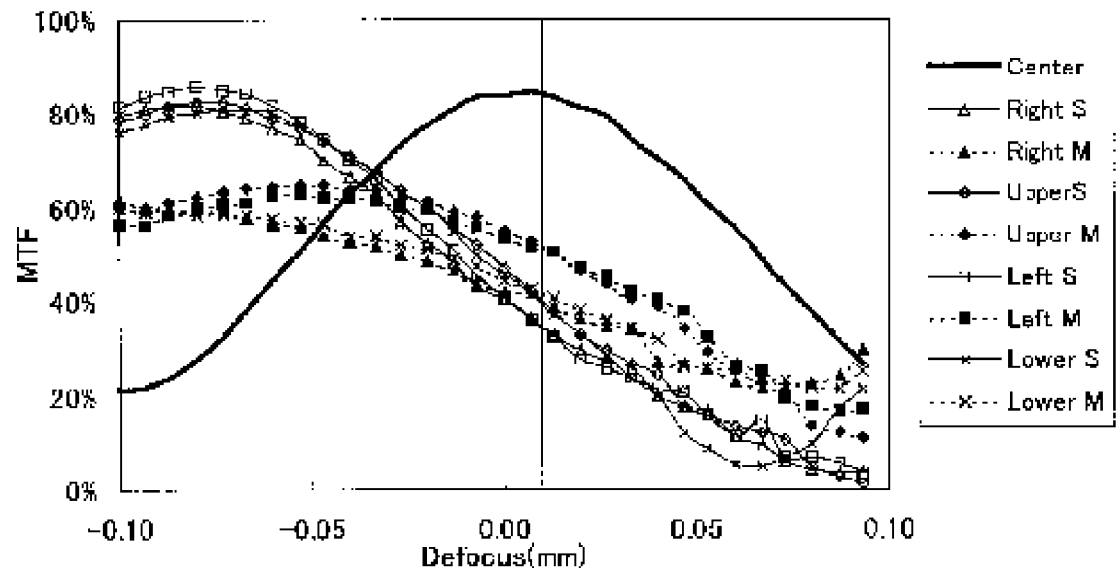

FIG. 13 is a schematic plan view of the lens unit according to Comparative Example 2. The lens unit according to Comparative Example 2 had the same configuration as that of the lens unit according to Embodiment 1, except that the diameter of a positive lens 24 corresponding to the second lens 14 in Embodiment 1 was 2.3 mm, which was the same length as the inner diameter of the barrel 21, and a clearance was not provided. The conditions and the like for the solder reflow process were the same as those for Embodiment 1. FIG. 14 shows the results of the lens distortion measurements before and after the solder reflow process, which was performed in a similar manner to in Embodiment 1. The change in the lens between before and after the solder reflow process was 2.72 µm, and this shows that the lens was distorted through the solder reflow process. FIGS. 15(a) and 15(b) show graphs of resolutions measured before and after the solder reflow process. As shown in FIG. 15(a), LowerS, for example, was 58% at the point where the defocus was 0 mm before the solder reflow process. However, LowerS of the MTF decreased to about 41% after the solder reflow process as shown in FIG. 15(b). That is, the resolution changed through the solder reflow process.

Comparative Example 3

Figure 16:
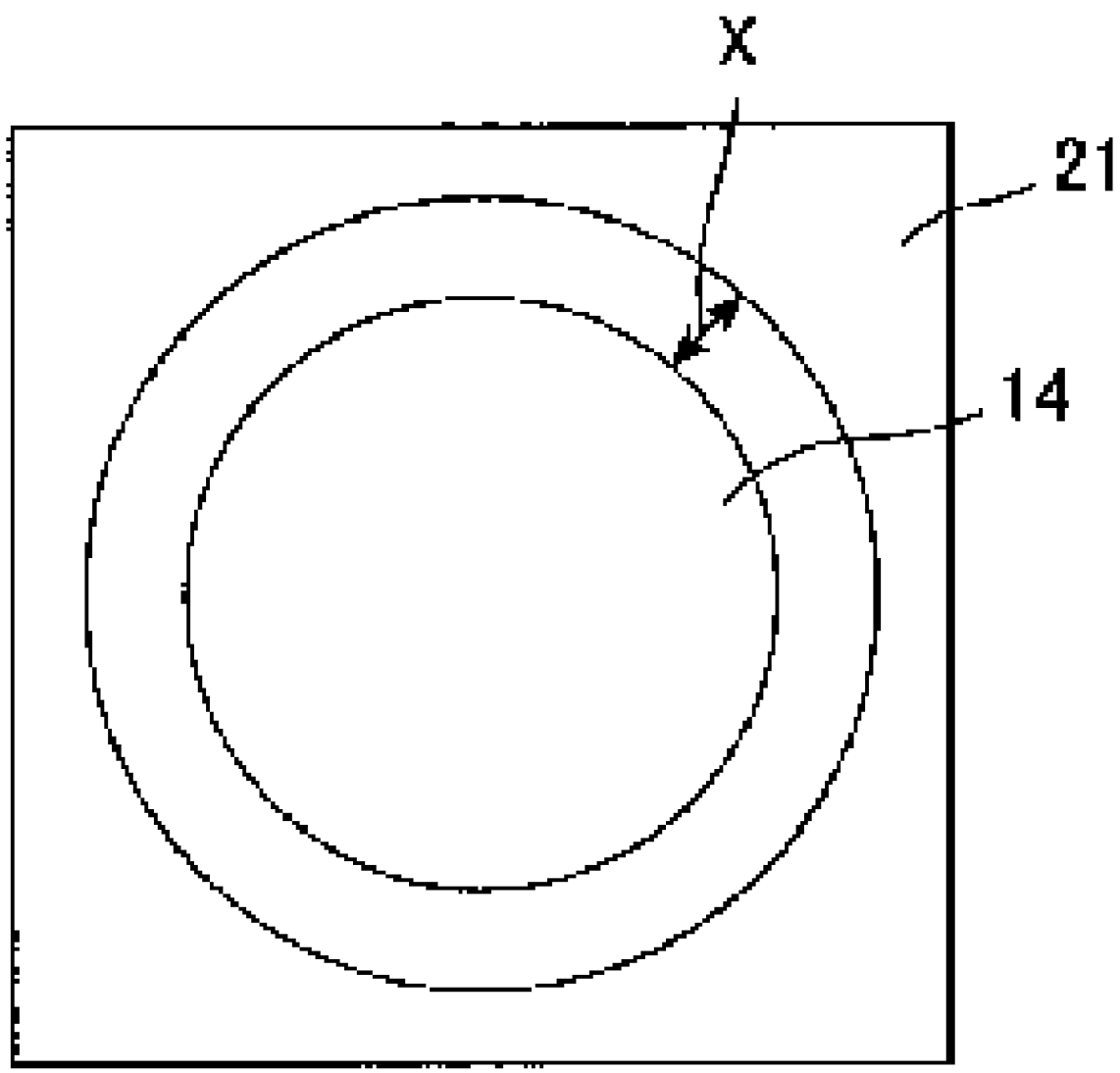
FIG. 16 is a schematic plan view illustrating the structure of an imaging lens unit according to Comparative Example 3.

FIG. 16 is a schematic plan view of the lens unit according to Comparative Example 3. The lens unit according to Comparative Example 3 had the same configuration as that of the lens unit according to Embodiment 1, except that the barrel 21 had no lens supporting portions. Further, the conditions and the like for the solder reflow process were equivalent to those for Embodiment 1. In this case, the resolution deteriorated after the solder reflow process, and sufficient optical characteristics were not provided. The resolution was evaluated by the same procedure as that in Embodiment 1.

The results of Embodiment 1 and Comparative Example 2 teach that provision of a clearance prevents distortion when a cationically-cured epoxy resin lens is used as a lens constituting the imaging lens unit. Further, the results of Embodiment 1 and Comparative Example 3 show that provision of lens supporting portions prevents displacement of the lens when a clearance is provided.

Embodiment 2

The lens unit according to Embodiment 2 had the same configuration as that of the lens unit according to Embodiment 1, except that the material of the barrel mainly contained a PPS of DIC-PPS FZ-2140-D9 (produced by DIC Corporation; thermal deflection temperature (testing method: ASTM D648): the load deflection temperature was 265° C. under a load of 1.82 MPa; the load deflection temperature was not lower than 265° C. under a load of 0.45 MPa). The average thermal expansion coefficient of the barrel between temperatures of from 25° C. to 260° C. was 22 ppm/° C. The following values were determined in a similar manner to that in Embodiment 1. The minimum clearance $X_0$ of each of the first lens and the second lens in the lens unit according to Embodiment 2 was 0.0245 mm. The actual clearance of the first lens was 4.08 times the minimum clearance $X_0$, and the actual clearance of the second lens was 2.04 times the minimum clearance $X_0$. Ten samples of the lens unit according to Embodiment 2 were produced as in Embodiment 1, and those ten samples were tested on the thermal resistance. As a result, all the evaluation results of the resolution change, deformation of the lens, and deformation of the barrel after the reflow process were good (+).

Also in this case of using PPS as the material of the barrel, the barrel did not melt and good optical characteristics were provided as in Embodiment 1. The measuring conditions for the resolution and the like were the same as those for Embodiment 1.

The method of producing a barrel 31 with use of PPS is described below.

A thermoplastic resin mainly containing a PPS of DIC-PPS FZ-2140-D9 (product of DIC Corporation) is heated at 330° C. to be liquefied. The liquefied thermoplastic resin is poured into a mold heated to 140° C., and then the cured product is taken out from the mold to be cooled to a room temperature.

Comparative Example 4

The imaging lens unit according to Comparative Example 4 had the same configuration as that of the lens unit in Embodiment 1, except that the lenses corresponding to the first lens 13 and the second lens 14 in Embodiment 1 were formed from a cycloolefin polymer (ZEONOR 1020R, a product of Zeon Co., Ltd.). In the lens unit according to Comparative Example 4, the lens was melted and deformed in the solder reflow process.

Embodiment 3

FIGS. 17(a) and 17(b) are cross-sectional schematic views of an imaging lens unit according to Embodiment 3: FIG. 17(b) is a cross-sectional view at the position of supporting portions; and FIG. 17(a) is a cross-sectional view at an angle 45° off the above position.

Figure 17:
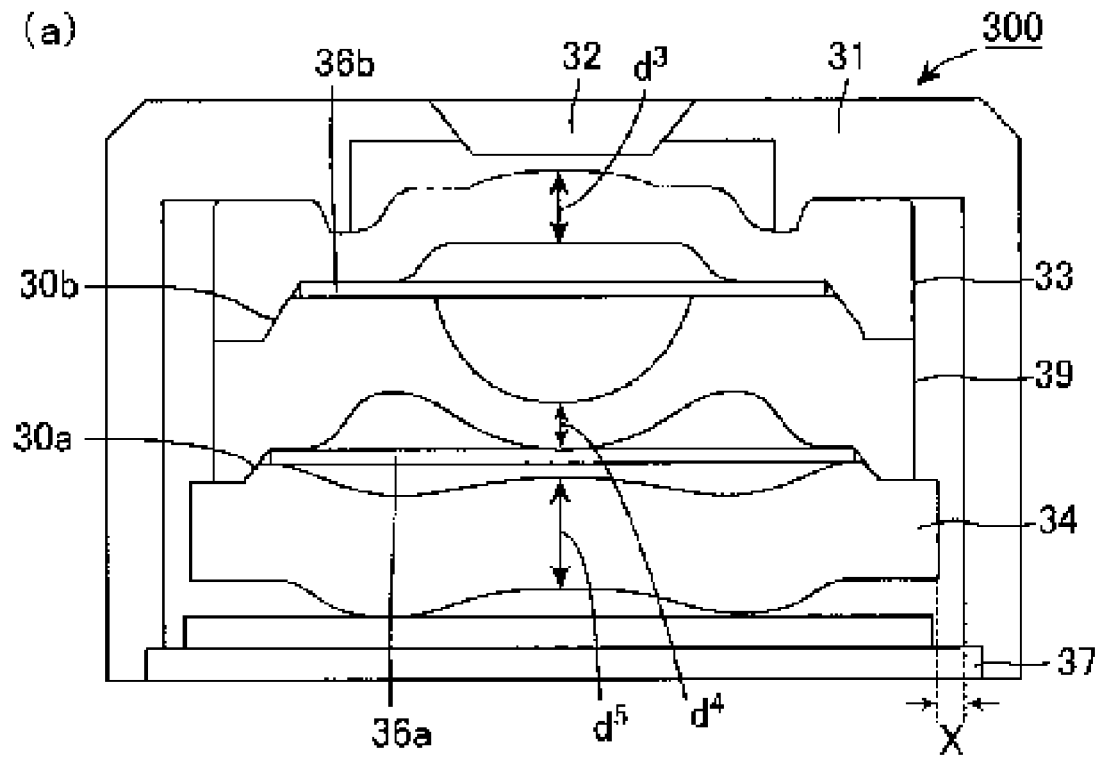
FIG. 17 are cross-sectional views illustrating the structure of an imaging lens unit according to Embodiment 4.
Figure 17:
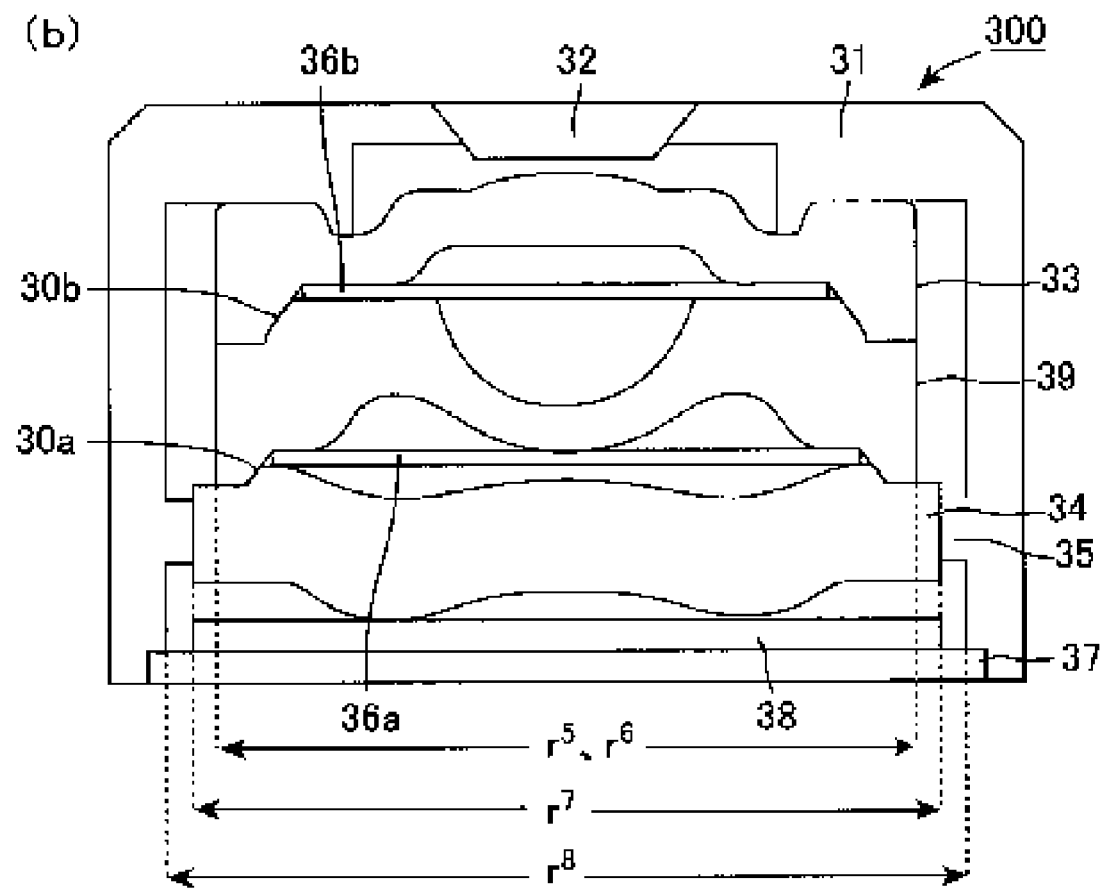

An imaging lens unit 300 according to Embodiment 3 has a first lens 33, a second lens 39, and a third lens 34 stacked inside a barrel (lens tube) 31, as illustrated in the cross-sectional schematic views of FIGS. 17(a) and 17(b). The barrel 31 is a square pillar that has openings at the top and the bottom (here, the upper side in FIG. 17 is referred to as the top, and the lower side in FIG. 17 is referred to as the bottom), and has a cylindrical hollow inside thereof. The length of one side of the barrel 31, which is a square pillar, in a plan view is 5.79 mm, and the inner diameter $r^8$ of the barrel 31 is 4.7 mm.

As illustrated in FIG. 17, the barrel 31 has a diaphragm 32 in the opening at the top, and the following lenses are provided under the diaphragm 32 in the order of the first lens 33 that is circular and has a diameter $r^5$ of 4.4 mm and a thickness $d^3$ at the center of the optical axis of 0.5 mm; the second lens 39 that is circular and has a diameter $r^6$ of 4.4 mm and a thickness $d^4$ at the center of the optical axis of 0.3 mm; and the third lens 34 that is circular and has a diameter $r^7$ of 4.5 mm and a thickness $d^5$ at the center of the optical axis of 0.9 mm. Between the second lens 39 and the third lens 34, a circular hollow light-shielding plate 36a is arranged which has an outer diameter of 3 mm, an inner diameter of 2 mm, and a thickness of 0.05 mm. Similarly between the first lens 31 and the second lens 39, a 0.05-mm-thick circular hollow light-shielding plate 36b is arranged. At this time, the clearance X or the gap between the inner wall of the barrel 31 and the peripheral portion of the third lens 34 is 0.1 mm. The clearances X, that is, the clearance between the inner wall of the barrel 31 and the peripheral portions of the first lens, and the clearance between the barrel and the peripheral portions of the second lens are both 0.15 mm.

The barrel 31 has the lens supporting portions 35 formed on the inner wall of thereof, and the lens supporting portions 35 support the third lens 34. The height of the lens supporting portions 35 from the inner wall of the barrel 31 is 0.11 mm (0.1 mm+0.01 mm). The second lens 39 is fixed by being fitted with the third lens 34 at a tapered portion 30a, and the first lens 33 is fixed by being fitted with the second lens 39 at a tapered portion 30b. Here, the angle of the tapered portion 30a to the horizontal plane is 45°, and the angle of the tapered portion 30b to the horizontal plane is also 45°.

The barrel 31 is produced from a thermoplastic resin that has reflow resistance and contains an LCP of OCTALD-235

(a product of DIC Corporation). The average thermal expansion coefficient of the barrel 31 at temperatures within the range of 25° C. to 260° C. is 10 ppm/° C. in the flowing direction (MD direction) and is 33 ppm/° C. in the traverse direction (TD direction). The opening formed on the upper side of the barrel 31 is designed to have a size that can accommodate the diaphragm 32, and the opening on the lower side is designed to be able to receive the components such as the first lens 33, the second lens 39, the third lens 34, and the circular hollow light-shielding plate 36. On the lower side (the opposite side of the diaphragm 32 across the positions of the third lens 34, the second lens 39, and the first lens 33), a sealing plate 37 is provided which has an infrared cut filter 38.

The materials constituting the respective first lens 33 and third lens 34 are the same as those for the first lens and the second lens used in Embodiment 1. Here, the same can be said for the average thermal expansion coefficient.

The circular hollow light-shielding plate 36 contains SUS304 as its essential component, and has an average thermal expansion coefficient of 17 ppm/° C. at temperatures from 25° C. to 260° C. The following values were determined in a similar manner to that in Embodiment 1. The minimum clearance $X_0$ of each of the first lens and the third lens (both having an average thermal expansion coefficient of 115 ppm/° C.) in the lens unit according to Embodiment 3 was 0.0565 mm. The actual clearance of the first lens was 2.65 times the minimum clearance $X_0$, and the actual clearance of the third lens was 1.77 times the minimum clearance $X_0$.

Similarly, the minimum clearance $X_0$ of the second lens (having an average thermal expansion coefficient of 88 ppm/° C.) was 0.042 mm, and the actual clearance was 3.57 times the minimum clearance $X_0$.

Here, ten samples of the lens unit according to Embodiment 3 were also produced as in Embodiment 1, and those ten samples were tested on the thermal resistance. As a result, all the evaluation results of the resolution change, deformation of the lens, and deformation of the barrel after the reflow process for the ten samples were good (+).

Also, as in Embodiment 1, the lens supporting portions are provided at four locations on the inner wall of the lens tube at equal intervals.

Next, the method of producing the lenses is described.

The method of producing the first lens 33 and the third lens 34 is the same as that for the lens in Embodiment 1, except that the shapes of the molds are different. The method of producing the second lens 39 is described below. In a four-necked flask having a gas inlet, a cooling tube, and a stirring rod, 25 g of an alicyclic epoxy resin ("Celoxide 2021P", a product of Daicel Chemical Industries, Ltd., the epoxy equivalent: 130), 25 g of an alicyclic epoxy resin ("EHPE-3150", a product of Daicel Chemical Industries, Ltd., the epoxy equivalent: 177), and 50 g of an aromatic epoxy resin ("OGSOL EG-210", a product of Osaka Gas Chemicals Co., Ltd., the epoxy equivalent: 340) were uniformly mixed at 130° C. Further, 1 g of a silicon polymer ("KF-56", a product of Shin-Etsu Chemical Co., Ltd., weight-average molecular weight: 1750) was added to the above mixture to give a uniform mixture, whereby a resin composition was produced. The composition had a viscosity of 251 Pa·s at 40° C.

Then, 2-ethylhexanoic acid as a releasing agent in an amount of 0.5% by weight, based on the total weight, was added to the resin composition and they were then uniformly mixed at 80° C. The resin composition was cooled to 40° C., and then a cationic curing catalyst (San-Aid SI-80L, a product of Sanshin Chemical Industry Co, Ltd.) in an amount of 0.5% by weight based on the total weight was added to the composition. Then, they were uniformly mixed and a cationically-curable epoxy resin composition was prepared. The epoxy equivalent of the cationically-curable epoxy resin composition was 246 (g/eq).

According to need, the cationically-curable epoxy resin composition was deaerated by decompression, and the cationically-curable epoxy resin composition was applied to a mold having a shape corresponding to the lens so as to be heated for three minutes at 140° C. and cured. Then, the lens was taken out from the mold and the lens was completed by one hour of postcuring (baking) at 200° C. under a nitrogen atmosphere.

The same cationically-curable epoxy resins as that for the above lens were cured under the same conditions except that the molding molds were different, so that test molded products for various evaluations were produced. In a 250-µm film-state molded product, the refractive index in the wavelength of 486 nm was 1.5824, the refractive index in the wavelength of 589 nm was 1.5701, and the refractive index in the wavelength of 656 nm was 1.5652. The Abbe's number was 33.1, and the transmissivity in the wavelength of 500 nm was 90.7%. The average thermal expansion coefficient of a 10 mm×10 mm×3 mm (in thickness) molded product measured at temperatures from 25° C. to 260° C. was 88 ppm.

Comparative Example 5

Figure 18:
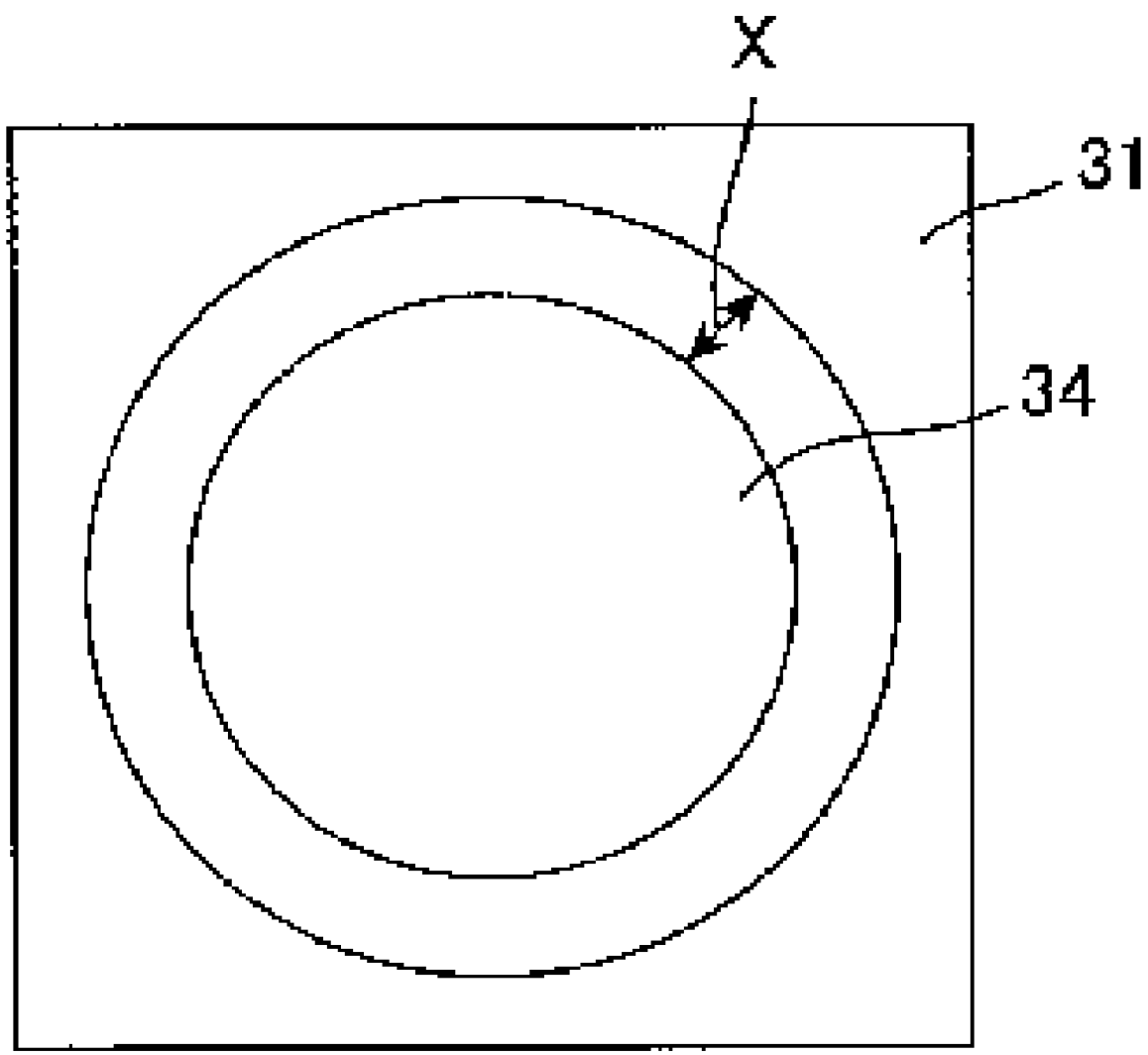
FIG. 18 is a schematic plan view illustrating the structure of an imaging lens unit according to Comparative Example 5.

FIG. 18 is a schematic plan view of a lens unit according to Comparative Example 5 at the position corresponding to the third lens in FIG. 17. The lens unit according to Comparative Example 5 had the same configuration as that of the lens unit in Embodiment 3, except that the barrel 31 was not provided with lens supporting portions. The conditions and the like for the solder reflow process were the same as those for Embodiment 1. In this case, the resolution deteriorated after the solder reflow process, and sufficient optical characteristics were not provided. The resolution was evaluated by the same procedure as that in Embodiment 1.

Comparative Example 6

The lens unit according to Comparative Example 6 had the same configuration as that of the lens unit according to Embodiment 3, except that the diameter of a positive lens corresponding to the third lens 34 in Embodiment 3 was 4.6 mm, which was the same length as the inner diameter of the barrel, and a clearance was not provided. The conditions and the like for the solder reflow process were the same as those for Embodiment 1. In this case, since no clearance was provided, the change in the lens between before and after the solder reflow process was not less than 2 µm and the resolution deteriorated after the solder reflow process. That is, sufficient optical characteristics were not provided. The resolution was evaluated by the same procedure as that in Embodiment 1.

Embodiment 4

A lens unit according to Embodiment 4 had the same configuration as that of the lens unit in Embodiment 3, except that the barrel was formed from a PPS of DIC-PPS FZ-2140-D9 (a product of DIC Corporation). The following values were determined in a similar manner to that in Embodiment 1. The minimum clearance $X_0$ of each of the first lens and the third lens in the lens unit according to Embodiment 4 was 0.05 mm. The actual clearance of the first lens was 3.0 times the minimum clearance $X_0$, and the actual clearance of the third lens was 2.0 times the minimum clearance $X_0$.

Similarly, the minimum clearance $X_0$ of the second lens (having an average thermal expansion coefficient of 88 ppm/° C.) was 0.0355 mm, and the actual clearance was 4.2 times the minimum clearance $X_0$.

Ten samples of the lens unit according to Embodiment 4 were produced as in Embodiment 1, and those ten samples were tested on the thermal resistance. The conditions and the like for the solder reflow process were the same as those in Embodiment 1. In this case, the barrel did not melt and distortion or displacement of the lens did not occur in production of the lens unit. Accordingly, the completed lens unit had excellent optical characteristics. The resolution was evaluated by the same procedure as that in Embodiment 1.

As a result, all the evaluation results of the resolution change, deformation of the lens, and deformation of the barrel after the reflow process for the ten samples were good (+).

The following Embodiments 5 to 9 and Comparative Example 7 were performed in a similar manner to in Embodiment 1, except that the inner diameter of the barrel and/or the number of lens supporting portions was/were changed as described below. Here, ten samples of the lens unit according to each of those Embodiments were also produced by the same procedure as that in Embodiment 1, and those ten samples were tested on the thermal resistance.

Embodiment 5

The lens unit according to Embodiment 5 was produced by the same procedure as that for the lens unit in Embodiment 1, except that the inner diameter $r^2$ of the barrel was 2.25 mm and the height of the supporting portions 15 from the inner wall was 0.035 mm (0.025 mm+0.01 mm). The following values were determined in a similar manner to that in Embodiment 1. The minimum clearance $X_0$ of each of the first lens and the second lens in the lens unit according to Embodiment 5 was 0.027 mm. The actual clearance of the first lens was 2.78 times the minimum clearance $X_0$, and the actual clearance of the second lens was 0.93 times the minimum clearance $X_0$.

Ten samples of the lens unit according to Embodiment 5 were produced by the same procedure as that in Embodiment 1, and those ten samples were tested on the thermal resistance. As a result, the evaluation results of the resolution change, deformation of the lens, and deformation of the barrel after the reflow process for seven samples were good (+).

With respect to the other three samples, the evaluation results of deformation of the lens and deformation of the barrel after the reflow process were good (+), but the resolution slightly deteriorated. This is apparently caused by a focal distance change; such a change occurs when the supported lens comes into contact with the barrel in the reflow test and receives stress, which leads to deformation of the lens.

Embodiment 6

The lens unit according to Embodiment 6 was produced by the same procedure as that for the lens unit in Embodiment 1, except that the inner diameter $r^2$ of the barrel was 2.26 mm and the height of the supporting portions 15 from the inner wall was 0.04 mm (0.03 mm+0.01 mm). The following values were determined in a similar manner to that in Embodiment 1. The minimum clearance $X_0$ of each of the first lens and the second lens in the lens unit according to Embodiment 6 was 0.027 mm. The actual clearance of the first lens was 2.96 times the minimum clearance $X_0$, and the actual clearance of the second lens was 1.11 times the minimum clearance $X_0$.

Ten samples of the lens unit according to Embodiment 6 were produced by the same procedure as that in Embodiment 1, and those ten samples were tested on the thermal resistance. As a result, the evaluation results of the resolution change, deformation of the lens, and deformation of the barrel after the reflow process for nine samples were good (+).

With respect to the other one sample, the evaluation results of deformation of the lens and deformation of the barrel after the reflow process were good (+), but the resolution slightly deteriorated. This is apparently because the lens was optically distorted due to the stress.

Embodiment 7

The lens unit according to Embodiment 7 was produced by the same procedure as that for the lens unit in Embodiment 1, except that the inner diameter $r^2$ of the barrel was 2.8 mm and the height of the supporting portions 15 from the inner wall was 0.31 mm (0.3 mm+0.01 mm). The following values were determined in a similar manner to that in Embodiment 1. The minimum clearance $X_0$ of each of the first lens and the second lens in the lens unit according to Embodiment 7 was 0.0335 mm. The actual clearance of the first lens was 10.45 times the minimum clearance $X_0$, and the actual clearance of the second lens was 8.96 times the minimum clearance $X_0$.

All the evaluation results of the resolution change, deformation of the lens, and deformation of the barrel after the reflow process for the ten samples were good (+).

Embodiment 8

The lens unit according to Embodiment 8 was produced by the same procedure as that for the lens unit in Embodiment 1, except that the inner diameter $r^2$ of the barrel was 2.7 mm and the height of the supporting portions 15 from the inner wall was 0.26 mm (0.25 mm+0.01 mm) and that the supporting portions were provided at three locations. The following values were determined in a similar manner to that in Embodiment 1. The minimum clearance $X_0$ of each of the first lens and the second lens in the lens unit according to Embodiment 8 was 0.0325 mm. The actual clearance of the first lens was 9.23 times the minimum clearance $X_0$, and the actual clearance of the second lens was 7.69 times the minimum clearance $X_0$.

All the evaluation results of the resolution change, deformation of the lens, and deformation of the barrel after the reflow process for the ten samples were good (+).

Embodiment 9

The lens unit according to Embodiment 9 was produced by the same procedure as that for the lens unit in Embodiment 1, except that the inner diameter $r^2$ of the barrel was 2.45 mm, the height of the supporting portions 15 from the inner wall was 0.135 mm (0.125 mm+0.01 mm), and the supporting portions were provided at eight locations. The following values were determined in a similar manner to that in Embodiment 1. The minimum clearance $X_0$ of each of the first lens and the second lens in the lens unit according to Embodiment 9 was 0.0295 mm. The actual clearance of the first lens was 5.93 times the minimum clearance $X_0$, and the actual clearance of the second lens was 4.24 times the minimum clearance $X_0$.

All the evaluation results of the resolution change, deformation of the lens, and deformation of the barrel after the reflow process for the ten samples were good (+).

Comparative Example 7

The lens unit according to Comparative Example 7 was produced by the same procedure as that for the lens unit in Embodiment 1 or Comparative Example 3, except that the lens supporting portions were provided at two locations. The following values were determined in a similar manner to that in Embodiment 1. The minimum clearance $X_0$ of each of the first lens and the second lens in the lens unit according to Comparative Example 7 was 0.0275 mm. The actual clearance of the first lens was 3.64 times the minimum clearance $X_0$, and the actual clearance of the second lens was 1.82 times the minimum clearance $X_0$.

The evaluation results of deformation of the lens and deformation of the barrel after the reflow process for the ten samples were good (+), but the resolution deteriorated after the reflow process, which led to insufficient optical characteristics.

The evaluation results of the lens units in Embodiments 1 to 9 and Comparative Examples 1 to 3 and 5 to 7 are shown in Table 1.

Here, "+" indicates being good, and "−" indicates being defective.

The values of $X_0$ and $X/X_0$ in Table 1 are, respectively, the minimum clearance $X_0$ for the lens supported by the lens supporting portions on the inner wall of the lens tube, and the value of $X/X_0$ which is calculated based on the minimum clearance value $X_0$ and the value of the actual clearance $X$ between the lens and the inner wall of the lens tube.

Figure 1:
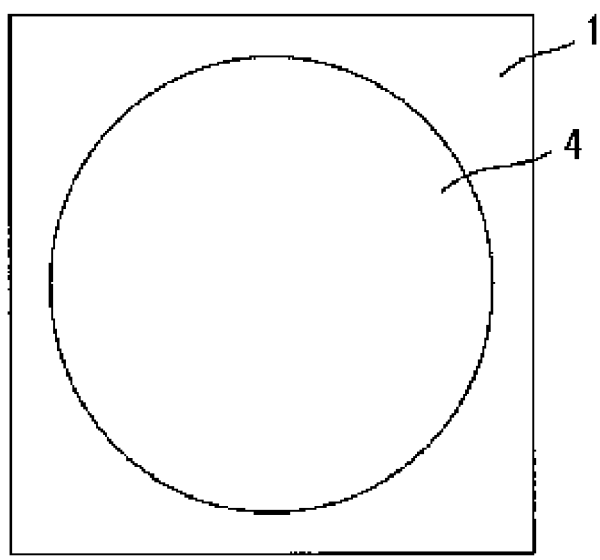
FIG. 1 is a schematic plan view illustrating a lens unit in which the inner diameter of the lens tube is the same as the diameter of the lens.
Figure 2:
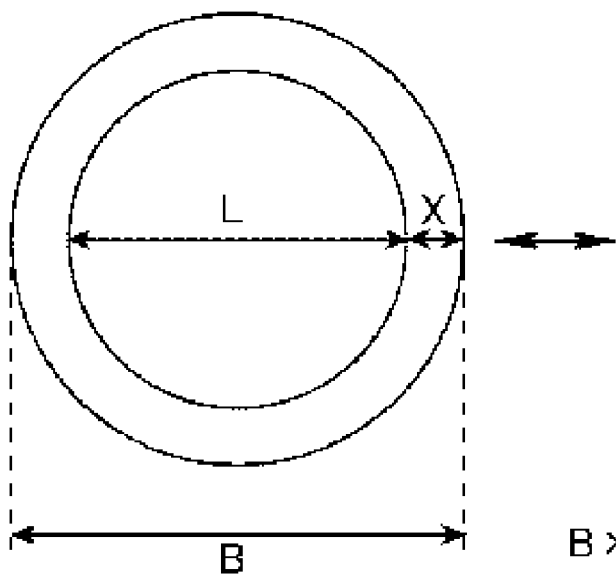
FIG. 2(a) is a schematic plan view illustrating structures of an imaging lens unit before and after the solder reflow process.
FIG. 2(b) is a schematic plan view illustrating structures of the imaging lens unit during the solder reflow process.
Figure 2:
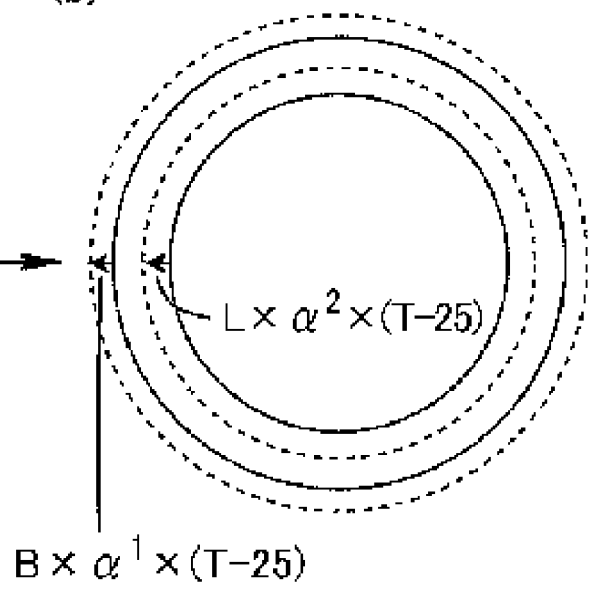
Figure 3:
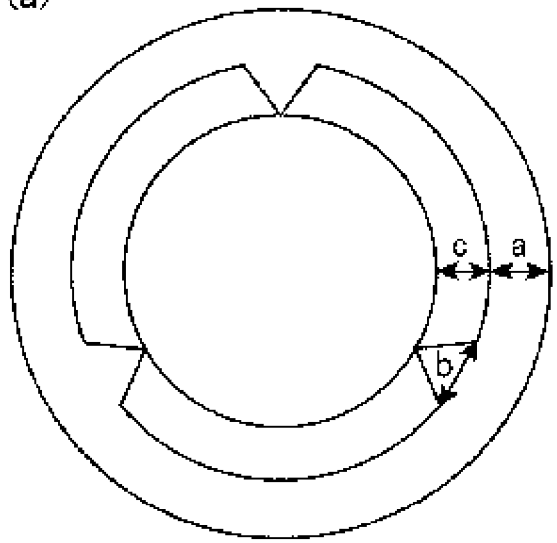
FIGS. 3(a), 3(b), and 3(c) are schematic plan views each illustrating the structure of an imaging lens unit.
Figure 3:
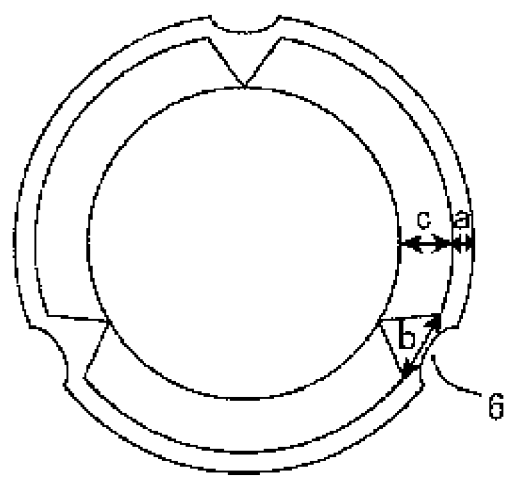
Figure 3:
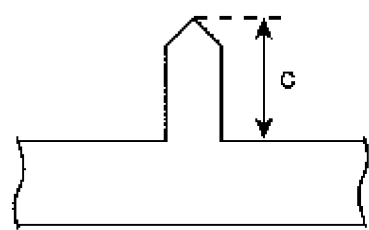
Figure 4:
FIGS. 4(a) and 4(b) are schematic plan views each illustrating the structure of an imaging lens unit.
Figure 4:
Figure 5:
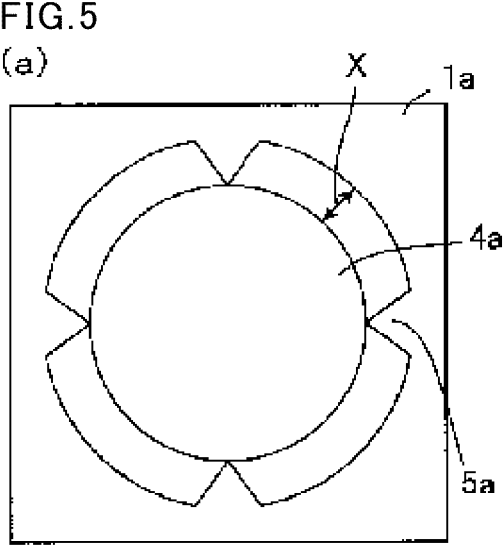
FIGS. 5(a) and 5(b) are schematic plan views of a lens unit in which the shape of the lens supporting portions has been changed.
Figure 5:
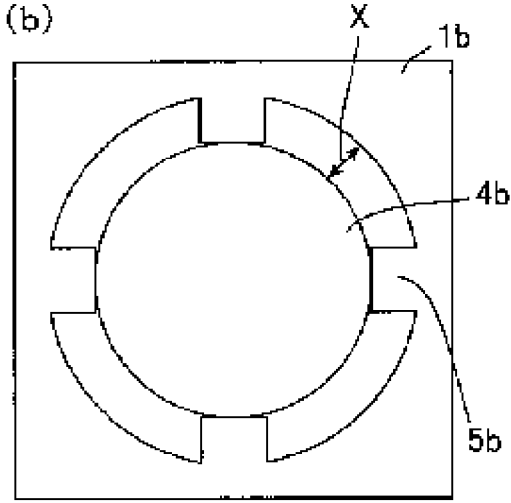
Figure 6:
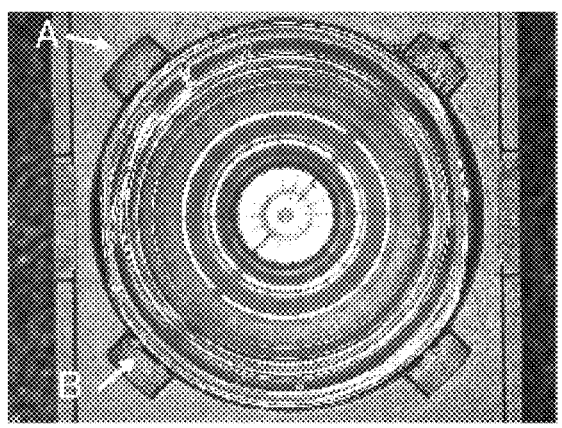
FIG. 6(a) is a plan view showing an optical microscope image of a lens unit.
FIG. 6(b) is an enlarged view showing an optical microscope image of the portion A in FIG. 6(a).
FIG. 6(c) is an enlarged view showing an optical microscope image of the portion B in FIG. 6(a).
FIG. 6(d) is a view showing an optical microscope image of a portion-A contact location (after the reflow process) in FIG. 6(a).
FIG. 6(e) is a view showing an optical microscope image of a portion-B contact location (after the reflow process) in FIG. 6(a).
Figure 6:
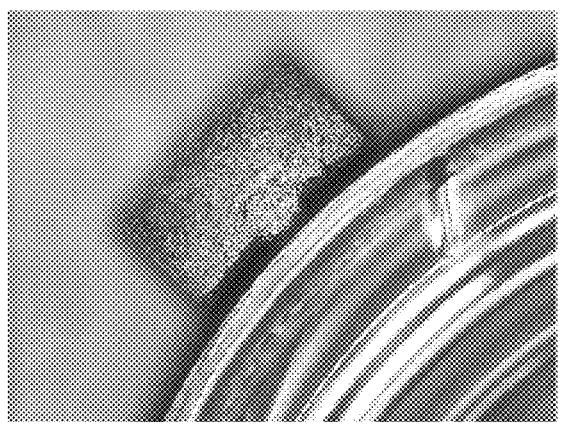
Figure 6:
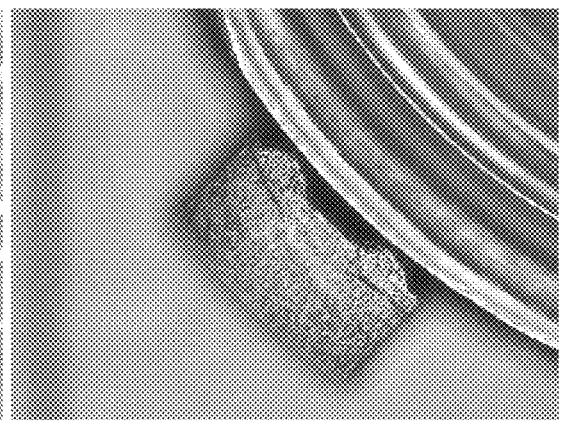
Figure 6:
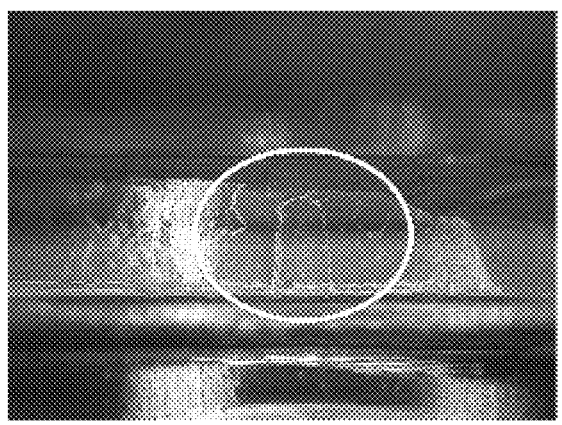
Figure 6:
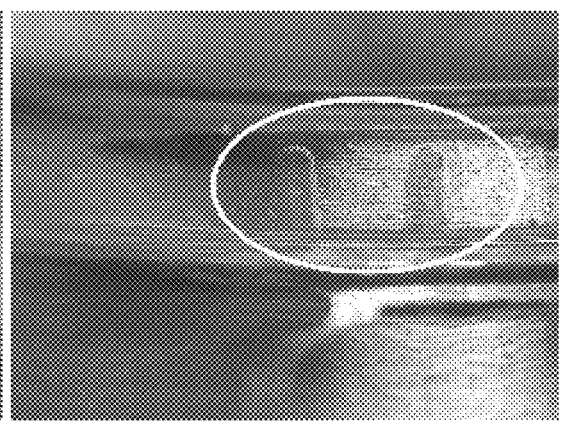
Figure 7:
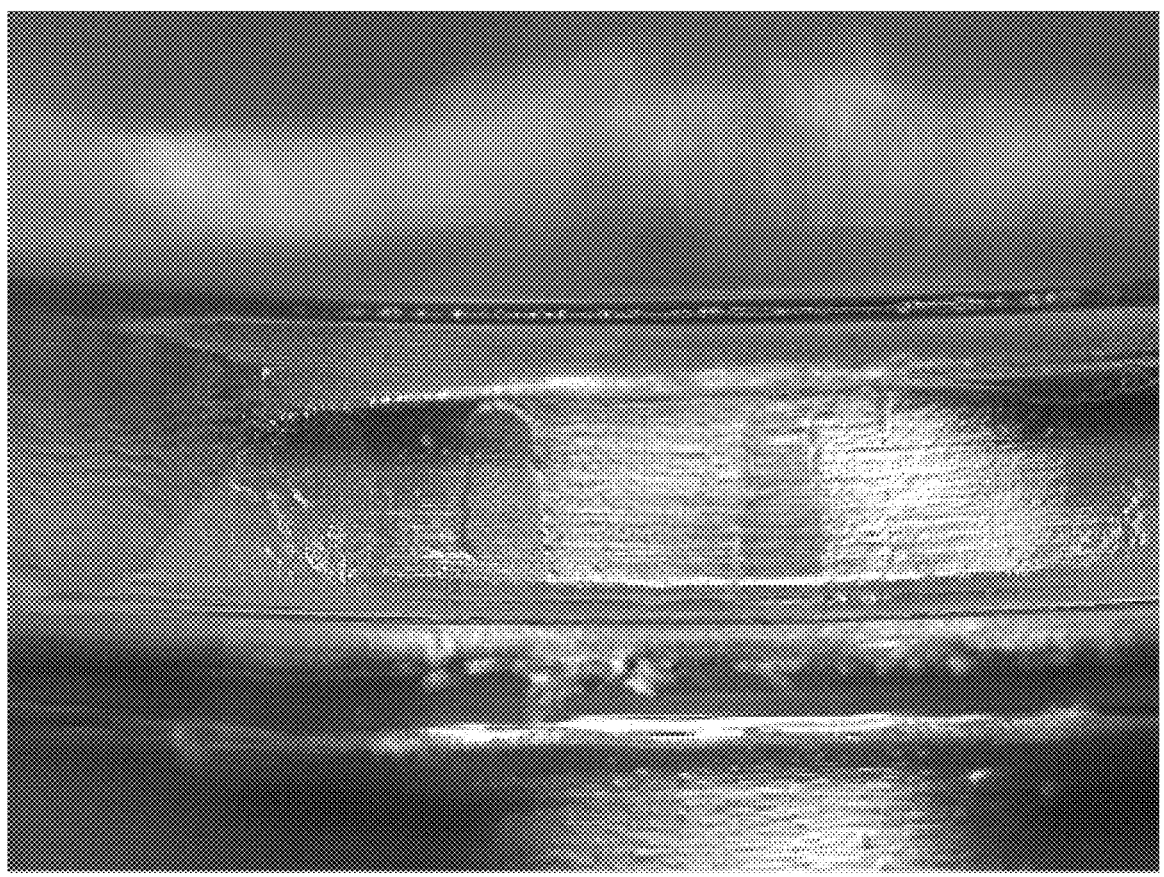
FIG. 7 is another view showing an optical microscope image of the portion-B contact location (after the reflow process) in FIG. 6(a).

1, after the reflow process, was observed to have the same depressions as those shown in FIGS. 6(d), 6(e), and 7 at the portions corresponding to the positions at which the lens was supported. This shows that the installation position of the lens was not substantially displaced, and that the lens was well installed without its optical characteristics being deteriorated.

In each Embodiment, the lens, which was set to be supported by the supporting portions of the barrel (supporting portions of the lens tube), was still supported by the supporting portions even after the reflow test, and the size of the clearance was not changed from the size before the reflow test.

Further, the following points were revealed from the results of tests with various values of $X/X_0$: (1) no problem arises even when the size of the clearance is increased; and (2) still, from the above results, it is preferable to make $X \geq X_0$, and $X$ is preferably not less than 1.1 times $X_0$.

If the value of $X/X_0$ is more than 100, the effects of the present invention may not be sufficiently provided because of reasons such as that the size of the imaging lens unit cannot be reduced.

TABLE 1

| Evaluation items | $X_0$ | $X/X_0$ (First lens) | $X/X_0$ (Second lens) | $X/X_0$ (Third lens) | Lens unit configuration | Barrel material | Clearance | Lens supporting portions | Resolution after reflow process (*) | Deformation of lens after reflow process (*) | Deformation of barrel after reflow process (*) |
|---|---|---|---|---|---|---|---|---|---|---|---|
| Embodiment 1 | 0.0275 | 3.64 | 1.82 | — | 2 lenses | LCP | Provided | Provided (4 locations) | + | + | + |
| Comparative Example 1 | 0.0275 | 3.64 | 1.82 | — | 2 lenses | PC | Provided | Provided (4 locations) | − | + | − |
| Comparative Example 2 | 0.0275 | 3.64 | 0 | — | 2 lenses | LCP | First lens provided, second lens not provided | Not provided (0 locations) | − | − | + |
| Comparative Example 3 | 0.0275 | 3.64 | 1.82 | — | 2 lenses | LCP | Provided | Not provided (0 locations) | − | + | + |
| Embodiment 2 | 0.0245 | 4.08 | 2.04 | — | 2 lenses | PPS | Provided | Provided (4 locations) | + | + | + |
| Embodiment 3 | 0.0565 0.042 | 2.65 — | — 3.57 | 1.77 — | 3 lenses | LCP | Provided | Provided (4 locations) | + | + | + |
| Comparative Example 5 | 0.0565 0.042 | 2.65 — | — 3.57 | 1.77 — | 3 lenses | LCP | Provided | Not provided (0 locations) | − | + | + |
| Comparative Example 6 | 0.0565 0.042 | 2.65 — | — 3.57 | 0 — | 3 lenses | LCP | First lens provided, second lens provided, third lens not provided | Not provided (0 locations) | − | − | + |
| Embodiment 4 | 0.05 0.0355 | 3.00 — | — 4.20 | 2.00 — | 3 lenses | PPS | Provided | Provided (4 locations) | + | + | + |
| Embodiment 5 | 0.027 | 2.78 | 0.93 | — | 2 lenses | LCP | Provided | Provided (4 locations) | 7/10 samples showed + | + | + |
| Embodiment 6 | 0.027 | 2.96 | 1.11 | — | 2 lenses | LCP | Provided | Provided (4 locations) | 9/10 samples showed + | + | + |
| Embodiment 7 | 0.0335 | 10.45 | 8.96 | — | 2 lenses | LCP | Provided | Provided (4 locations) | + | + | + |
| Embodiment 8 | 0.0325 | 8.23 | 7.69 | — | 2 lenses | LCP | Provided | Provided (3 locations) | + | + | + |
| Embodiment 9 | 0.0295 | 5.93 | 4.24 | — | 2 lenses | LCP | Provided | Provided (8 locations) | + | + | + |
| Comparative Example 7 | 0.0275 | 3.64 | 1.82 | — | 2 lenses | LCP | Provided | Provided (2 locations) | − | + | + |

(*) For Embodiments 1 to 9, Comparative Examples 1 to 3 and 5 to 7, results with only "+" and "−" indicate that results of all the 10 samples in those Embodiments and Comparative Examples were the same.

As a result of observation of the lens removed from the barrel before and after the reflow test, the lenses of the lens units of Embodiments 1 to 9 had depressions at the portions corresponding to the positions at which the lenses were supported. For example, the lens of the lens unit in Embodiment Cationically-cured epoxy resin lenses other than the cationically-cured epoxy resin lenses used in the above Embodiments can also provide excellent characteristics of a lens unit, without being damaged in the solder reflow process.

For example, in the following, methods of producing lenses A, B, and C are described which can be suitably used in place of the lenses such as the first lens 13 and the second lens 14 in Embodiment 1 and the first lens 33 and the third lens 34 in Embodiment 3. For the lenses A to D, the viscosity and the epoxy equivalent of the resin compositions, and the transmissivity, the refractive index, and the Abbe's number of the molded product were measured by the same procedures as those for the lens of Embodiment 1.

(Method of Producing Lens A)

In a 3-L four-necked flask having a gas inlet, a cooling tube, and a stirring rod, 403 g of a liquefied hydrogenated bisphenol A epoxy resin ("EPIKOTE YX8000", a product of Japan Epoxy Resin Inc.), and 268.66 g of a solid hydrogenated bisphenol A epoxy resin ("EPIKOTE YL7170 (YX8040)", a product of Japan Epoxy Resin Inc.), and 671.66 g of butanol were charged, and they were stirred at 80° C. to be mixed uniformly. Then, the temperature was lowered to 50° C., and 167.45 g of phenyltrimethoxysilane, 133.06 g of 3-glycidoxypropyltrimethoxysilane, and 212.24 g of tetramethoxy silane were added, and the ingredients were stirred to be mixed uniformly. Thereafter, 133.15 g of water was added and the ingredients were stirred to be mixed uniformly. Then, 13.71 g of trimethyl borate was added and the ingredients were stirred to be mixed uniformly. After that, the temperature was raised. After being stirred at temperatures from 85° C. to 90° C. for six hours, methanol, water, and butanol were distilled off as volatile constituents under reduced pressure, and thereby a resin composition was left after cooling. The yield was 1,020 g and the viscosity of the product was 203 Pa·s at 40° C.

Then, 2-ethylhexanol as a releasing agent in an amount of 1% by weight, based on the total weight, was added to the resin composition and they were then uniformly mixed at 80° C. The resin composition was cooled to 40° C., and then a cationic curing catalyst (San-Aid SI-60L, a product of Sanshin Chemical Industry Co., Ltd.) in an amount of 1.5% by weight based on the total weight, was added to the composition. Then, they were uniformly mixed and a cationically-curable epoxy resin composition was prepared. The epoxy equivalent of the cationically-curable epoxy resin composition was 461 (g/eq).

A curing agent was added to the resin composition, and then mixed them to prepare a one component resin composition, and the resin composition was applied to a mold having a shape corresponding to the lens so as to be heated at 140° C. for three minutes and cured. Then, the lens was taken out from the mold and the lens was completed by one hour of postcuring (baking) at 200° C. under a nitrogen atmosphere.

The same cationically-curable epoxy resins as that for the above lens were cured under the same conditions except that the molds were different, so that test molded products for various evaluations were produced. In a 250-μm-thick film-state molded product, the refractive index in the wavelength of 486 nm was 1.5213, the refractive index in the wavelength of 589 nm was 1.5172, and the refractive index in the wavelength of 656 nm was 1.5116. The Abbe's number was 53.3, and the transmissivity in the wavelength of 500 nm was 90.8%. The average thermal expansion coefficient of a 10 mm×10 mm×3 mm (in thickness) molded product measured at temperatures within the range of 25° C. to 260° C. was 105 ppm.

(Method of Producing Lens B)

In a 3-L four-necked flask having a gas inlet, a cooling tube, and a stirring rod, 50 g of an alicyclic epoxy resin ("Celoxide 2021P", a product of Daicel Chemical Industries, Ltd., the epoxy equivalent: 130), and 50 g of an alicyclic epoxy resin ("EHPE-3150", a product of Daicel Chemical Industries, Ltd., the epoxy equivalent: 177) were uniformly mixed at 140° C. Further, 0.2 g of a silicon polymer ("KF-6004", a product of Shin-Etsu Chemical Co., Ltd., weight-average molecular weight: 77600) and 0.5 g of isopropyl acetate were added and the ingredients were uniformly mixed, whereby a resin composition was prepared. The composition had a viscosity of 10 Pa·s at 40° C.

Thereafter, stearic acid as a releasing agent in an amount of 0.5% by weight, based on the total weight, was added to the resin composition and they were then uniformly mixed at 80° C. The resin composition was cooled to 40° C., and a curing catalyst (San-Aid SI-80L, a product of Sanshin Chemical Industry Co., Ltd.) in an amount of 0.2% by weight, based on the total weight, was added to the composition. Then, they were uniformly mixed and a cationically-curable epoxy resin composition was prepared. The epoxy equivalent of the cationically-curable epoxy resin composition was 154 (g/eq).

According to need, the cationically-curable epoxy resin composition was deaerated by decompression, and the cationically-curable epoxy resin composition was applied to a mold having a shape corresponding to the lens so as to be heated for three minutes at 140° C. and cured. Then, the lens was taken out from the mold and the lens was completed by one hour of postcuring (baking) at 180° C. under a nitrogen atmosphere.

The same cationically-curable epoxy resins as that for the above lens were cured under the same conditions except that the molds were different, so that test molded products for various evaluations were produced. In a 250-μm film-state molded product, the refractive index in the wavelength of 486 nm was 1.5234, the refractive index in the wavelength of 589 nm was 1.5165, and the refractive index in the wavelength of 656 nm was 1.5143. The Abbe's number was 56.8, and the transmissivity in the wavelength of 500 nm was 90.1%. The average thermal expansion coefficient of a 10 mm×10 mm×3 mm (in thickness) molded product measured at temperatures within the range of 25° C. to 260° C. was 90 ppm.

(Method of Producing Lens C)

In a four-necked flask having a gas inlet, a cooling tube, and a stirring rod, 20 g of a liquefied hydrogenated bisphenol A epoxy resin ("EPIKOTE YX8000", a product of Japan Epoxy Resin Inc.), and 10 g of a solid hydrogenated bisphenol A epoxy resin ("EPIKOTE YL7170", a product of Japan Epoxy Resin Inc.), were uniformly mixed at 140° C. Further, 40 g of an alicyclic epoxy resin ("Celoxide 2021P", a product of Daicel Chemical Industries, Ltd., the epoxy equivalent: 130), and 20 g of an alicyclic epoxy resin ("EHPE-3150", a product of Daicel Chemical Industries, Ltd., the epoxy equivalent: 177) were added and the ingredients were uniformly mixed. In addition, 10 g of a methyl silicone oligomer ("PMSQ-E", a product of Konishi Chemical Inc Co., Ltd., the number-average molecular weight: 1800) was added and the ingredients were uniformly mixed at 70° C., whereby a resin composition was produced. The composition had a viscosity of 4 Pa·s at 40° C. Thereafter, an octanoic acid as a releasing agent in an amount 1% by weight, based on the total weight, was added to the resin composition and they were then uniformly mixed at 80° C. The resin composition was cooled to 40° C., and a cationic curing catalyst (San-Aid SI-80L, a product of Sanshin Chemical Industry Co., Ltd.) was added in an amount of 0.2% by weight, based on the total weight, to the composition. Then, they were uniformly mixed and a cationically-curable epoxy resin composition was prepared. The epoxy equivalent of the cationically-curable epoxy resin composition was 268 (g/eq).

According to need, the cationically-curable epoxy resin composition was deaerated by decompression, and the cationically-curable epoxy resin composition was applied to a mold having a shape corresponding to the lens so as to be heated for three minutes at 140° C. and cured. Then, the lens was taken out from the mold and the lens was completed by one hour of postcuring (baking) at 220° C. under a nitrogen atmosphere.

The same cationically-curable epoxy resins as that for the above lens was cured under the same conditions except that the molds were different, so that test molded products for various evaluations were produced. In a 250-μm film-state molded product, the refractive index in the wavelength of 486 nm was 1.5158, the refractive index in the wavelength of 589 nm was 1.5092, and the refractive index in the wavelength of 656 nm was 1.5065. The Abbe's number was 54.8, and the transmissivity in the wavelength of 500 nm was 91.1%. The average thermal expansion coefficient of a 10 mm×10 mm×3 mm (in thickness) molded product measured at temperatures from 25° C. to 260° C. was 95 ppm.

In the following, a method of producing a lens D is described which can be suitably used in place of the above lenses such as the second lens 39 in Embodiment 3.

(Method of Producing Lens D)

In a 3-L four-necked flask having a gas inlet, a cooling tube, and a stirring rod, 60 g of a liquefied hydrogenated bisphenol A epoxy resin ("828EL", a product of Japan Epoxy Resin Inc., the epoxy equivalent: 188), and 20 g of a solid hydrogenated bisphenol A epoxy resin ("JER1007", a product of Japan Epoxy Resin Inc., the epoxy equivalent: 1998), were uniformly mixed at 150° C. Further, 10 g of an alicyclic epoxy resin ("Celoxide 2021P", a product of Daicel Chemical Industries, Ltd., the epoxy equivalent: 130), and 10 g of a phenylsilicon oligomer ("PPSQ-E", a product of Konishi Chemical Inc Co., Ltd., the number-average molecular weight: 850) were added and the ingredients were uniformly mixed at 90° C., whereby a resin composition was produced. The composition had a viscosity of 77 Pa·s at 40° C.

Thereafter, stearic acid as a releasing agent in an amount of 0.5% by weight, based on the total weight, was added to the resin composition and they were then uniformly mixed at 80° C. The resin composition was cooled to 40° C., and a cationic curing catalyst (San-Aid SI-80L, a product of Sanshin Chemical Industry Co., Ltd.) in an amount of 1% by weight, based on the total weight, was added to the composition. Then, they were uniformly mixed and a cationically-curable epoxy resin composition was prepared. The epoxy equivalent of the cationically-curable epoxy resin composition was 524 (g/eq).

According to need, the cationically-curable epoxy resin composition was deaerated by decompression, and the cationically-curable epoxy resin composition was applied to a mold having a shape corresponding to the lens so as to be heated for three minutes at 150° C. and cured. Then, the lens was taken out from the mold and the lens was completed by one hour of postcuring (baking) at 200° C. under a nitrogen atmosphere.

The same cationically-curable epoxy resins as that for the above lens were cured under the same conditions except that the molds were different, so that test molded products for various evaluations were produced. In a 250-μm film-state molded product, the refractive index in the wavelength of 486 nm was 1.5943, the refractive index in the wavelength of 589 nm was 1.5816, and the refractive index in the wavelength of 656 nm was 1.5766. The Abbe's number was 32.9, and the transmissivity in the wavelength of 500 nm was 90.9%. The average thermal expansion coefficient of a 10 mm×10 mm×3 mm (in thickness) molded product measured at temperatures from 25° C. to 260° C. was 92 ppm.

The imaging lens unit in Embodiment 1 was processed by the solder reflow process, had a cationically-cured epoxy resin lens as its an essential component, had a barrel produced from an LCP having a sufficiently high load deflection temperature, had a clearance provided between the lens and the lens tube, and had the lens supported by the lens supporting portions provided at four places inside the lens tube. The evaluation results of the resolution change, deformation of the lens, and deformation of the barrel (lens tube) after the reflow process were good (+) for this lens unit. Comparison of those results and the results of Comparative Examples 1 to 3 shows the following points. First, in the case that the barrel is produced from a PC having an insufficient load deflection temperature, thermal deformation and the like occur in the solder reflow process and disables precise machining, leading to a deteriorated resolution after the reflow process. Secondly, in the case that no clearance is provided, the pressure generated between the thermally expanded lens and the lens tube deforms the lens. Lastly, in the case that a clearance is provided but the lens supporting portions are not provided in the barrel 21 or are provided at less than three locations, the lens will be displaced. Those points prove that the above subject matters in the present invention are necessary to provide the effect of the present invention. The lens unit in Embodiment 2 is different from the lens unit in Embodiment 1 in that the barrel is produced from a PPS, but can provide the effect of the present invention effectively as is the case with the lens unit in Embodiment 1.

The same holds for the lens units in Embodiment 3 and Comparative Examples 5 and 6 which have different structures. The lens unit in Embodiment 4 is different from the lens unit in Embodiment 3 in that the barrel is produced from a PPS, but can provide the effect of the present invention effectively as is the case with the lens unit in Embodiment 3.

In Embodiments 5 to 9, various values of $X/X_0$ were used, and the results show that the imaging lens unit of the present invention has excellent characteristics and can provide the effect of the present invention even when the value of $X/X_0$ is increased. The results of Embodiments 8 and 9 show that the lens unit can provide the same effect even when the number of lens supporting portions is changed from four to three or eight.

The subject matters of the present invention are that the lens or the lens tube is produced from a specific resin material, or the diameter of the lens and the positional relation between the lens and the lens tube are optimized, in order to suppress the mechanical damage on the lens and a decrease in the optical characteristics which result from the difference in the thermal expansion coefficients between the lens and the lens tube in the reflow process under sever solder reflow process conditions. The above Embodiments and Comparative Examples support the relevance between those subject matters of the present invention and the effect of the present invention. If the functional mechanisms for providing the effect of the present invention, which are described in the above Means for Solving the Problems and the like, are employed in view of the results of Embodiments and Comparative Examples, a lens unit, having the essential subject matters of the present invention, can provide the effect of the present invention. Therefore, with the imaging lens unit of the present invention, the method of producing the lens unit, and the use and applications (camera module, cellular phone, digital camera) of the imaging lens unit in preferable embodiments of the present invention, advantageous effects of the present invention can be achieved.

BRIEF EXPLANATION OF DRAWINGS

1, 1*a*, 1*b*, 11, 21, 31: Barrel (lens tube)
12, 32: Diaphragm
4, 4*a*, 4*b*: Lens
5*a*, 5*b*, 15, 35: Lens supporting portion
6: Sink mark
10, 30*a*, 30*b*: Tapered portion
13, 33: First lens 14, 24, 39: Second lens
16, 36, 36a, 36b: circular hollow light-shielding plate
17, 37: Sealing plate (glass)
18, 38: Infrared cut filter
34: Third lens
100, 300: Imaging lens unit
X: Clearance

The invention claimed is:

1. An imaging lens unit configured to be processed by a solder reflow process, comprising:
   a lens group consisting of one or more lenses; and
   a lens tube that supports the lens group,
   wherein
      the imaging lens unit comprises one or more cationically-cured epoxy resin lenses formed from a cationically-curable epoxy resin material,
   the lens tube is formed from a thermoplastic resin material having a deflection temperature under load of not lower than 200° C., and
   the imaging lens unit has a clearance between the lens tube and at least one of the cationically-cured epoxy resin lenses and has lens supporting portions that are provided at at least three locations inside the lens tube and that support the at least one cationically-cured epoxy resin lens,
   wherein the imaging lens unit has a clearance between the lens tube and the cationically-cured epoxy resin lens supported by the lens supporting portions, in a manner that satisfies the following formula (1):

$$\{L \times (T-25) \times \alpha^2 - B \times (T-25) \times \alpha^1\} \times (1/2) \leq X \quad (1)$$

wherein B represents an inner diameter of the lens tube at an installation place of the cationically-cured epoxy resin lens at 25° C.;
   L represents a diameter of the cationically-cured epoxy resin lens at 25° C.;
   $\alpha^1$ represents an average thermal expansion coefficient of the lens tube in a temperature range of from 25° C. to 260° C.;
   $\alpha^2$ represents an average thermal expansion coefficient of the cationically-cured epoxy resin lens in the temperature range of from 25° C. to 260° C.;
   T represents the highest temperature (° C.) in the solder reflow process for the imaging lens unit; and
   X represents the clearance.

2. The imaging lens unit according to claim 1, wherein the average thermal expansion coefficients of the lens tube formed from the thermoplastic resin material and the cationically-cured epoxy resin lens have a value of $\alpha^1/\alpha^2$ in the range of 0.01 to 1.

3. The imaging lens unit according to claim 2, wherein the lens supporting portion supports the lens in a manner to bite into the lens.

4. The imaging lens unit according to claim 2, wherein the imaging lens unit has a depression on the lens supported by the lens supporting portions, at contact portions in contact with the lens supporting portions.

5. The imaging lens unit according to claim 2, wherein the lens is configured to be received within the lens tube that has the lens supporting portions provided therein.

6. The imaging lens unit according to claim 2, wherein the thermoplastic resin material is an organic-inorganic composite that contains an inorganic fiber as an inorganic component.

7. The imaging lens unit according to claim 1, wherein the lens is configured to be received within the lens tube that has the lens supporting portions provided therein.

8. The imaging lens unit according to claim 7, wherein the thermoplastic resin material is an organic-inorganic composite that contains an inorganic fiber as an inorganic component.

9. The imaging lens unit according to claim 1, wherein the thermoplastic resin material is an organic-inorganic composite that contains an inorganic fiber as an inorganic component.

10. The imaging lens unit according to claim 1, wherein the imaging lens unit is produced through the solder reflow process.

11. The imaging lens unit according to claim 10, wherein the imaging lens unit is mounted on a camera module when being processed by the solder reflow process, and is intended to be used for a camera module.

12. A method of producing an imaging lens unit, including a process of producing the imaging lens unit according to claim 1.

13. The imaging lens unit according to claim 1, wherein the lens supporting portion supports the lens in a manner to bite into the lens.

14. The imaging lens unit according to claim 1, wherein the imaging lens unit has a depression on the lens supported by the lens supporting portions, at contact portions in contact with the lens supporting portions.

15. An imaging lens unit configured to be processed by a solder reflow process, comprising:
   a lens group consisting of one or more lenses; and
   a lens tube that supports the lens group,
   wherein
      the imaging lens unit comprises one or more cationically-cured epoxy resin lenses formed from a cationically-curable epoxy resin material,
   the lens tube is formed from a thermoplastic resin material having a deflection temperature under load of not lower than 200° C., and
   the imaging lens unit has a clearance between the lens tube and at least one of the cationically-cured epoxy resin lenses and has lens supporting portions that are provided at at least three locations inside the lens tube and that support the at least one cationically-cured epoxy resin lens,
   wherein the lens group consists of multiple cationically-cured epoxy resin lenses,
   at least one of the multiple cationically-cured epoxy resin lenses is supported by the lens support portions, and
   the other cationically-cured epoxy resin lenses are supported by being fitted with the lens supported by the lens supporting portions and with the lens tube.

16. An imaging lens unit configured to be processed by a solder reflow process, comprising:
   a lens group consisting of one or more lenses; and
   a lens tube that supports the lens group,
   wherein
      the imaging lens unit comprises one or more cationically-cured epoxy resin lenses formed from a cationically-curable epoxy resin material,
   the lens tube is formed from a thermoplastic resin material having a deflection temperature under load of not lower than 200° C., and
   the imaging lens unit has a clearance between the lens tube and at least one of the cationically-cured epoxy resin lenses and has lens supporting portions that are provided at at least three locations inside the lens tube and that support the at least one cationically-cured epoxy resin lens, wherein the cationically-cured epoxy resin lens other than the one or more cationically-cured epoxy resin lenses supported by the lens supporting portions has a tapered portion, and is supported by being fitted with the lens supported by the lens supporting portions and with the lens tube.

17. An imaging lens unit configured to be processed by a solder reflow process, comprising:

a lens group consisting of one or more lenses; and a lens tube that supports the lens group, wherein the imaging lens unit comprises one or more cationically-cured epoxy resin lenses formed from a cationically-curable epoxy-resin-material, the lens tube is formed from a thermoplastic resin material having a deflection temperature under load of not lower than 200° C., and the imaging lens unit has a clearance between the lens tube and at least one of the cationically-cured epoxy resin lenses and has lens supporting portions that are provided at at least three locations inside the lens tube and that support the at least one cationically-cured epoxy resin lens, wherein the lens group consists of multiple cationically-cured epoxy resin lenses, and a difference among the average thermal expansion coefficients of the cationically-cured epoxy resin lenses is not higher than 50 ppm/° C.

18. An imaging lens unit configured to be processed by a solder reflow process, comprising:

a lens group consisting of one or more lenses; and a lens tube that supports the lens group, wherein the imaging lens unit comprises one or more cationically-cured epoxy resin lenses formed from a cationically-curable epoxy resin material, the lens tube is formed from a thermoplastic resin material having a deflection temperature under load of not lower than 200° C., and the imaging lens unit has a clearance between the lens tube and at least one of the cationically-cured epoxy resin lenses and has lens supporting portions that are provided at at least three locations inside the lens tube and that support the at least one cationically-cured epoxy resin lens, wherein the lens group consisting of the one or more lenses has an Abbe's number vd that satisfies the following formula (2):

$$31 \leq vd \leq 62 \tag{2}.$$

19. An imaging lens unit configured to be processed by a solder reflow process, comprising:

a lens group consisting of one or more lenses; and a lens tube that supports the lens group, wherein the imaging lens unit comprises one or more cationically-cured epoxy resin lenses formed from a cationically-curable epoxy resin material, the lens tube is formed from a thermoplastic resin material having a deflection temperature under load of not lower than 200° C., and the imaging lens unit has a clearance between the lens tube and at least one of the cationically-cured epoxy resin lenses and has lens supporting portions that are provided at at least three locations inside the lens tube and that support the at least one cationically-cured epoxy resin lens, wherein the imaging lens unit has a circular hollow light-shielding plate, being not more than 0.5 mm in thickness, between at least two lenses among the multiple lenses constituting the lens group.

* * * * *